US012610942B2

(12) United States Patent
Flake et al.

(10) Patent No.: US 12,610,942 B2
(45) Date of Patent: Apr. 28, 2026

(54) CHAMBER ASSEMBLY FOR PREMATURE FETUS

(71) Applicant: THE CHILDREN'S HOSPITAL OF PHILADELPHIA, Philadelphia, PA (US)

(72) Inventors: Alan W. Flake, Philadelphia, PA (US); Marcus Graeme Davey, Ardmore, PA (US); Joshua Martin, Providence, RI (US); Dana Zitnick, Warwick, RI (US); Spencer Brown, Cranston, RI (US); Dustin Gaidos, Milton, MA (US); Joseph Gordon, Mansfield, MA (US)

(73) Assignee: The Children's Hospital of Philadelphia, Philadelphia, PA (US)

( * ) Notice: Subject to any disclaimer, the term of this patent is extended or adjusted under 35 U.S.C. 154(b) by 644 days.

(21) Appl. No.: 18/245,382

(22) PCT Filed: Sep. 15, 2021

(86) PCT No.: PCT/US2021/050386
§ 371 (c)(1),
(2) Date: Mar. 15, 2023

(87) PCT Pub. No.: WO2022/060783
PCT Pub. Date: Mar. 24, 2022

(65) Prior Publication Data
US 2023/0371500 A1 Nov. 23, 2023
Related U.S. Application Data

(60) Provisional application No. 63/078,572, filed on Sep. 15, 2020.

(51) Int. Cl.
*A01N 1/128* (2025.01)
*A01N 1/126* (2025.01)
(Continued)

(52) U.S. Cl.
CPC ............. *A01N 1/128* (2025.01); *A01N 1/126* (2025.01); *A01N 1/142* (2025.01); *A61G 11/00* (2013.01)

(58) Field of Classification Search
CPC ........ A01N 1/128; A01N 1/126; A01N 1/142; A61G 11/00; A61M 1/3666; A61M 2240/00
See application file for complete search history.

(56) References Cited

U.S. PATENT DOCUMENTS 4,048,684 A * 9/1977 Korner ................. A61H 31/006
5/655
4,509,505 A * 4/1985 Mercey ................. A61G 11/00
600/22
(Continued)

FOREIGN PATENT DOCUMENTS

CN 102488600 A 6/2012
DE 20213460 U1 3/2003
(Continued)

OTHER PUBLICATIONS

Partridge, E. A. et al., "An extra-uterine system to physiologically support the extreme premature lamb", Nature Communications, Apr. 25, 2017, vol. 8, Article No. 15112, internal pp. 1-15.

*Primary Examiner* — Bo Joseph Peng
(74) *Attorney, Agent, or Firm* — BakerHostetler

(57) ABSTRACT
Systems and methods are disclosed relating to extracorporeal fetal care. A fetal chamber assembly configured to enclose and support a fetus therein includes a base configured to receive the fetus therein; a lid configured to removably contact the base to form a liquid-tight seal between the lid and the base; a growth chamber defined between the base and the lid, the growth chamber being configured to receive the fetus therein; and a cannulation chamber in fluid communication with the growth chamber, the cannulation cham-
(Continued)

ber being configured to receive therein a cannulated umbilical cord of the fetus. The growth chamber is configured to be adjusted in size to accommodate the fetus during gestation based on the size of the fetus, and the fetal chamber assembly is configured to receive a liquid from a liquid source.

27 Claims, 53 Drawing Sheets

(51) Int. Cl.
 *A01N 1/142* (2025.01)
 *A61G 11/00* (2006.01)

(56) References Cited

U.S. PATENT DOCUMENTS

| | | | | |
|---|---|---|---|---|
| 5,218,958 | A * | 6/1993 | Cooper | A61G 11/00 128/202.13 |
| 9,717,347 | B1 | 8/2017 | White | |
| 10,085,907 | B2 * | 10/2018 | Flake | A61M 1/3623 |
| 10,973,721 | B2 * | 4/2021 | Fassihi | A61H 33/6068 |
| 11,471,351 | B2 * | 10/2022 | Flake | A61G 11/006 |
| 11,484,026 | B2 * | 11/2022 | Tchirikov | A61G 10/02 |
| 12,440,412 | B2 * | 10/2025 | Oei | A01N 1/143 |
| 2004/0133064 | A1 * | 7/2004 | Castillon Levano | A61G 11/00 600/22 |
| 2004/0193096 | A1 | 9/2004 | Cooper | |
| 2015/0196423 | A1 | 7/2015 | Nadau | |
| 2016/0022524 | A1 * | 1/2016 | Flake | A61M 1/3623 600/22 |
| 2017/0128322 | A1 * | 5/2017 | Fassihi | A61P 3/02 |
| 2017/0360638 | A1 | 12/2017 | Moletto et al. | |
| 2018/0168901 | A1 * | 6/2018 | Flake | A01N 1/143 |
| 2019/0380900 | A1 | 12/2019 | Flake et al. | |
| 2020/0268582 | A1 | 8/2020 | Flake et al. | |
| 2022/0296645 | A1 * | 9/2022 | Glassberg Csete | A61K 9/1271 |
| 2024/0390205 | A1 * | 11/2024 | Flake | A61G 10/02 |
| 2025/0303040 | A1 * | 10/2025 | Tarmin | A61G 11/00 |

FOREIGN PATENT DOCUMENTS

| | | | |
|---|---|---|---|
| JP | 2018-527042 | A | 9/2018 |
| JP | 2020-501679 | A | 1/2020 |
| WO | 2018/141906 | A1 | 8/2018 |

* cited by examiner

335

332

334     333

X

Z

Y

CHAMBER ASSEMBLY FOR PREMATURE FETUS

CROSS-REFERENCE TO RELATED APPLICATIONS

This application is the National Stage Application of International Patent Application No. PCT/US2021/050386, filed Sep. 15, 2021, which claim the benefit of U.S. Provisional Application No. 63/078,572, filed Sep. 15, 2020, the entireties of which are incorporated herein for any and all purposes.

TECHNICAL FIELD

The present disclosure relates generally to neonatal care, and more specifically to systems and methods related to improving viability of a premature fetus outside of the womb.

BACKGROUND

Extreme prematurity is a leading cause of infant morbidity and mortality in the United States. Premature birth may occur due to any one of a multitude of medical reasons. Respiratory failure represents a common and challenging problem associated with extreme prematurity, as gas exchange in critically preterm neonates is impaired by structural and functional immaturity of the lungs. Even with medical advances in this field, there is still a high rate of chronic lung disease and other complications of organ immaturity in prematurely born children, particularly in fetuses born prior to 28 weeks gestation. The development of a system that could support normal fetal growth and organ maturation for even a few weeks could significantly reduce the morbidity and mortality of extreme prematurity and improve quality of life in survivors. There are shortcomings with existing mechanisms for supporting premature fetuses. Existing previous attempts to achieve adequate oxygenation of the fetus in animal models have been limited by circulatory overload and cardiac failure. The known systems suffer from unacceptable complications, such as circulatory failure and contamination.

Accordingly, systems and methods for providing extracorporeal support for a premature fetus, or fetuses (preterm or term) with inadequate respiratory gas exchange to support life, due to a spectrum of conditions/disorders, may improve viability.

SUMMARY

The foregoing needs are met by the various aspects of fetal chamber assembly systems, components, and methods of use disclosed. According to an aspect of the disclosure, a fetal chamber assembly configured to enclose and support a fetus therein includes a base configured to receive the fetus therein; a lid configured to removably contact the base to form a liquid-tight seal between the lid and the base; a growth chamber defined between the base and the lid, the growth chamber being configured to receive the fetus therein; and a cannulation chamber in fluid communication with the growth chamber, the cannulation chamber being configured to receive therein a cannulated umbilical cord of the fetus. The growth chamber is configured to be adjusted in size to accommodate the fetus during gestation based on the size of the fetus. The fetal chamber assembly is configured to receive a liquid from a liquid source.

Optionally, the fetal chamber assembly may include a first inlet disposed on the base and in fluid communication with the growth chamber, the first inlet being configured to discharge the liquid into the growth chamber. The first inlet may be disposed on the lid.

Optionally, the fetal chamber assembly may include a second inlet disposed on the base and in fluid communication with the cannulation chamber, the second inlet being configured to discharge the liquid into the cannulation chamber. The second inlet may be disposed on the lid.

Optionally, the fetal chamber assembly may include an outlet disposed on the base and in fluid communication with the growth chamber, the outlet being configured to receive the liquid from the growth chamber. The outlet may be disposed on the lid.

Optionally, the fetal chamber assembly may include a temperature sensor configured to measure temperature of the liquid within the fetal chamber assembly. The temperature sensor may be disposed in the growth chamber. The temperature sensor may be disposed in the cannulation chamber. Optionally, the fetal chamber assembly may include a plurality of temperature sensors.

Optionally, the fetal chamber assembly may be configured to calculate an average temperature of the liquid by averaging temperature measurements from each of the plurality of temperature sensors. The plurality of temperature sensors may be spaced from each other, such that at least one of the plurality of temperature sensors is closer to the head of the fetus than to the feet of the fetus, and such that at least another of the plurality of temperature sensors is closer to the feet of the fetus than to the head of the fetus. At least one of the plurality of temperature sensors may be closer to the first inlet, and at least another of the plurality of temperature sensors may be closer to the outlet.

Optionally, the fetal chamber assembly may include a pressure sensor configured to measure pressure of the liquid within the fetal chamber assembly. The fetal chamber assembly may include a plurality of pressure sensors. The fetal chamber assembly may be configured to calculate an average pressure of the liquid by averaging pressure measurements from each of the plurality of pressure sensors. The plurality of pressure sensors may include a first pressure sensor and a second pressure sensor spaced from the first pressure sensor, such that when the fetus is received into the growth chamber, the fetus is disposed between the first pressure sensor and the second pressure sensor.

Optionally, the fetal chamber assembly may be configured to be rotated around a pitch axis in a first direction and in a second direction opposite the first direction. In some non-limiting aspects, the pitch axis may be disposed between the first pressure sensor and the second pressure sensor. The fetal chamber assembly may be configured to be rotated around a roll axis generally orthogonal to the pitch axis in a third direction and in a fourth direction opposite the third direction. In some non-limiting aspects, the roll axis may be disposed between the first pressure sensor and the second pressure sensor. Optionally, the roll axis can be in line with the first pressure sensor and the second pressure sensor.

Optionally, the fetal chamber assembly may include a meconium sensor configured to detect presence of meconium in the liquid. The fetal chamber assembly may be configured to alert a user if the meconium sensor detects meconium at a predetermined threshold. The meconium sensor may be disposed adjacent to an outlet channel configured to receive the liquid from the fetal chamber assembly.

Optionally, the fetal chamber assembly may include a meconium removal port extending through the base and being in fluid communication with at least one of the growth chamber and the cannulation chamber, the meconium removal port being selectively openable or closable, the meconium removal port being configured to receive a meconium removal tool therein to remove meconium from the fetal chamber assembly. The meconium removal port may be disposed on the lid. The fetal chamber assembly may include a valve disposed within the meconium removal port, the valve being configured to be selectively opened or closed. The fetal chamber assembly may include a seal within the meconium removal port and adjacent to the valve. Optionally, the valve may be a trocar valve. Optionally, the valve may be a slit-seal valve. Optionally, the fetal chamber assembly may include a removable cap configured to be received within the meconium removal port.

Optionally, the fetal chamber assembly may include an air removal port disposed thereon and configured to permit air to be moved from within the fetal chamber assembly to outside of the fetal chamber assembly. The air removal port may be disposed on the base. The air removal port may be disposed on the lid. The air removal port may be configured to receive a one-way valve therein, the one-way valve being configured to permit air to be moved out of the fetal chamber assembly and configured to prevent air from being moved into the fetal chamber assembly.

Optionally, the fetal chamber assembly may include a blood sensor configured to detect presence of blood in the liquid. The fetal chamber assembly may be configured to alert a user if the blood sensor detects blood at a predetermined threshold. The blood sensor may be disposed adjacent to an outlet channel configured to receive the liquid from the fetal chamber assembly. The blood sensor may be disposed in the cannulation chamber. Optionally, the fetal chamber assembly may include a plurality of blood sensors.

Optionally, the fetal chamber assembly may include a blood sensor assembly housing disposed adjacent to the blood sensor, the blood sensor assembly housing being configured to receive any blood present in the liquid and to direct the blood towards the blood sensor. The blood sensor assembly housing may include a funnel and a sensing chamber coupled to the funnel, wherein the blood sensor is configured to detect presence of blood within the liquid in the sensing chamber. The funnel may include a plurality of tapered walls that extend from a first end of the funnel to a second end of the funnel opposite the first end, the plurality of tapered walls being tapered towards each other in the direction from the first end to the second end, wherein the funnel is configured to receive any blood present in the liquid when the fetal chamber assembly is rotated to any one of a plurality of predetermined positions.

Optionally, the fetal chamber assembly may include an emergency shutoff assembly configured to contact the cannulated umbilical cord and to occlude blood flow through the cannulated umbilical cord. The emergency shutoff assembly may be configured to clamp the cannulated umbilical cord between the emergency shutoff assembly and the base. The emergency shutoff assembly may be configured to be non-reversible, wherein when the emergency shutoff assembly has been used to occlude blood flow through the cannulated umbilical cord, the emergency shutoff assembly is precluded from being used to un-occlude the blood flow.

Optionally, the lid of the fetal chamber assembly may be hingedly attached to the base and is configured to be rotated about the hinged attachment between an open position, in which at least a portion of the lid is spaced away from the base, and a closed position, in which the lid contacts the base.

Optionally, the fetal chamber assembly may include a first closure element on one of the base and the lid, and a second closure element on the other of the base and the lid, the first closure element being configured to releasably engage with the second closure element. The first closure element may be a clasp, the second closure element is a protrusion, and the clasp is configured to releasably engage with the protrusion. The clasp may be on the base and the protrusion is on the lid. Optionally, the fetal chamber assembly may include a plurality of first and second closure elements.

Optionally, the fetal chamber assembly may include a seal on at least one of the base and the lid, the seal being configured to form a liquid-tight closure between the base and the lid. The fetal chamber assembly may include a plurality of seals, having a first seal on the base and a second seal on the lid, the first seal being configured to releasably contact the second seal to form the liquid-tight closure.

According to another aspect of the disclosure, a growth chamber for use with a fetal chamber assembly is disclosed. The growth chamber may be configured to receive a first fluid therein and a fetus therein. The growth chamber includes a top membrane; a bottom membrane opposite the top membrane; a growth membrane spaced away from the bottom membrane, the bottom membrane being disposed between the growth membrane and the top membrane; and a fluid pocket defined between the growth membrane and the bottom membrane, the fluid pocket being configured to receive a second fluid therein. The fetus is configured to be received between the top membrane and the bottom membrane. The growth chamber has a first configuration and a second configuration, where when the growth chamber is in the first configuration, a first growth volume is defined between the top membrane and the bottom membrane, and a first pocket volume is defined within the fluid pocket between the growth membrane and the bottom membrane, and when the growth chamber is in the second configuration, a second growth volume is defined between the top membrane and the bottom membrane, and a second pocket volume is defined within the fluid pocket between the growth membrane and the bottom membrane, the first growth volume being different from the second growth volume, and the first pocket volume being different from the second pocket volume.

Optionally, the growth chamber may be configured to be moved from the first configuration to the second configuration by changing the first pocket volume to the second pocket volume.

Optionally, the growth chamber may include a first fluid inlet configured to discharge the first fluid into the growth chamber between the top membrane and the bottom membrane.

Optionally, the growth chamber may include an outlet configured to receive the first fluid out of the growth chamber.

Optionally, the growth chamber may include a bumper configured to be contacted by the fetus. The bumper may be disposed on the exterior of the growth chamber, such that at least one of the top membrane and the bottom membrane is disposed between the bumper and the fetus inside the growth chamber.

Optionally, the first fluid may be different from the second fluid.

Optionally, the bottom membrane and the growth membrane may be affixed to each other such that the second fluid does not contact the first fluid.

Optionally, the fetal chamber assembly may include a fluid pocket port in fluid communication with the fluid pocket, the fluid pocket being configured to selectively receive or discharge the second fluid through the fluid pocket port.

Optionally, the first fluid may be liquid. In some aspects, the first fluid may be physiological saline solution (PSS). In some aspects, the PSS may be synthetic amniotic fluid.

Optionally, the second fluid may be a liquid.

Optionally, the second fluid may include saline.

Optionally, the first growth volume may be smaller than the second growth volume, and the first pocket volume may be greater than the second pocket volume.

Optionally, the first growth volume may be associated with a fetus having a first size, and the second growth volume may be associated with the fetus having a second size.

Optionally, the growth chamber may include a temperature sensor therein, the temperature sensor being configured to measure temperature of the first fluid. Optionally, the growth chamber may include a plurality of temperature sensors.

Optionally, the growth chamber may include a pressure sensor therein, the pressure sensor being configured to measure pressure of the first fluid. Optionally, the growth chamber may include a plurality of pressure sensors.

Optionally, the growth chamber may be configured to fluidly communicate with a cannulation chamber.

Optionally, the growth chamber may include a meconium removal port extending therein, the meconium removal port being selectively openable or closable and being configured to permit insertion of a meconium removal tool therethrough into the growth chamber between the top membrane and the bottom membrane to remove meconium in the growth chamber.

Optionally, at least one of the top membrane, the bottom membrane, and the growth membrane may each include at least one of a polyurethane, a polypropylene, a polyethylene, a polyvinyl chloride, an ethylene vinyl acetate, a polyvinylidene chloride, and an acrylic or a laminated combination.

Optionally, at least one of the top membrane, the bottom membrane, and the growth membrane may have a durometer of between about 50 and about 100.

Optionally, at least one of the top membrane, the bottom membrane, and the growth membrane may have a durometer of between about 60 and about 90.

Optionally, at least one of the top membrane, the bottom membrane, and the growth membrane may have a durometer of between about 70 and about 80.

Optionally, at least one of the top membrane, the bottom membrane, and the growth membrane may be thermoformed.

Optionally, the growth membrane may have a thickness greater than the thickness of the top membrane and the thickness of the bottom membrane.

Optionally, the thickness of the growth membrane may be about twice the thickness of the top membrane and about twice the thickness of the bottom membrane.

Optionally, at least one of the top membrane, the bottom membrane, and the growth membrane may be configured to deform when the growth chamber receives the fetus therein.

According to another aspect of the disclosure, a cannulation chamber for use with a fetal chamber assembly is disclosed. The cannulation chamber is configured to receive a fluid therein and an umbilical cord of a fetus therein. The cannulation chamber includes a cannula entrance configured to receive one or more cannulas therethrough into the cannulation chamber; an umbilical cord opening configured to receive the umbilical cord therethrough into the cannulation chamber, the umbilical cord opening being spaced away from the cannula entrance; a fluid inlet configured to discharge the fluid into the cannulation chamber; and a cannula retention assembly disposed at the cannula entrance and configured to receive the one or more cannulas therein, such that the one or more cannulas are disposed within the cannula retention assembly according to a predetermined arrangement. The umbilical cord is connected to the one or more cannulas when in the cannulation chamber.

Optionally, the cannulation chamber may include a shut-off assembly configured to contact the umbilical cord in the cannulation chamber to occlude blood flow through the umbilical cord. The emergency shutoff assembly may be disposed between the cannula entrance and the umbilical cord opening, and wherein the connection between the one or more cannulas and the umbilical cord is disposed between the emergency shutoff assembly and the cannula entrance.

Optionally, the cannulation chamber may include a blood sensor assembly configured to detect blood present in the fluid in the cannulation chamber, the blood sensor assembly being disposed between the cannula entrance and the umbilical cord opening.

Optionally, the cannulation chamber may be in fluid communication with a growth chamber.

Optionally, the umbilical cord opening may be configured to discharge the fluid from the cannulation chamber into the growth chamber.

Optionally, the fluid may be liquid. In some aspects, the liquid may be physiological saline solution (PSS). In some aspects, the PSS may be synthetic amniotic liquid.

Optionally, the cannulation chamber may be configured to receive three cannulas.

Optionally, the cannulation chamber may include a cannulation chamber membrane configured to contact the cannulation chamber and to form a liquid-tight seal around at least a portion of the cannulation chamber. Optionally, the cannulation chamber may include an air removal port disposed on the cannulation chamber membrane and configured to permit air to pass therethrough from the cannulation chamber out of the cannulation chamber.

Optionally, the cannulation chamber may include a cannula retention assembly. The cannula retention assembly includes: a seal configured to preclude the fluid in the cannulation chamber from leaking out of the cannulation chamber at the cannula entrance; a plurality of ports extending through the seal and configured to receive the one or more cannulas therein; and a securing bar configured to contact the one or more cannulas extending through the seal, such that movement of the one or more cannulas relative to the seal is precluded.

According to another aspect of the disclosure, a cannula retention assembly for introducing a cannula into a cannulation chamber of a fetal chamber assembly includes a seal configured to contact the cannulation chamber and to preclude a fluid within the cannulation chamber from moving out of the cannulation chamber past the seal; and a port extending through the seal, such that the port is in fluid communication with the cannulation chamber, the port being configured to receive the cannula.

Optionally, the cannulation retention assembly may be configured to receive a plurality of cannulas therein.

Optionally, the seal may be configured to define a plurality of ports, the quantity of the plurality of ports being equal to or greater than the quantity of the plurality of cannulas configured to be introduced into the cannula retention assembly.

Optionally, the seal may define a top surface and a slit extending between the top surface and the port, the slit being defined by two opposing walls on the seal, the slit having an open configuration and a closed configuration, wherein when the slit is in the open configuration, the two opposing walls are spaced apart from each other such that a passage is defined between the two opposing walls, the passage extending between the top surface and the port so that the top surface is in fluid communication with the port, and when the slit is in the closed configuration, the two opposing walls are in contact with each other such that the top surface and the port are not in fluid communication with each other.

Optionally, the cannulation retention assembly may include an actuator configured to move the slit between the open configuration and the closed configuration. The actuator may be a handle configured to be moved in a first direction to a first position and in a second direction opposite the first direction to a second position, wherein when the handle is in the first position, the slit is in the open configuration, and when the handle is in the second position, the slit is in the closed position.

Optionally, the cannulation retention assembly may include a securing bar configured to contact the cannula and to press the cannula against the cannula retention assembly such that the cannula is precluded from translating or rotating within the cannula retention assembly.

According to another aspect of the disclosure, a meconium removal device for removing meconium from within a fetal chamber assembly through a meconium removal port includes a catheter configured to receive the meconium therein from the fetal chamber assembly and to move the meconium therethrough out of the fetal chamber assembly; and an adapter configured to releasably connect to the catheter and to be inserted into the fetal chamber assembly, wherein the adapter is configured to direct the catheter within the fetal chamber assembly Optionally, the adapter may include a body having a first opening at a first end and a second opening at a second end, the body defining a passage between the first opening and the second opening, the catheter being configured to be inserted into the passage and extend from the first opening to the second opening.

Optionally, the adapter may include a curved head adjacent the end, the curved head defining the second opening. The curved head may be tapered such that the curved head defines a tip. The tip may be a rounded atraumatic tip.

Optionally, the adapter may include a handle configured to be gripped by a user.

Optionally, the adapter may include a retention element defined on the body, the retention element being configured to releasably couple with a collar defined on the catheter.

According to another aspect of the disclosure, an emergency shutoff assembly configured to contact an umbilical cord of a fetus to occlude blood flow therethrough includes a body extending along an axial direction between a first end and a second end opposite the first end; a head affixed to the body adjacent the second end, the head extending from the body; a contact surface defined on the head and configured to contact the umbilical cord; and a base surface opposite the contact surface, the base surface being configured to contact the umbilical cord. The body is movable along the axial direction between a first position and a second position. The umbilical cord is configured to be disposed between the contact surface and the base surface. When the body is in the first position, the contact surface is spaced away from the base surface at a first distance, and when the body is in the second position, the contact surface is spaced away from the base surface at a second distance, the second distance being smaller than the first distance. When the body is in the second position, the contact surface and the base surface are in contact with the umbilical cord, such that blood flow is precluded through the umbilical cord.

Optionally, the emergency shutoff assembly may include an actuator coupled to the body adjacent the first end. Movement of the body from the first position to the second position may be caused by movement of the actuator. Optionally, the actuator may be a handle configured to be moved along the axial direction.

Optionally, the contact surface may face towards the first end.

Optionally, the contact surface may face away from the first end.

Optionally, the head may extend along a vertical direction perpendicular to the axial direction.

Optionally, when the body is in the second position, the umbilical cord may be compressed between the contact surface and the base surface.

Optionally, the emergency shutoff assembly may include a ratchetting mechanism configured to permit the body to move from the first position to the second position and to prevent the body from moving from the second position to the first.

Optionally, the emergency shutoff assembly may include a lid disposed adjacent the second end of the body and configured to be selectively opened or closed, wherein when the lid is open, the lid is not covering the actuator, and when the lid is closed, the lid is covering the actuator.

Optionally, the emergency shutoff assembly may be configured to be disposed within a cannulation chamber of a fetal chamber assembly.

According to another aspect of the disclosure, a blood sensor assembly configured to detect presence of blood in a fluid within a fetal chamber assembly includes a sensor configured to detect presence of blood and a housing configured to receive the fluid and to direct the fluid to the sensor. The housing has a sensing chamber adjacent the sensor, the sensing chamber being configured to receive the fluid therein; a funnel configured to direct the fluid to the sensing chamber, the funnel having a first opening at a first end and a second opening at a second end, the second end being adjacent to the sensing chamber; and a wall extending between the first end and the second end, the wall being tapered from the first end towards the second end, such that the first opening is larger than the second opening.

Optionally, the housing may include a plurality of walls. Optionally, the housing may have four walls.

Optionally, the sensor may be an optical sensor. The sensor may include a camera, a light source, and a reflective surface, wherein the reflective surface is disposed opposite the camera and the light source, the reflective surface having a first color. The sensor may be configured to detect a second color different from the first color. The blood sensor assembly may be configured to associate the second color with a predetermined range of colors.

Optionally, if the sensor detects the second color within the predetermined range of colors, the blood sensor assembly may be configured to trigger an alert.

Optionally, the sensor may include a processor configured to quantify presence of blood within the fluid based on hue, saturation, and value parameters detected by the sensor.

In some aspects, the blood sensor may be an optical sensor that detects the presence of blood by the absorption of specific spectral lines by the blood constituents and the relative intensity of specific wavelengths. The sensor may emit different wavelengths alternately and detect the transmitted or reflected intensity. The sensor may emit multiple wavelengths simultaneously and filtered detectors measure the intensity of specific wavelengths.

Optionally, if the sensor detects the predetermined relative intensity, the blood sensor assembly may be configured to trigger an alert.

According to another aspect of the disclosure, a method of varying volume inside a growth chamber of a fetal chamber assembly configured to receive a fetus is disclosed. The growth chamber defines a fetal space between a top membrane and a bottom membrane opposite the top membrane, the fetal space being configured to receive a first fluid, the growth chamber defining a fluid pocket between the bottom membrane and a growth membrane, the fluid pocket being configured to receive a second fluid. The method includes introducing the first fluid into the fetal space; introducing the second fluid into the fluid pocket; changing the amount of the second fluid in the fluid pocket to transition the fluid pocket from a first pocket volume to a second pocket volume different from the first pocket volume; and transitioning the fetal space from a first fetal volume to a second fetal volume different from the first fetal volume.

Optionally, changing the amount of the second fluid may include decreasing the amount of the second fluid, such that the second pocket volume is smaller than the first pocket volume.

Optionally, transitioning the fetal space may include increasing the volume, such that the second fetal volume is greater than the first fetal volume.

Optionally, the step of changing the amount of the second fluid may cause the step of transitioning the fetal space.

Optionally, the step of changing the amount of the second fluid may include flowing the second fluid through a fluid pocket port in fluid communication with the fluid pocket.

Optionally, the steps of changing the amount of the second fluid and transitioning the fetal space may be performed if the fetus has a predetermined weight.

Optionally, the steps of changing the amount of the second fluid and transitioning the fetal space may be performed after a predetermined time period elapses.

Optionally, the method of varying the volume may include introducing a fetus into the fetal space.

According to another aspect of the disclosure, a method of occluding blood flow through an umbilical cord of a fetus using an emergency shutoff assembly is disclosed. The emergency shutoff assembly has a body extending along an axial direction between a first end and a second end and a head extending away from the body. The method includes the steps of providing the umbilical cord adjacent the body; moving the body in a first direction to cause the head to contact the umbilical cord; and compressing the umbilical cord using the head, such that blood flow is blocked through the umbilical cord.

Optionally, moving the body may include moving an actuator operatively connected to the body.

Optionally, the actuator may be a handle, and moving the actuator may include pulling the handle.

According to another aspect of the disclosure, a method for removing meconium from a growth chamber of a fetal chamber assembly includes the steps of inserting a catheter into the growth chamber through a meconium removal port defined on the growth chamber; moving the inserted catheter in a first direction within the growth chamber; turning the catheter into a second direction different from the first direction; and suctioning the meconium through the catheter out of the growth chamber.

Optionally, the method of removing meconium may further include removing a cap from the meconium removal port prior to the step of inserting the catheter.

Optionally, the method of removing meconium may further include removing the catheter from the growth chamber through the meconium removal port.

Optionally, the method of removing meconium may further include introducing the cap into the meconium removal port after the step of removing the catheter from the growth chamber.

Optionally, the step of inserting the catheter may include inserting the catheter through a one-way valve disposed in the meconium removal port.

Optionally, the method of removing meconium may include the step of inserting an adapter into the meconium removal port, the adapter defining a passaged extending therethrough and being configured to receive the catheter into, through, and out of the passage. Optionally, the adapter may include an opening in fluid communication with the passage and through which the catheter is configured to move, the opening facing in a direction in which the catheter will be moved. The step of moving the catheter in the first direction may include orienting the opening of the adapter in the first direction, and wherein the step of turning the catheter includes orienting the opening in the second direction.

The method of removing meconium may further include removing the adapter from the meconium removal port.

According to another aspect of the disclosure, a method of removing air from a growth chamber through an air removal port disposed on the growth chamber includes directing the air in the growth chamber towards the air removal port until the air is adjacent the air removal port; and opening the air removal port such that the air leaves through the air removal port.

Optionally, directing the air may include rotating the growth chamber. Rotating the growth chamber may include orienting the growth chamber such that the air removal port is at the highest point of the growth chamber relative to gravity.

Optionally, directing the air may include pushing onto the growth chamber to force the air to move towards the air removal port.

Optionally, the method of removing air may include closing the air removal port after the air has been moved out of the air removal port.

BRIEF DESCRIPTION OF THE DRAWINGS

The present application is further understood when read in conjunction with the appended drawings. For the purpose of illustrating the subject matter, there are shown in the drawings exemplary aspects of the subject matter; however, the presently disclosed subject matter is not limited to the specific methods, devices, and systems disclosed. In the drawings.

Aspects of the disclosure will now be described in detail with reference to the drawings, wherein like reference numbers refer to like elements throughout, unless specified otherwise.

DETAILED DESCRIPTION OF ILLUSTRATIVE EMBODIMENTS

Figure 1:
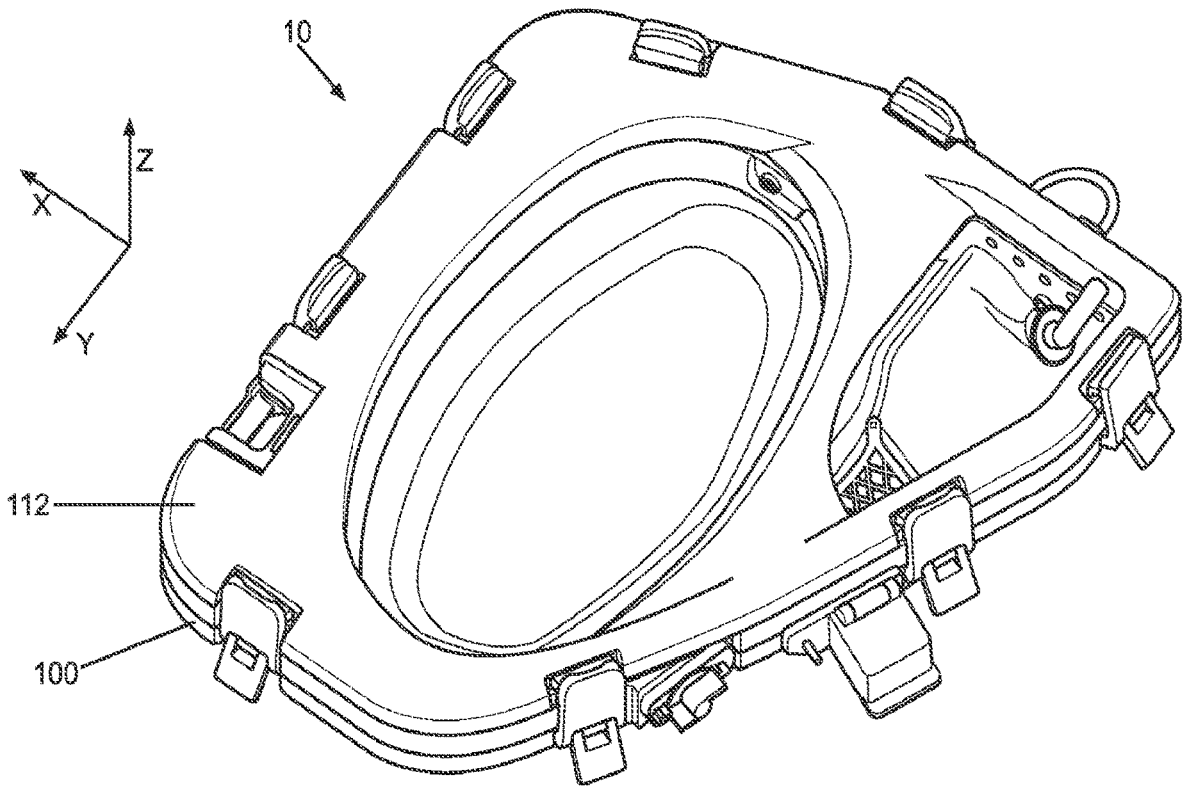
FIG. 1 illustrates a perspective view of a fetal chamber assembly according to an aspect of this disclosure.

Systems disclosed in this application are configured to provide extracorporeal support to a premature neonate. Throughout this application, "fetus" and "neonate" may be used interchangeably, and it is to be understood that the descriptions herein are not limited solely to one term or the other. The term "fetus" may be used to describe both an in vivo fetus in a womb and a fetus or neonate that has been removed from the womb. These systems may provide an environment that is similar to an environment the premature fetus would experience in utero. Viability of a premature fetus that is removed from the uterine environment and that is, for example, between about 22 weeks to about 24 weeks gestation, may be increased by placing the premature fetus in the disclosed system environments. According to some aspects of the disclosure, the system environment may be configured to: 1) limit exposure of the premature fetus to light; 2) limit exposure of the premature fetus to sound; 3) maintain the fetus submerged within a liquid environment;

4) maintain the premature fetus within a desired temperature range; or 5) any combination thereof.

The premature neonate may be kept in a suitable environment for a specific length of time to allow the neonate to develop. The environment is preferably as close to that of a natural womb as possible so that the neonatal development is similar to that of a fetus still in the womb. When the fetus is removed from the womb, the fetus may be placed into a fetal growth and development system that mimics, at least in part, a natural womb. The fetal system can maintain temperature, liquid, gas exchange, light exposure, physical stimulation, and other parameters that may be advantageous to fetal development. Blood vessels in the fetus may be connected to an external circulation system. The blood vessels may be cannulated by a suitable mechanism and method of cannulation, such that the fetus' blood can be moved from the fetus to the external circulation system (e.g. through a first blood vessel in the fetus), through the external circulation system, and then back to the fetus (e.g. through a second blood vessel in the fetus). The fetal system may be configured such that the fetus can remain therein for days, weeks, or months while the fetus is growing and developing. The fetal system may be disposed within, and be a part of, a larger assembly or system that maintains parameters of the chamber that are advantageous to the development of the fetus. Necessary nutrients, gases, and liquids may be delivered to the fetal chamber through connected systems, and waste may be removed from the fetal system through the one or more connected systems.

Various aspects of fetal systems and other related systems are disclosed throughout this application. In an exemplary preferred embodiment, such as that shown in FIGS. 1 and 2, a fetal chamber assembly 10 includes a base 100 and a lid 112. A growth chamber 120, which is configured to receive the fetus 1 therein, is defined in the interior space 104 between the base 100 and the lid 112. The fetus' cannulated umbilical cord 2 is disposed in a cannulation chamber 150, which has a wall structure that forms an opening into the growth chamber 120. In the preferred embodiment shown, the growth chamber 120 is configured to be adjustable in size to receive fetuses of different sizes and to accommodate growth of the fetus during the gestation period while the fetus is in the fetal chamber assembly 10. Liquid that has preferred characteristics for fetal development is introduced and flowed through the growth chamber 120 and the cannulation chamber 150. The fetus 1 may be housed in the fetal chamber assembly 10 for a desired time until it reaches a predetermined gestational stage, and the fetus 1 is monitored and maintained during the developmental process in the system 10. The fetal chamber assembly 10 may include various sensors and ports that will be described in detail below, which aid in monitoring and maintaining fetal vitals and conditions of the system 10, introducing necessities for fetal development, and removing contaminants or components of the system 10 as needed.

Figure 2:
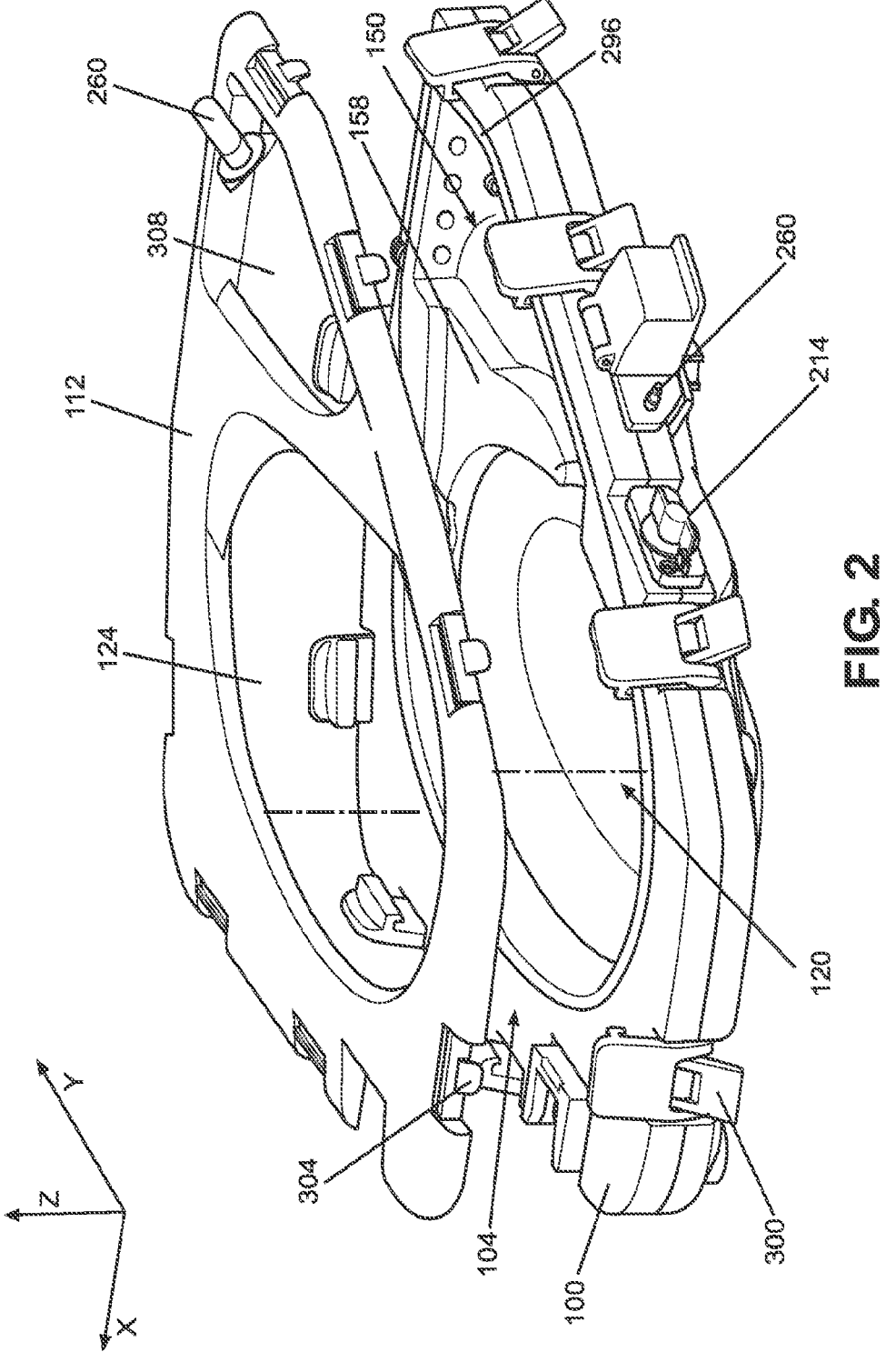
FIG. 2 illustrates the fetal chamber assembly of FIG. 1 showing the lid spaced from the base.

As shown in FIGS. 1 and 2, a fetal chamber assembly 10 includes a base 100 and a lid 112. The lid 112 may be removably affixed to the base 100, such that the lid 112 can selectively form a fluid-tight seal between the lid 112 and the base 100. The system 10 may have a closed configuration, in which the lid 112 and the base 100 form a liquid-tight seal therebetween, and an open configuration, in which a liquid-tight seal does not exist between the lid 112 and the base 100. In some aspects, the lid 112 may be entirely removable from the base 100, such that the lid 112 is not contacting, and is spaced from, the base 100. In some aspects, the lid 112 may be hingedly attached to the base 100, such that the lid 112 may pivot, along the hinged attachment, towards or away from the base 100. In some aspects, the hinged attachment (not shown) may be releasable such that the lid 112 may be entirely separated from the base 100.

Figure 6:
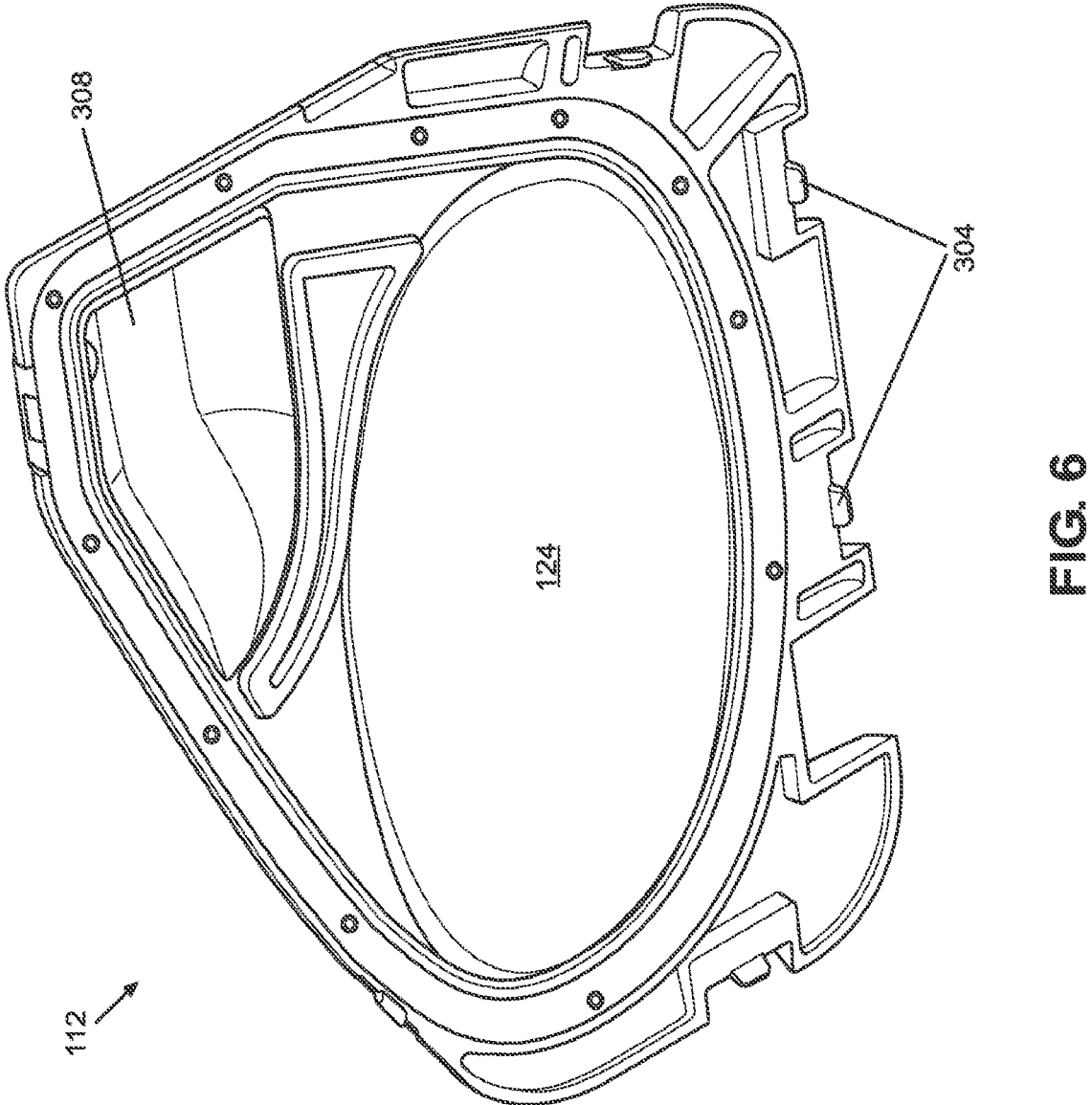
FIG. 6 illustrates a perspective view of the lid of the fetal chamber assembly of FIGS. 1-5 according to an aspect of the disclosure.

In some embodiments, the lid 112 may be configured to be affixed to the base 100 via one or more locking elements that may be selectively locked or unlocked to affix or detach, respectively, the lid 112 to or from the base 100. In some exemplary embodiments (see, e.g., FIG. 2), the base 100 may include one or more clasps 300 disposed thereon, and the lid 112 may include one or more protrusions 304 designed to be clasped by a clasp 300 disposed thereon. A different view of the lid 112 is depicted in FIG. 6. The clasps 300 on the base 100 may be configured to releasably engage with the protrusions 304 on the lid 112. It will be appreciated that other locking elements are envisioned, and this disclosure is not intended to be limited to the particular locking elements 300, 304 depicted in the figures, and that the clasps 300 can be reversed such that the clasps 300 are on the lid 112 and the protrusions 304 are on the base 100. The system 10 may include a plurality of locking elements, and the plurality of locking elements may be the same locking elements or may include different types of locking elements. Although the figures depict eight clasps 300 configured to engage with eight protrusions 304, it will be understood that another suitable number of respective base and lid closure elements can be utilized, such as 1, 2, 3, . . . 10, or another suitable number of closure elements. Easy and quick removal of the lid 112 may be beneficial in case of a medical emergency, in which a user needs to access the fetus within the interior of the fetal chamber assembly 10.

Figure 3:
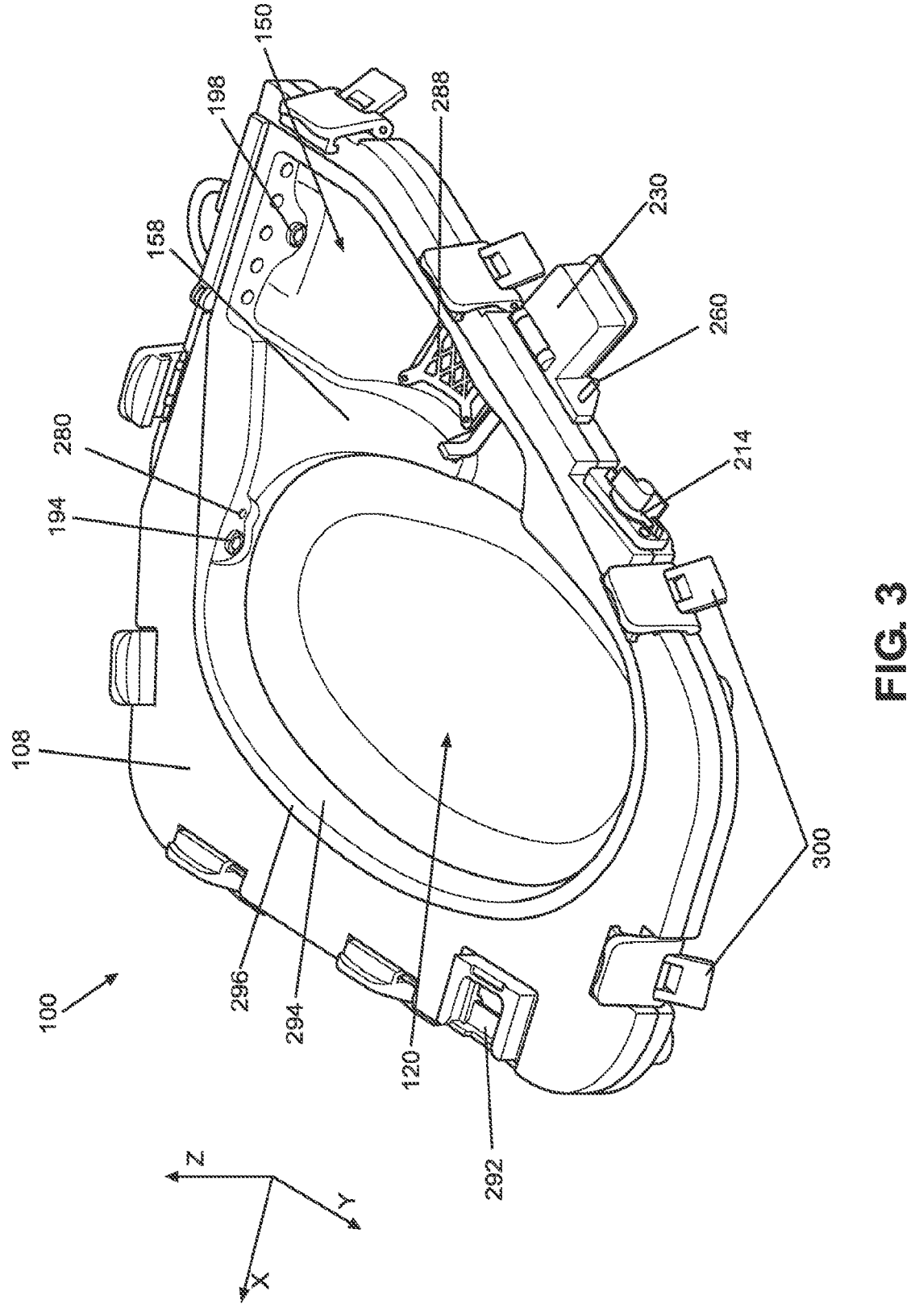
FIG. 3 illustrates a perspective view of a base of the fetal chamber assembly of FIGS. 1 and 2 according to an aspect of the disclosure.
Figure 4:
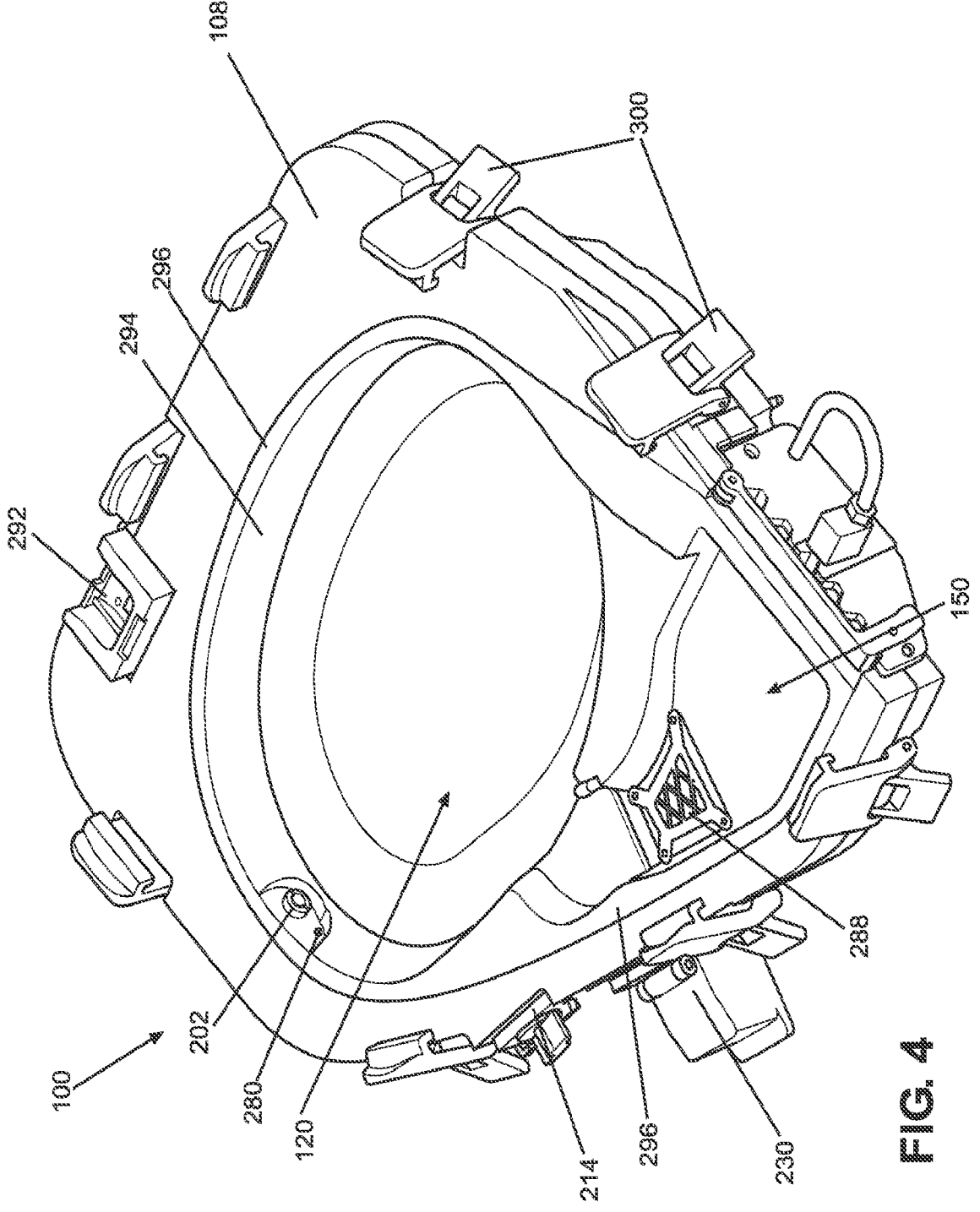
FIG. 4 illustrates another perspective view of the base of FIG. 3.
Figure 5:
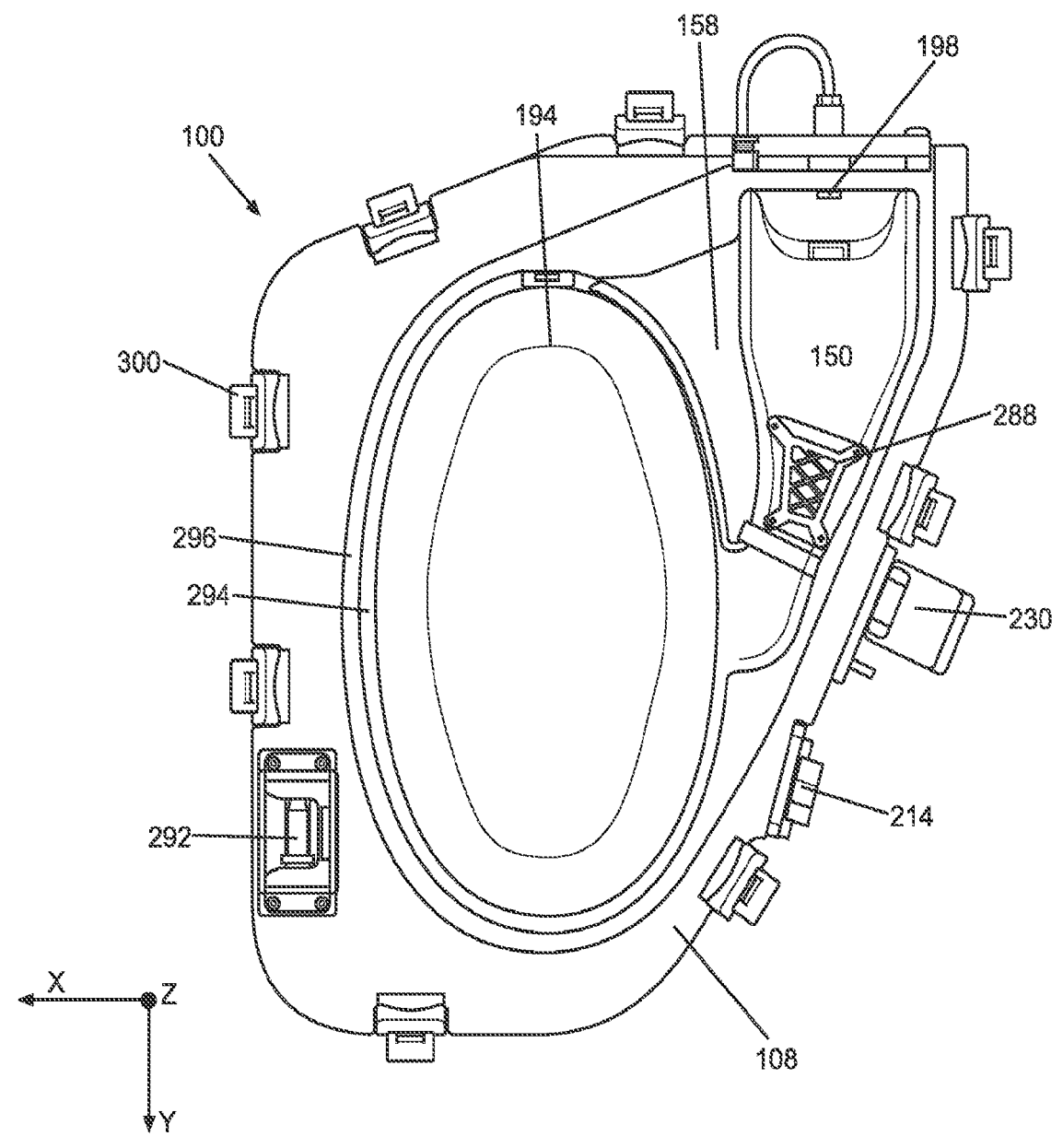
FIG. 5 illustrates a top plan view of the base of FIGS. 3 and 4.

Referring to FIGS. 3-5, a base 100 is depicted according to an aspect of the disclosure. The base 100 includes a housing 108 that provides rigid structure to the base 100 and may include various ports, sensors, and channels therein, as will be described in detail later. The base 100 further includes a growth chamber 120 configured to receive the fetus therein and a cannulation chamber 150 configured to receive the fetus's cannulated umbilical cord. Suitable liquid is introduced into the system 10, for example into the housing 108, such that the liquid flows through the growth chamber 120 and through the cannulation chamber 150. The liquid may be physiological saline solution (PSS) that is composed of elements necessary for desired fetal development and that has physical and chemical parameters that are beneficial to fetal growth. In some aspects, the PSS may include synthetic amniotic fluid. It will be appreciated that the liquid may include one or more gases dissolved therein.

The growth chamber 120 may be surrounded, at least in part, by the housing 108. In some aspects, the growth chamber 120 may be disposed in an opening extending through the housing 108 along a vertical direction z. The growth chamber 120 may be separated from the housing by a seal 296 extending along at least a portion of the growth chamber 120. The seal 296 in the base 100 may be configured to releasably contact the lid 112 to form a liquid-tight seal between the base 100 and the lid 112. In some examples, the lid 112 may include a respective seal (not shown) configured to contact the seal 296 on the base 100. A first inlet 194, for introducing the PSS or a related liquid into the growth chamber, and an outlet 202, for discharging the PSS or related liquid from the growth chamber, are defined on the growth chamber 120. In some aspects, the first inlet 194 may be spaced away from the outlet 202 along the longitudinal direction y. It may be preferable to arrange the first inlet 194 and the outlet 202 such that the liquid enters the growth chamber 120 adjacent to the fetus's head, flows substantially along the longitudinal direction y from the fetus's head towards the fetus's feet, and exits the growth chamber 120 adjacent the fetus's feet. The arrangement of the liquid inlets and outlets will be further discussed below.

Figure 7:
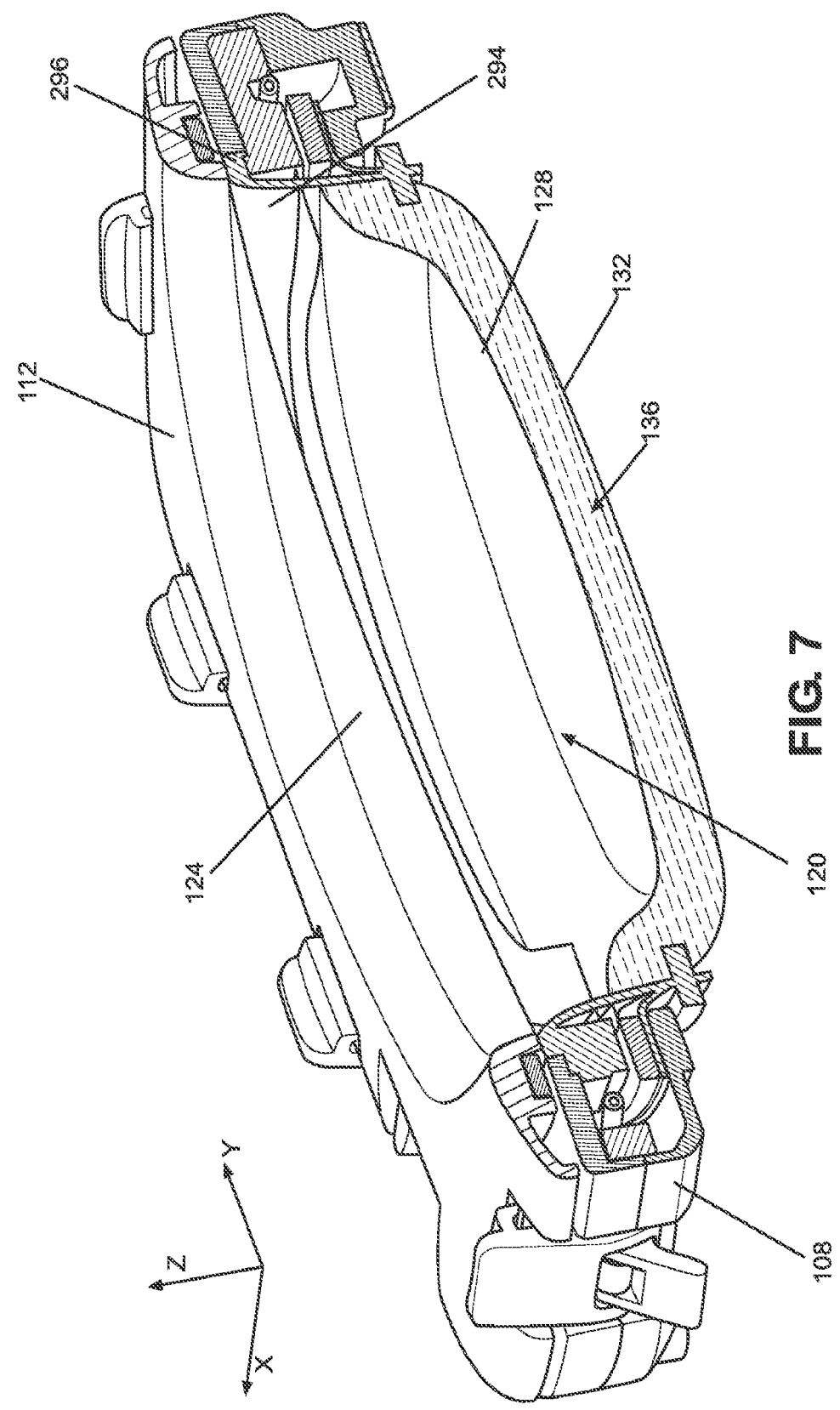
FIG. 7 illustrates a cross-sectional perspective view of the fetal chamber assembly of FIGS. 1-6.
Figure 8:
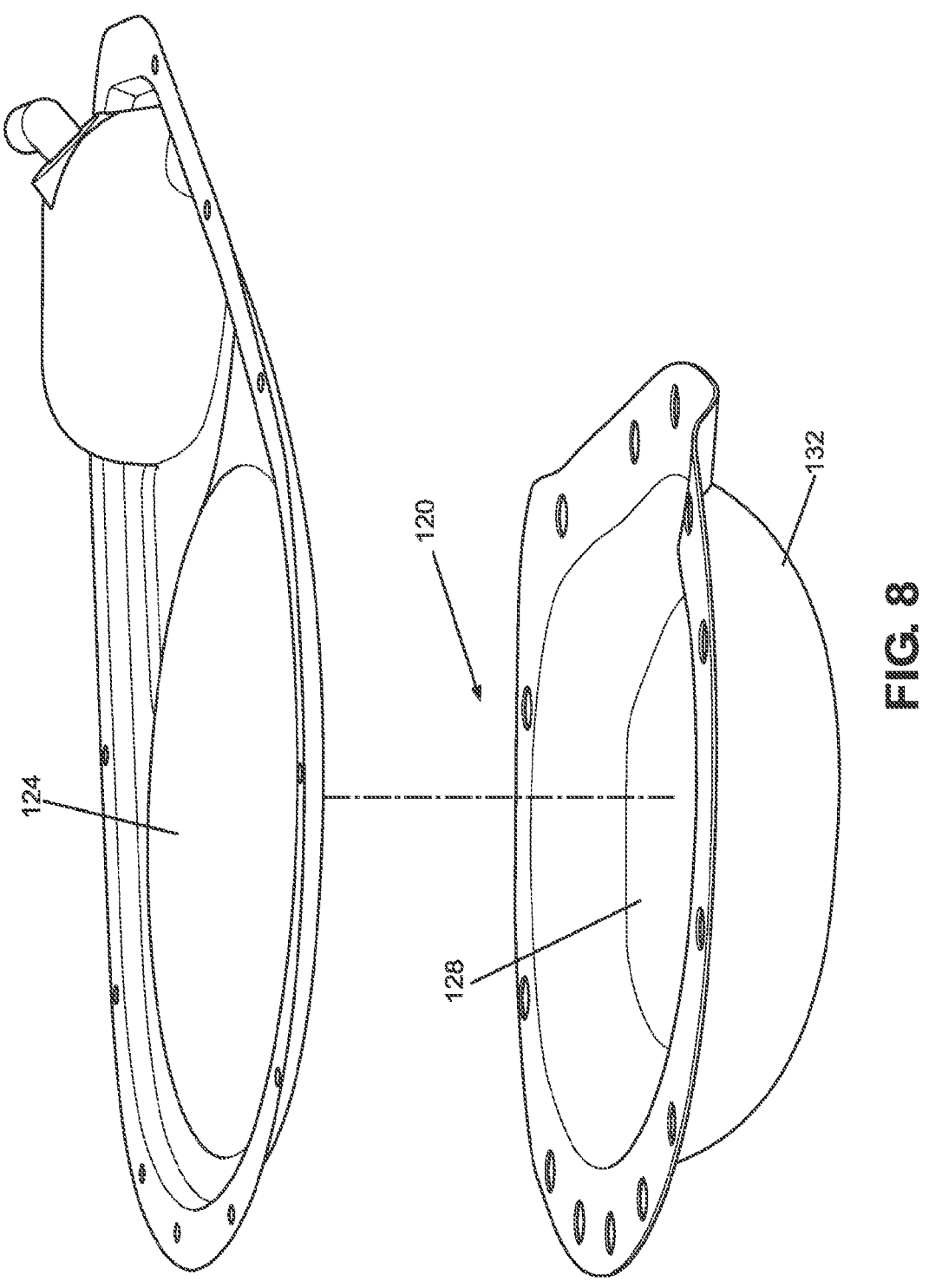
FIG. 8 illustrates a perspective view of a growth chamber according to an aspect of this disclosure showing the top membrane spaced from the bottom and growth membranes.
Figure 9:
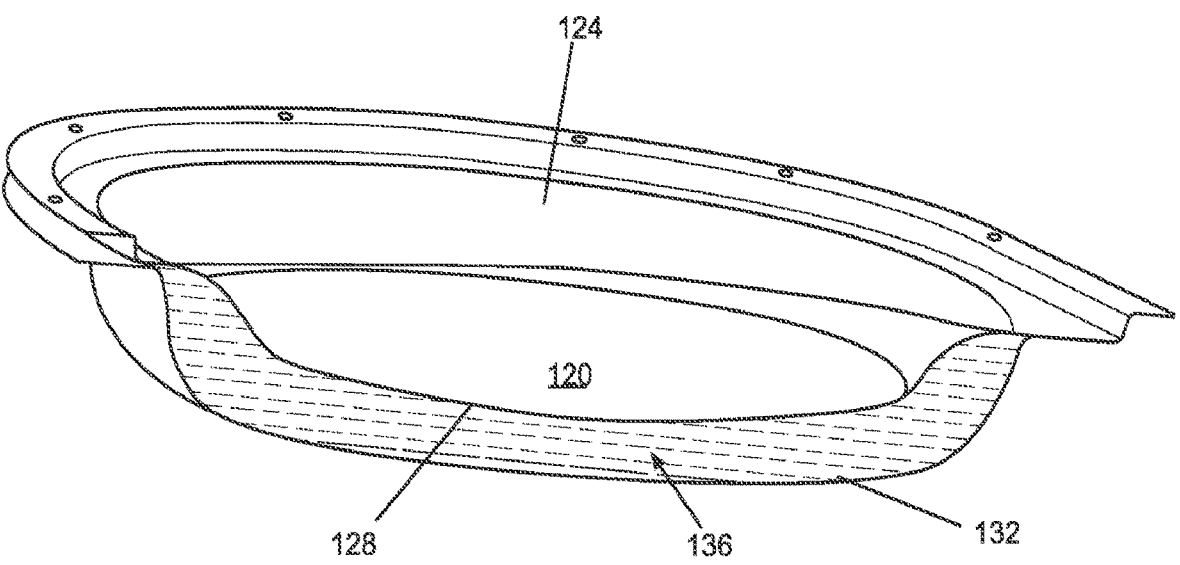
FIG. 9 illustrates a cross-sectional perspective view of the growth chamber of FIG. 8 showing the top membrane contacting the bottom membrane.

The growth chamber 120 is configured to receive and contain the fetus therein for the duration of the fetal development within the system 10. Referring to FIG. 7, which shows a cross-sectional view of the system 10 in a closed configuration, the growth chamber 120 is defined, at least in part, by a bottom membrane 128 attached to the housing 108 and by a top membrane 124 disposed in the lid 112. In some aspects, the growth chamber 120 may be further defined by the seal 296 extending circumferentially around the growth chamber 120. The seal 296 may include thereon one or more bumpers 294 that extend inward towards the growth chamber 120 and serve as physical barriers that the fetus may contact when in the growth chamber 120. The bumpers 294 are configured be soft and malleable enough so as to deform or yield when contacted by the fetus. The bumpers 294 separate the growth chamber from the rigid housing 108 and protect the fetus from incurring injury by contacting any sharp corners or rigid portions of the housing 108. The bumpers 294 may extend at least partly around the growth chamber 120. The bumpers 294 may extend between the bottom membrane 128 and the top membrane 124 along the vertical direction z. In some embodiments, the bumpers 294 may be disposed at the exterior of the growth chamber 120, such that at least one of the top membrane 124 and the bottom membrane 128 is disposed between the bumpers 294 and the fetus located inside the growth chamber 120.

Referring generally to FIGS. 7-10, the top membrane 124 of the growth chamber 120 is spaced from the bottom membrane 128 along the vertical direction z. In practice, the fetus may be placed into the growth chamber 120, for example onto the bottom membrane 128. The growth chamber 120 is configured to receive the fetus in the space between the top membrane 124 and the bottom membrane 128. When the system 10 is moved to the closed configuration and the lid 112 is affixed to the base 100, the top membrane 124 is moved over top of the fetus and the bottom membrane 128. The top and bottom membranes 124, 128 may have the same shape or may have different shapes. For example, as shown in the figures, the bottom membrane 128 may be concave, being depressed in the vertical z direction away from the top membrane 124. The concave shape may facilitate placement of the fetus onto the bottom membrane 128. The top membrane 124 may be substantially flat in the plane defined by the transverse direction x and the longitudinal direction y. In some aspects, the top membrane 124 may be concave with the concavity extending in the vertical z direction away from the bottom membrane 128 (i.e. opposite of the concavity extending from the bottom membrane 128). The top membrane 124, the bottom membrane 128, or both membranes may be configured to stretch and extend upon application of a force, for example in the vertical z direction such that the one of, or each of, the concavities is deepened in the respective direction. In some preferred embodiments, the bottom membrane 128 may be configured to extend so as to deepen its concavity. This can increase the volume of the growth chamber 120.

Growth Chamber

The growth chamber 120 may be configured to vary in size based on parameters of the system 10. This may be advantageous to allow the growth chamber 120 to accommodate fetuses of different sizes and also to accommodate a fetus as it grows during its residence in the system 10. In some scenarios, it is medically preferable to house the fetus in a growth chamber that is commensurate with the fetus's size. That is, it may not be preferable to receive and retain the fetus in a growth chamber that is too large. Specifically, in some aspects, it may be preferable to ensure that the fetus is not disposed in a volume that is unnecessarily large in which the fetus can be exposed to undesirable movement or getting entangled in the umbilical cord. Such entanglement may result in unwanted pressure or load to be applied to the umbilical cord, resulting in occlusion of the blood flow through the cord. It may be medically desirable to ensure that the fetus is in a small enough space that the fetus is prevented from excessive or potentially harmful shifting and repositioning within the growth chamber 120 during gestation. Such repositioning may cause injury to the fetus, strain or damage to the umbilical cord, or accidental decannulation of the umbilical cord. Conversely, it is not preferable to retain a fetus in a growth chamber that is too small for the fetus. Constricting the fetus in the growth chamber 120 may increase pressure on the fetus or hinder desired physical growth of the fetus. Controlling the fetus's positioning also helps keep the head of the fetus away from regions in the growth chamber 120 with increased risk of meconium discharge. Furthermore, controlling position of the fetus allows for various sensors and transducers to be disposed in the system 10 relative to where the fetus is expected to be positioned within the growth chamber 120. As such, it is advantageous for the system 10 to have a growth chamber 120 that can be changed in size to accommodate fetuses of varying sizes. It is further preferable to have the capability to increase the size of the growth chamber 120 to correspond to a corresponding increase in size of the fetus as the fetus grows during its residence in the system 10.

The growth chamber 120 may be configured to vary between a plurality of different volumes, with each separate volume being associated with a corresponding size of the fetus. Referring generally to FIGS. 7-12, the growth chamber 120 may have a top membrane 124 and a bottom membrane 128, as described above. The growth chamber 120 may further include a growth membrane 132 spaced away from the bottom membrane 128 generally along the vertical z direction. In some aspects, the growth membrane 132 may be disposed such that the bottom membrane 128 is arranged between the top membrane 124 and the growth membrane 132. In some preferred embodiments, the bottom membrane 128 and the growth membrane 132 may be affixed to each other along their respective perimeters, for example, by welding, heat sealing, clamping, adhesive, or another suitable fastening mechanism.

A fluid pocket 136 is defined between the bottom membrane 128 and the growth membrane 132. The fluid pocket 136 is configured to receive a fluid therein such that the fluid is retained between the bottom membrane 128 and the growth membrane 132. The fluid may include liquid and/or gas. In some preferred embodiments, the fluid is a liquid, for example, saline. In some aspects, it may be preferable for the fluid in the fluid pocket 136 to be liquid to allow diagnostic tests to be run on the growth chamber 120, such as ultrasound. It will be appreciated that the fluid may alternatively include a gas in some embodiments. The fluid inside the fluid pocket 136 is a static fluid that is not configured to contact the interior of the growth chamber 120, the fetus inside the growth chamber 120, or any liquid or components in the growth chamber 120.

Figure 10:
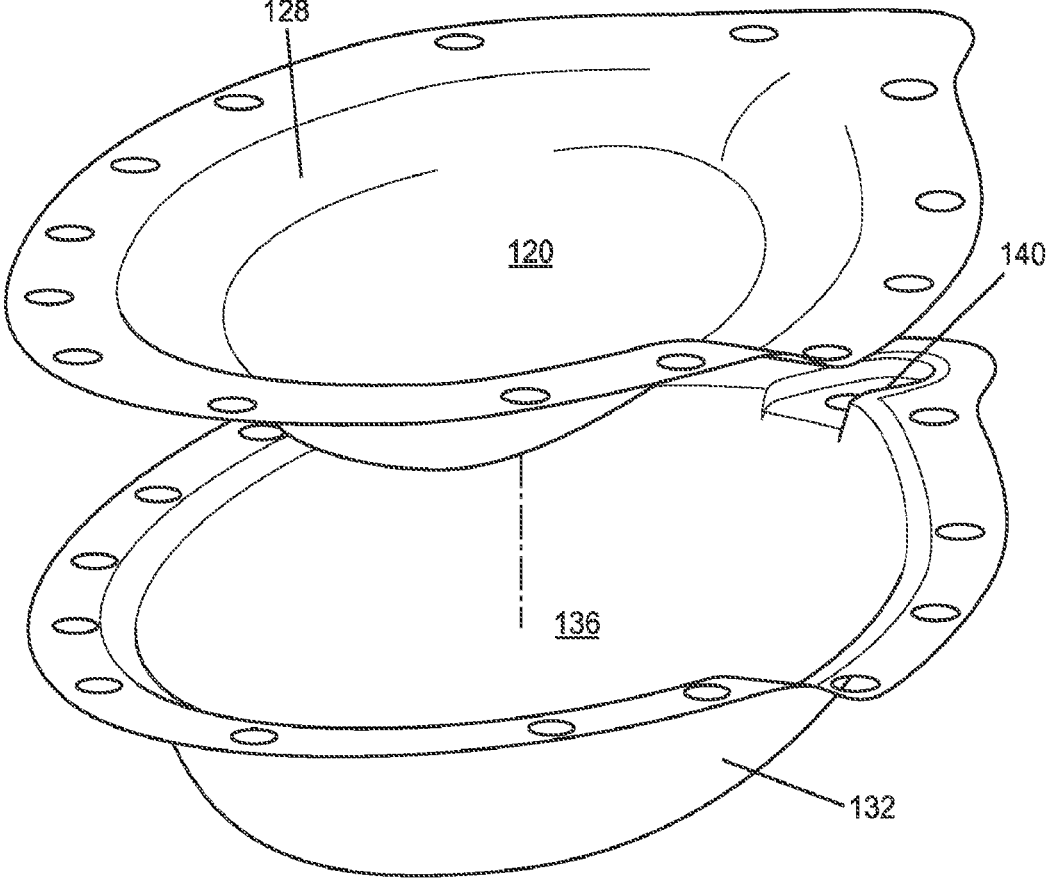
FIG. 10 illustrates an exploded view of the bottom membrane and the growth membrane of the growth chamber of FIGS. 8 and 9.

The fluid may be introduced into the fluid pocket 136 via a fluid pocket port 140 disposed on the growth chamber 120 and being in fluid communication with the fluid pocket 136 (shown in FIG. 10). In some aspects, the fluid pocket port

140 may be disposed on the bottom membrane 128. In other aspects, the fluid pocket port 140 may be disposed on the growth membrane 132. In some aspects, the fluid pocket port 140 may be disposed between the bottom membrane 128 and the growth membrane 132. The more fluid is introduced into the fluid pocket 136, the greater the volume is in the fluid pocket 136. During operation of the system 10, the fluid may be selectively added to or removed from the fluid pocket 136.

Figure 11:
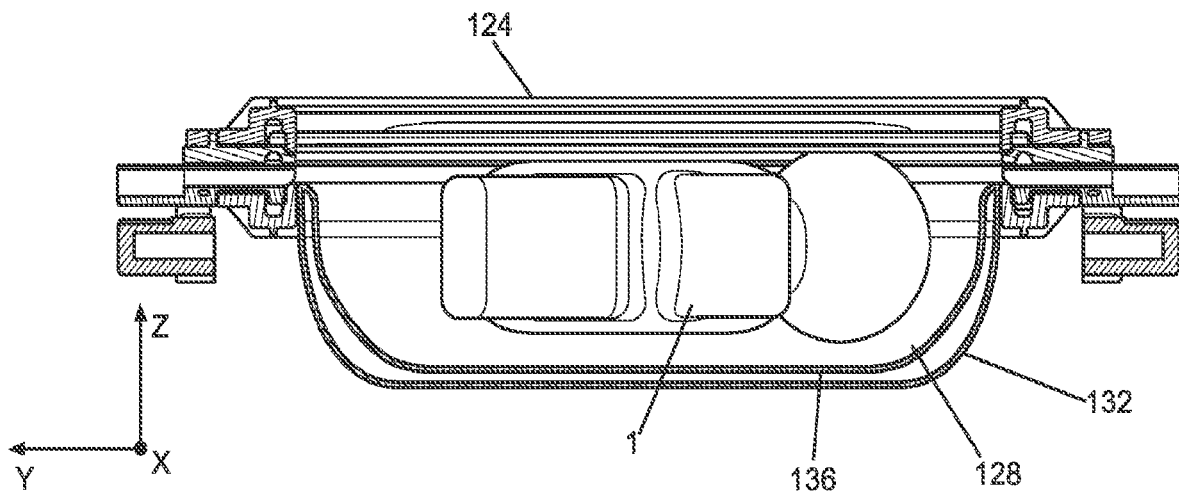
FIG. 11 illustrates a side view of a fetal chamber assembly according to an aspect of the disclosure, showing a growth chamber having a first volume.
Figure 12:
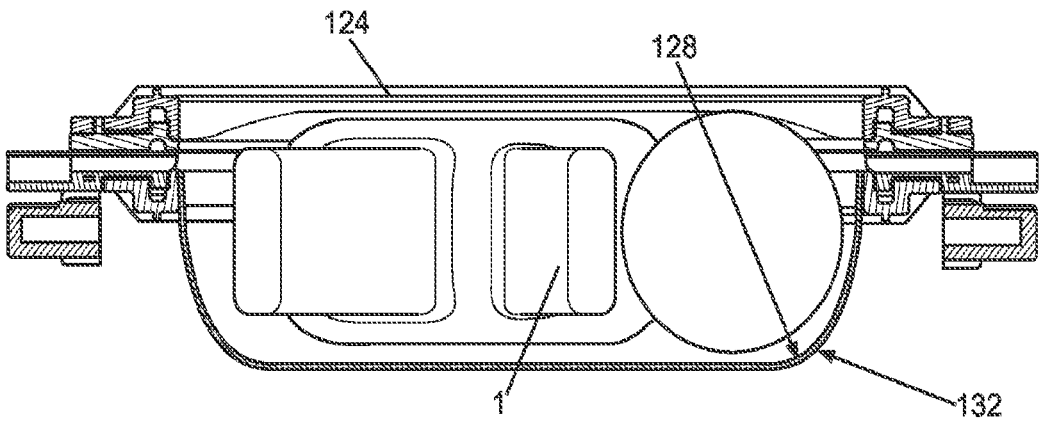
FIG. 12 illustrates a side view of the fetal chamber assembly of FIG. 11, showing the growth chamber having a second volume.

The growth chamber 120 is configured to have at least a first volume and a second volume that is different from the first volume. It will be appreciated that the growth chamber 120 may be configured to be adjusted to have any plurality of different volumes, and reference to a first or second volume is meant as a descriptive comparison of two volumes of the growth chamber 120. Referring to FIG. 11, an exemplary configuration of the growth chamber 120 is depicted having a first volume. The first volume is defined between the bottom membrane 128 and the top membrane 124. The bottom membrane 128 is spaced from the growth membrane 132 via the fluid described above. The first volume is configured to accommodate the fetus 1 having a first size. Referring to FIG. 12, an exemplary configuration of the growth chamber 120 is depicted having a second volume that is greater than the first volume. The second volume is configured to accommodate the fetus 1 having a second size that is greater than the first size. As shown in FIG. 12, the bottom membrane 128 need not be spaced from the growth membrane 132—this means that there is no fluid in the fluid pocket 136. As such, FIG. 12 depicts the largest possible volume for the embodiment of the growth chamber 120 depicted in FIGS. 11 and 12.

The specific volume of the growth chamber 120 may be inversely proportionate to the volume of the fluid pocket 136. That is, as more fluid is introduced into the fluid pocket 136, and the volume of the fluid pocket 136 is increased, the volume of the growth chamber 120 configured to receive the fetus therein is decreased. Conversely, as fluid is removed from the fluid pocket 136, and the volume of the fluid pocket 136 is decreased, the volume of the growth chamber 120 is increased. The volume of the growth chamber 120 may be defined between the top membrane 124 and the bottom membrane 128. The growth chamber 120 may be configured to change in volume along the vertical z direction, along the transverse x direction, along the longitudinal y direction, or along a combination of some or all directions. In some aspects, the volume in the growth chamber 120 may be varied in three dimensions, such that when the growth chamber volume is increased, the growth chamber 120 increases in size along the vertical z, transverse x, and longitudinal y directions, and when the growth chamber volume is decreased, the growth chamber 120 decreases in size along the vertical z, transverse x, and longitudinal y directions.

The fetus 1 may be disposed onto the bottom membrane 128, specifically on the side of the bottom membrane 128 that faces towards the top membrane 124 and that defines the volume of the growth chamber 120. The opposite side of the bottom membrane 128, which defines, in part, the fluid pocket 136, may contact the fluid in the fluid pocket 136. The fluid in the fluid pocket 136 supports the bottom membrane 128. In the aspects depicted in FIGS. 7-12, the fluid pocket 136 is arranged below the bottom membrane 128 along the vertical direction z. For purposes of this disclosure, the vertical direction z may have a non-zero vector component that is parallel to gravity. In some aspects, the vertical direction z is entirely parallel to gravity. So, the bottom membrane 128, which is disposed vertically above and is supported by the fluid in the fluid pocket 136 is being acted on by gravity along the vertical direction z, and the fluid in the fluid pocket 136 exerts a reactionary normal force on the bottom membrane 128 commensurate with the weight of the bottom membrane 128. The fetus 1, as well as any other components of the system 10, such as physiological saline solution (PSS), that are disposed on the bottom membrane 128 are similarly acted on by gravity along the vertical direction z against the fluid in the fluid pocket 136. As the amount of fluid in the fluid pocket 136 is decreased, the level of support of the bottom membrane 128 by the fluid in the fluid pocket 136 similarly decreases. As such, due to gravity, the bottom membrane 128 stretches, deforms, and/ or unfolds to expand, along the transverse x and/or longitudinal y directions, and sag farther down, along the vertical direction z, towards the fluid pocket 136. As the bottom membrane 128 moves downward along the vertical direction z away from the top membrane 124, the volume inside the growth chamber 120 increases. Conversely, if the amount of fluid in the fluid pocket 136 is increased, the level of support of the bottom membrane 128 similarly increases, and the bottom membrane is propped upward along the vertical direction z towards the top membrane 124, which, in turn, decreases the volume of the growth chamber 120 defined between the top and bottom membranes 124, 128. In one embodiment, therefore, the bottom and growth membranes 128, 132 function as a variable-volume bladder mechanism.

In operation, when the fetus 1 is introduced into the growth chamber 120, the fetus 1 has a first size, and the growth chamber 120 has a first volume. The fetus 1 may be introduced onto the bottom membrane 128 along with the PSS and any other constituents of the system 10. The fluid pocket 136 may include a first amount of fluid therein that is configured to provide support to the bottom membrane 128 that opposes gravity and that is commensurate with the weight of the fetus 1, the bottom membrane 128, the PSS, and any other components contacting the bottom membrane 128 inside the growth chamber 120. As the fetus 1 grows to a second size, it may be desirable to increase the volume of the growth chamber 120 by a corresponding amount relative to the growth of the fetus 1. To do this, fluid may be removed from the fluid pocket 136 via the fluid pocket port 140 such that the fluid pocket 136 contains a second amount of fluid therein that is less than the first amount. The decrease in fluid and the physical support provided by the fluid causes the bottom membrane 128 to expand in the one or more transverse x, longitudinal y, and vertical z directions, thus increasing the volume of the growth chamber 120 to a second volume.

The process of adjusting the volume in the growth chamber 120 may be manual or automatic. In some aspects, a user (e.g. doctor or nurse) may selectively introduce or remove fluid into or out of the fluid pocket 136 in order to vary the volume inside the growth chamber 120. In some aspects, a controller and a processor may be configured to communicate with the system 10 in order to automatically add or remove fluid into or out of the fluid pocket 136. The volume adjustment process may be done based on the weight, positioning, age, health condition, or another parameter of the fetus 1. In some aspects, the volume adjustment may be done based on a particular timeline, for example, daily, bidaily, weekly, biweekly, monthly, or the like. In some aspects, the weight of the fetus 1 may be estimated using derived formulas associated with ultrasound measurements of the fetus 1 inside the growth chamber 120.

The top, bottom, and growth membranes 124, 128, 132 may include polyurethanes, polypropylenes, polyethylenes, acrylics, polyvinyl chloride, ethylene vinyl acetate, polyvinylidene chloride, or other plastics or laminated combinations of plastics. In some aspects, the top membrane 124, the bottom membrane 128, the growth membrane 132, two of the above, or all of the above, could include thermoplastic urethanes. In some aspects, the top, bottom, and growth membranes 124, 128, 132 may all include the same materials, or, alternatively, they may be composed of different materials. In some aspects, the thickness of each membrane above may be the same, or, alternatively, thicknesses may vary between at least two of the above membranes. In some specific embodiments, the growth membrane 132 may be thicker than the top membrane 124, the bottom membrane 128, or both. In some embodiments, the growth membrane 132 may be approximately twice as thick as the top membrane 124 and/or the bottom membrane 128. In some aspects, the top, bottom, and/or growth membranes 124, 128, 132 may have a durometer of between about 50 and about 100, between about 60 and about 90, between about 70 and about 80, or in a range overlapping one or more of the above ranges. In some aspects, the membranes 124, 128, and/or 132 may be formed to have a specific shape (see, e.g., FIGS. 8-10). In some aspects, it may be advantageous for the top membrane 124, the bottom membrane 128, and/or the growth membrane 132 to be transparent. In some aspects, it may be advantageous for the top membrane 124, the bottom membrane 128, and/or the growth membrane 132 to be sonolucent, such that ultrasound waves may be permitted to pass therethrough without unwanted interference or echoes.

It will be appreciated that at least the surfaces of the top membrane 124 and the bottom membrane 128 that face each other, define the growth chamber 120, and are configured to contact the fetus 1 are composed of biocompatible materials that are suitable for continued exposure to the fetus 1 and the components of the system 10 in the growth chamber (e.g. the PSS). In some aspects, it may be advantageous to ensure that at least the top and bottom membranes 124, 128 (specifically, at least, the respective surfaces disposed in the interior of the growth chamber 120) to be substantially smooth and devoid of textures or roughness that could otherwise promote bacterial growth thereon.

The particular size, shape, and dimensions of the growth chamber 120 will depend on the intended use, the size of the fetus, and manufacturing constraints. In some exemplary embodiments, the growth chamber 120 may have a first dimension measured along the longitudinal direction y of between about 3 inches and about 20 inches; between about 7 inches and about 16 inches; between about 10 inches and about 12 inches; or in another suitable range. The growth chamber 120 may have a second dimension measured along the transverse direction x of between about 3 inches and about 14 inches; between about 5 inches and about 12 inches; between about 7 inches and about 10 inches; or in another suitable range. The growth chamber 120 may have a third dimension measured along the vertical y direction of between about 2 inches and about 12 inches; between about 4 inches and about 8 inches; or in another suitable range.

Cannulation Chamber

The fetal chamber assembly 10 further includes a cannulation chamber 150 that is configured to communicate with the growth chamber 120 as shown in FIGS. 2-5. The cannulation chamber 150 is configured to receive the umbilical cord from the fetus in the growth chamber 120. The umbilical cord may be cannulated, such that blood vessels in the umbilical cord are connected to respective cannulas. The connected blood vessels may communicate with one or more systems external to the fetal chamber assembly 10, such as an external circulation system, an oxygenator, or other related systems. The cannulation chamber 150 may receive a non-cannulated umbilical cord to be cannulated in the cannulation chamber 150, or, alternatively, may receive an already cannulated umbilical cord. The cannulation chamber 150 may be configured to retain the umbilical cord, and the cannulas connected thereto, in a desired orientation relative to the growth chamber 120, the fetus inside the growth chamber 120, and the rest of the fetal chamber assembly 10. It will be appreciated that the cannulation chamber 150 should be dimensioned to be capable of receiving umbilical cords of various shapes and sizes, including umbilical cords with either a sinistral twist or a dextral twist and with various degrees of coiling.

Having a cannulation chamber 150 that is distinct from the growth chamber 120 allows for the cannulated portion of the umbilical cord to be spaced away from the fetus. This helps decrease risk of the fetus injuring itself by contacting the cannulas or the cannulating devices or by getting tangled in the umbilical cord. It also allows for access to the cannulated portion of the umbilical cord by physicians and staff without having to disturb the fetus in the separate growth chamber.

In some aspects, as depicted in FIGS. 2-5, the cannulation chamber 150 may be disposed in the base 100 of the fetal chamber assembly 10. It will be appreciated that, in alternative aspects, the cannulation chamber 150 may be separate from the base 100 and may be a stand-alone component. When the fetal chamber assembly 10 is closed (i.e. the lid 112 is engaged with the base 100), the cannulation chamber 150 may be defined between the base 100 and the lid 112. In some embodiments, a cannulation chamber membrane 308 may be disposed on the lid 112 and may be arranged generally above the cannulation chamber 150 along the vertical direction z. In such embodiments, the cannulation chamber 150 may be defined, at least in part, between the base 100 and the cannulation chamber membrane 308 in the lid 112. The cannulation chamber membrane 308 may be substantially the same as the top membrane 124 described above with relation to the growth chamber 120. In some aspects, the cannulation chamber membrane 308 may be separated from the top membrane 124 on the lid. In alternative embodiments, the cannulation chamber membrane 308 and the top membrane 124 may be a single, unitary component.

In some preferred embodiments, the seal 296 that extends at least partly around the growth chamber 120 may also extend at least partly around the cannulation chamber 150. As shown in FIGS. 2-5, for example, in some aspects, the seal 296 may extend circumferentially around both the growth chamber 120 and the cannulation chamber 150, such that the growth chamber 120 and the cannulation chamber 150 are circumferentially enclosed within the seal 296. It will be understood that separate seals may be used instead, and that the particular arrangement of the seal 296 depicted in the figures is not intended to be limiting. For example, in some aspects, a first seal may be configured to encompass at least a portion of the growth chamber 120, while a second, separate seal may be configured to encompass at least a portion of the cannulation chamber 150.

Figure 13:
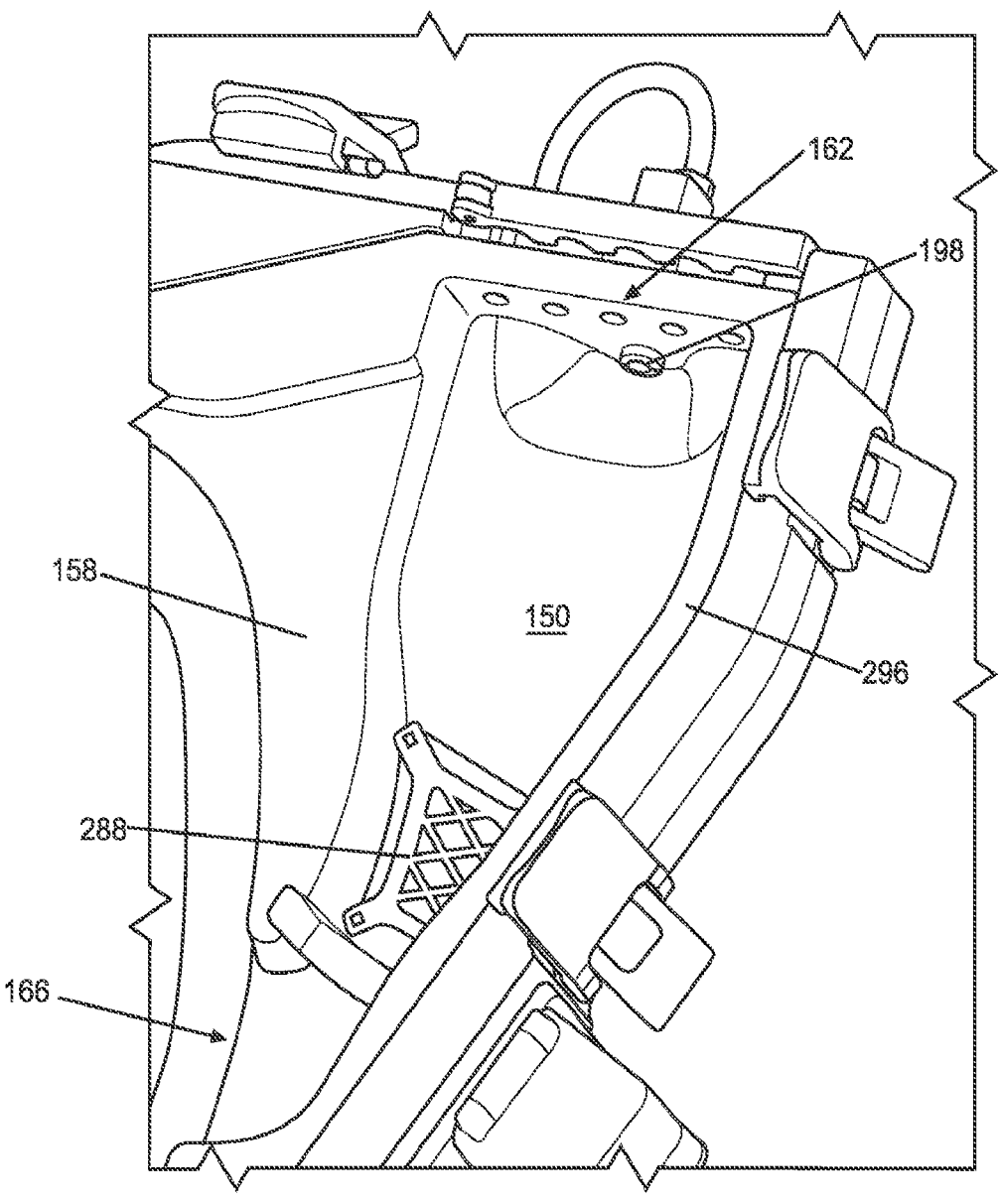
FIG. 13 illustrates a perspective view of a cannulation chamber according to an aspect of the disclosure.
Figure 14:
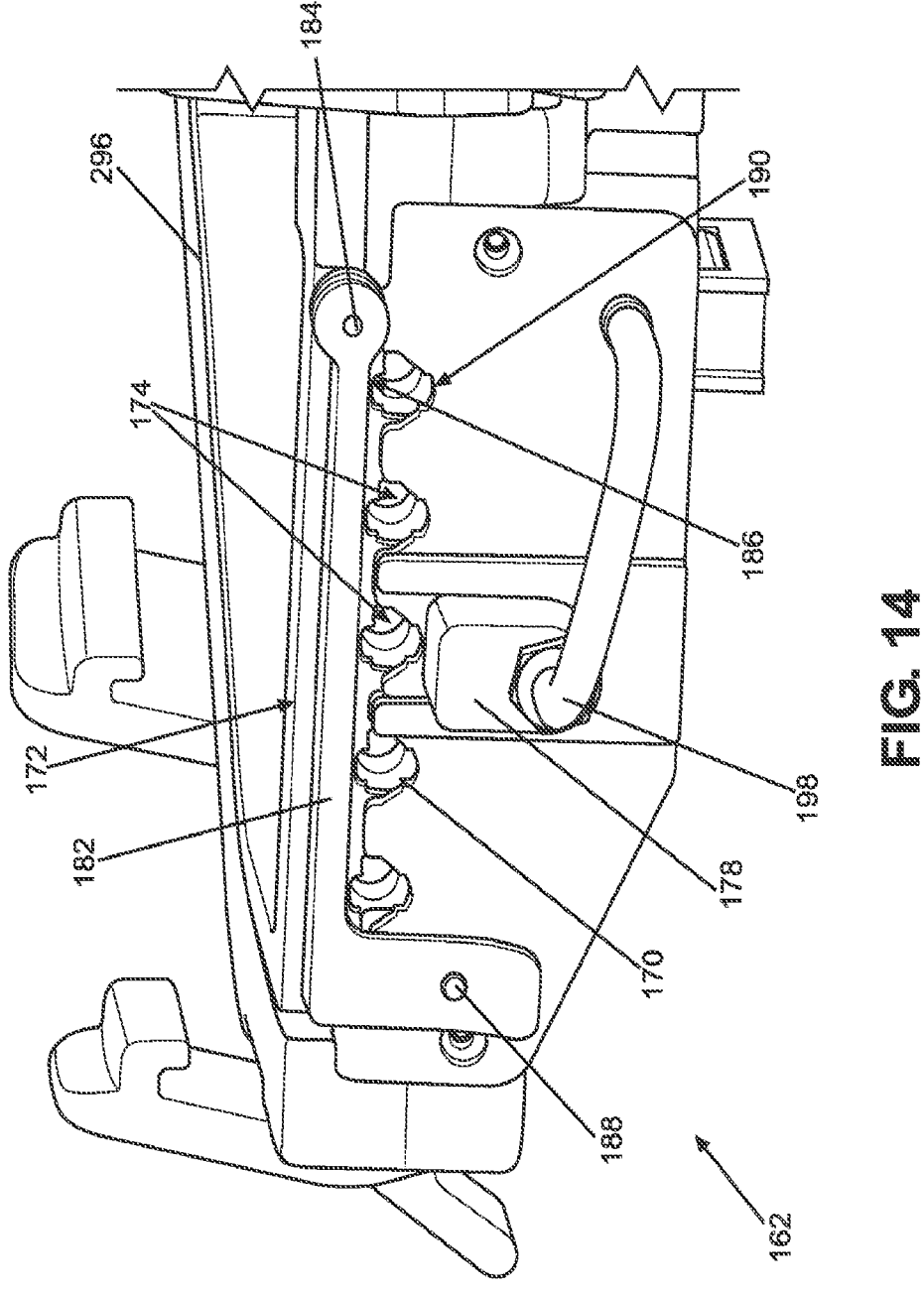
FIG. 14 illustrates another perspective view of the cannulation chamber of FIG. 13.

With continued reference to FIGS. 2-5 and with further reference to FIGS. 13 and 14, an exemplary arrangement of a cannulation chamber 150 is depicted within the fetal chamber assembly 10 according to an aspect of the disclosure. FIGS. 13 and 14 show a close-up, more detailed view of the cannulation chamber 150 of FIGS. 2-5. The cannulation chamber 150 may be disposed within the housing 108 of the base 100 and may be adjacent to the growth chamber 120. A dividing wall 158 may separate the growth chamber 120 from the cannulation chamber 150, such that one side of the dividing wall 158 faces the growth chamber 120, and another, opposite side of the dividing wall 158 faces the cannulation chamber 150. A second inlet 198, for introducing PSS or a related liquid into the cannulation chamber 150, is disposed on the cannulation chamber 150. An opening 166, which is spaced away from the second inlet 198, is also disposed on the cannulation chamber 150. The opening 166 may be spaced along the longitudinal direction y. The opening 166 is in fluid communication with the growth chamber 120, and the cannulation chamber 150 is configured to fluidly communicate with the growth chamber 120 through the opening 166. Liquid that is introduced into the cannulation chamber 150 at the second inlet 198 may be configured to flow through the cannulation chamber 150 towards and through the opening 166. The liquid may then enter the growth chamber 120, flow therethrough, and exit the growth chamber 120 at the outlet 202. In some aspects, a portion of the liquid may also flow into the growth chamber 120 from the cannulation chamber 150, or vice versa, over the dividing wall 158 between the dividing wall 158 and the lid 112. The specifics of the liquid flow will be discussed further below.

The cannulation chamber 150 is configured to retain the cannulated portion of the umbilical cord therein and to prevent unintended movement or de-cannulation of the umbilical cord. The umbilical cord can extend from the fetus in the growth chamber 120 into the cannulation chamber 150 via the opening 166. In preferred embodiments, all of the cannulated portions of the umbilical cord are disposed within the cannulation chamber 150 such that they are not disposed inside the growth chamber 120.

The base 100 may include a preferred location thereon configured to receive the cannulas that enter the fetal chamber assembly 10 and connect to the umbilical cord. Referring to FIGS. 13 and 14, the cannulation chamber 150 may include a cannula entrance 162 defined on the base 100. In some aspects, the cannula entrance 162 may extend through at least a portion of the housing 108 and the seal 296. One or more cannulas may be introduced into the cannulation chamber 150 at, or through, the cannula entrance 162. The second inlet 198 for introducing liquid into the cannulation chamber 150 may be disposed at or adjacent to the cannula entrance 162.

In some preferred embodiments, the cannula entrance 162 may be defined, at least in part, through the seal 296. As shown in FIG. 14, for example, the cannula entrance 162 may define a plurality of openings or ports 174 that extend through the seal 296 through which respective cannulas may be configured to pass. The ports 174 may be through holes that extend through the seal 296 in the generally longitudinal direction y. The ports 174 may be in fluid communication with the cannulation chamber 150 and with the environment external to the fetal chamber assembly 10. In some aspects, the cannula entrance 162 may define a plurality of openings or ports 190 that extend through the housing 108 through which respective cannulas may be configured to pass. The ports 190 may be through holes that extend through the seal housing 108 in the generally longitudinal direction y. The ports 190 may be in fluid communication with the cannulation chamber 150 and with the environment external to the fetal chamber assembly 10. In some aspects, the ports 190 on the housing 108 may be configured to fluidly communicate with the ports 174 on the seal 296.

The fetal chamber assembly 10 may include any number of suitable ports 174 and/or 190, and the exact number of such ports may depend on the number of cannulas that will be connected to the umbilical cord, the orientation of respective cannulas relative to each other and/or to the fetal chamber assembly 10, and/or manufacturing constraints. The fetal chamber assembly 10 may include 1, 2, 3, . . . , 10, or another suitable number of ports 174. Similarly, the fetal chamber assembly 10 may include 1, 2, 3, . . . 10, or another suitable number of ports 190. In some preferred embodiments (see, e.g. FIGS. 4, 5, 13, 14), the fetal chamber assembly 10 includes five ports 174 extending through the seal 296 and five ports 190 extending through the housing 108. It will be appreciated that in some aspects that include both ports 174 and 190, it may be preferable to arrange the ports such that a port 174 is adjacent to and is axially aligned with a port 190, such that a cannula may be introduced through both ports 174, 190. In some aspects, the number of ports 174 may be equal to the number of ports 190.

The ports 174 and/or 190 may have circular cross-sections (when viewed in the plane defined by the transverse x and vertical z directions). It will be appreciated that other shapes of the ports may be acceptable. In some aspects, the ports 174 may have same dimensions and shapes as the ports 190. Alternatively, the ports 174 may have different shapes and/or dimensions from the ports 190. In some aspects (as shown in FIG. 14, for example), the ports 190 may be arcuate or U-shaped and not be circumferentially closed off. Such a shape may allow for a cannula to be inserted into the port 190 either by axial movement along the longitudinal y direction through the port (i.e. the cannula being first axially aligned with the port 190 and then moved into and through the port 190) or, alternatively, the cannula being placed into the port 190 by lowering the cannula into the arcuate or U-shaped opening along the vertical direction z (i.e. the cannula being aligned parallel with the port 190 but being displaced along the vertical direction z and then being moved into the port along the vertical direction z).

In some aspects, the fetal chamber assembly 10 may include more ports 174 and/or 190 than number of cannulas configured to be connected to the umbilical cord. In such aspects, it may be beneficial to selectively close or seal unused ports. For example, in embodiments having five ports 174 (and/or five respective ports 190) and three cannulas introduced into the cannulation chamber 150 via three of the five ports, it may be desirable to plug or seal the two remaining unused ports to prevent liquid from leaking out of the cannulation chamber 150 and prevent contaminants from entering the cannulation chamber 150 through the unused ports.

Cannulas may be introduced into the cannulation chamber 150 at the cannula entrance 162, for example, by moving individual cannulas through respective ports 174. In some aspects, each cannula may be aligned axially with a respective port 174 and then moved, for example along the longitudinal direction y, through the port 174 such that a portion of the cannula is disposed in the cannulation chamber 150 on one side of the port 174 and another portion of the cannula is disposed outside of the cannulation chamber 150 on the other side of the port 174. Because the ports 174 are defined in the seal 296, the engagement between the ports 174 and the cannulas extending therethrough should be liquid-tight ensure that liquid cannot leak through the space between the ports 174 and the cannulas. As such, the ports 174 should be configured to tightly contact the cannulas extending therethrough, preferably matching the cross-sectional shape of the cannulas being used. It will be appreciated that when each cannula is inserted into a respective port 174, the internal dimensions of the port 174 should be larger than the external dimensions of the cannula, but not so large that a sufficient opening is formed between the seal 296 and the cannula. In some aspects, the seal 296 may include an elastic or deformable material that is configured to stretch while maintaining sealing integrity, such that each port 174 may have internal dimensions that are equal to or smaller than the external dimensions of the cannula when the cannula is not inserted into the port 174, but is configured to be stretched by the radial forces exerted by the cannula thereon when the cannula is inserted into the port 174.

Cannula Insertion and Retention

To facilitate introduction of cannulas into the cannulation chamber 150, some aspects of the disclosed systems may include a movable portion of the seal 296 that allows for easier insertion of the cannulas. Referring to the exemplary embodiments depicted in FIGS. 15-18, an entrance seal 170 is depicted at the cannula entrance 162. The entrance seal 170 may be defined on the seal 296 or, alternatively, may be adjacent the seal 296. The entrance seal 170 may be a separate sealing component that is configured to sealingly engage with the seal 296. The ports 174 described above may be defined in the entrance seal portion 170. The entrance seal 170 may be configured to selectively enlarge and shrink the ports 174. When the ports 174 are expanded, the cannulas may be inserted therein; when the ports 174 are shrunk, the cannulas are snugly positioned within the ports 174, and a liquid-tight seal is formed between the cannulas and the entrance seal portion 170.

The entrance seal 170 may define a top surface 172 disposed thereon and spaced from each port 174 along the vertical z direction, such that the top surface 172 is between each port 174 and the lid 112. A slit 176 may extend through the entrance seal 170 between each port 174 and the top surface 172. Each slit 176 may be a through hole extending entirely through the entrance seal 170 along the longitudinal y direction. Each slit 176 is bounded along the vertical direction z by the top surface 172 and the port 174 opposite the top surface 172. Each slit 176 is further bounded in the transverse x direction by two slit walls 177 disposed opposite each other along the transverse direction x.

Each slit 176 may be opened or closed to selectively allow or block, respectively, communication between the top surface 172 and each port 174. When the slit 176 is closed (see, e.g. FIG. 17), the two slit walls 177 contact each other such that the port 174 communicating with the slit 176 is bounded in both the transverse x and longitudinal y directions by the entrance seal 170. When the slit 176 is closed, the respective port 174 does not communicate with the top surface 172 of the entrance seal 170. When the slit 176 is opened (see, e.g. FIGS. 15 and 16), the two slit walls 177 are spaced from each other along the transverse x direction, such that the respective port 174 is in communication with the top surface 172 of the entrance seal 170.

Figure 19A:
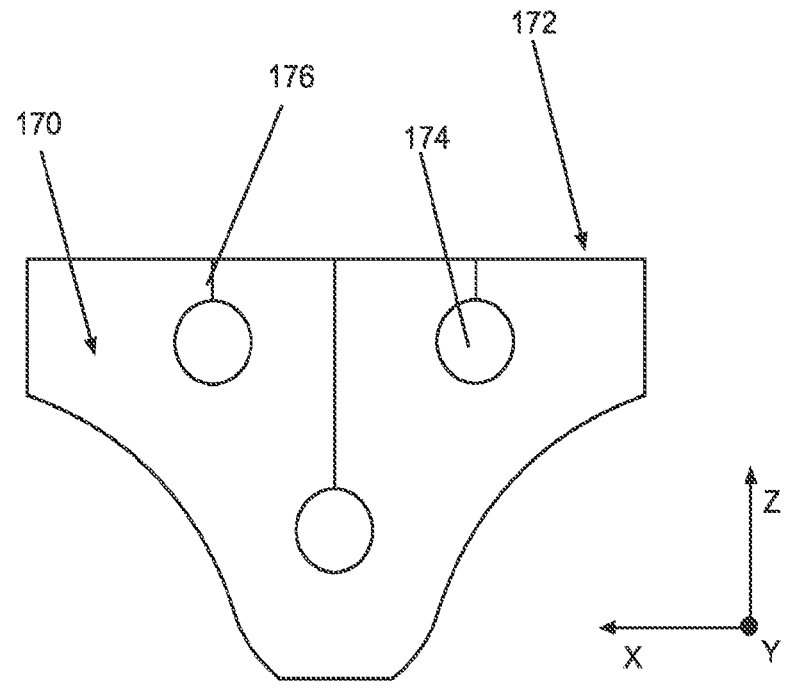
FIG. 19A illustrates a front view of a slit seal according to another aspect of the disclosure, showing the slit seal in the closed configuration.
Figure 19B:
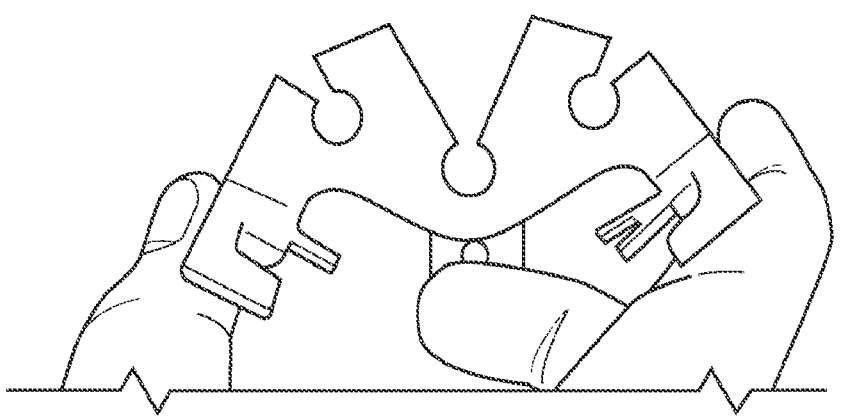
FIG. 19B illustrates a front view of the slit seal of FIG. 19A, showing the slit seal in the open configuration.
Figure 20A:
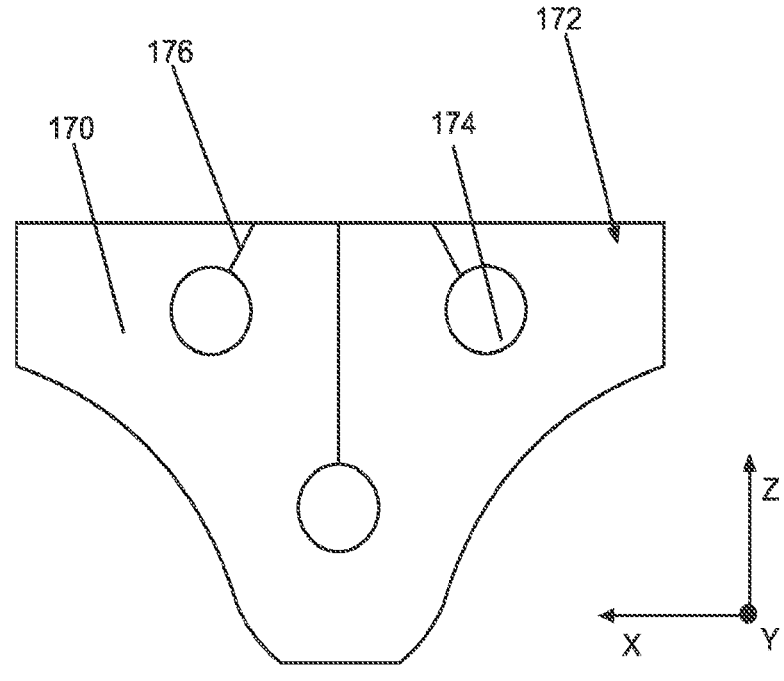
FIG. 20A illustrates a front view of a slit seal according to yet another aspect of the disclosure, showing the slit seal in the closed configuration.
Figure 20B:
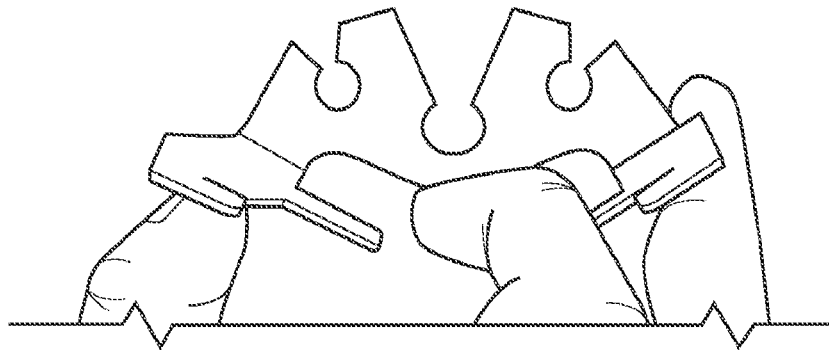
FIG. 20B illustrates a front view of the slit seal of FIG. 20A, showing the slit seal in the open configuration.

In some aspects, all slits 176 may be arranged parallel to each other such that they extend in the same direction between their respective ports 174 and the top surface 172. In some alternative embodiments, some slits 176 may extend between their respective ports 174 and the top surface 172 at different angles when viewed in the plane defined by the transverse x and vertical z directions. Exemplary aspects are depicted in FIGS. 19A-20B. FIGS. 19A and 19B depict an entrance seal 170 having three ports 174 and three respective slits 176 extending between the ports 174 and the top surface 172. The slits 176 extend along a parallel direction to each other in the vertical z direction. FIG. 19A depicts the slits 176 in the closed configurations, and FIG. 19B depicts the slits 176 in the open configurations. In a further alternative aspect, FIGS. 20A and 20B depict an entrance seal 170 having three ports 174 and three respective slits 176 extending between the ports 174 and the top surface 172, with the slits 176 extending along directions that are not parallel to one another. FIG. 20A depicts the slits 176 in the closed configuration, and FIG. 20B depicts the slits 176 in the closed configuration. The direction along which the slits 176 extend can change the access to each port 174. In some aspects, it may be advantageous to orient the slits 176 such that they are not all parallel to one another (as in FIGS. 20A, 20B) so that, when the slits 176 are in the open configuration, the space defined between the two slit walls 177 is defined along the vertical direction z.

Figure 16:
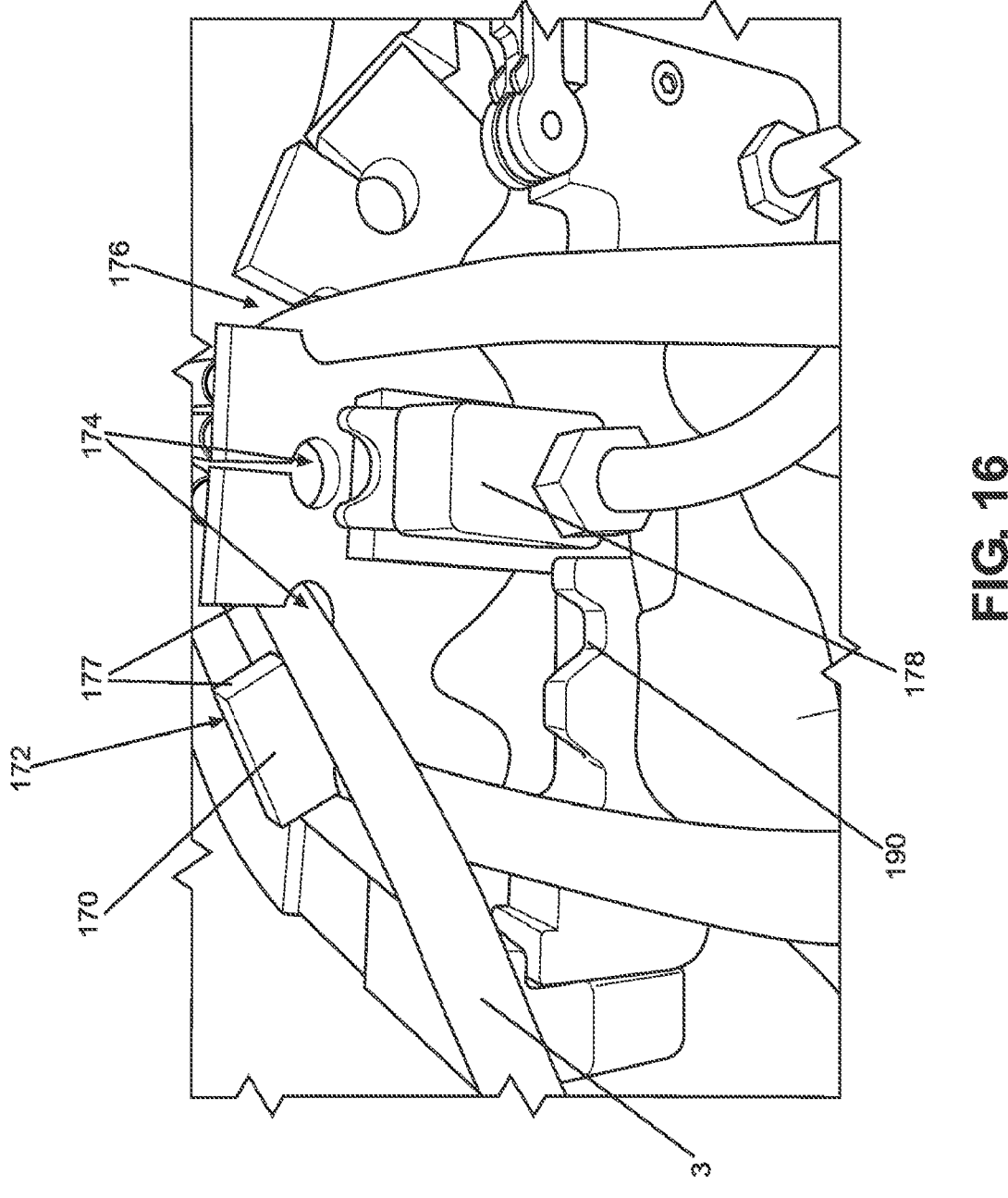
FIG. 16 illustrates another front view of the cannulation chamber of FIG. 15, showing a slit seal in the open configuration with cannulas therein.
Figure 17:
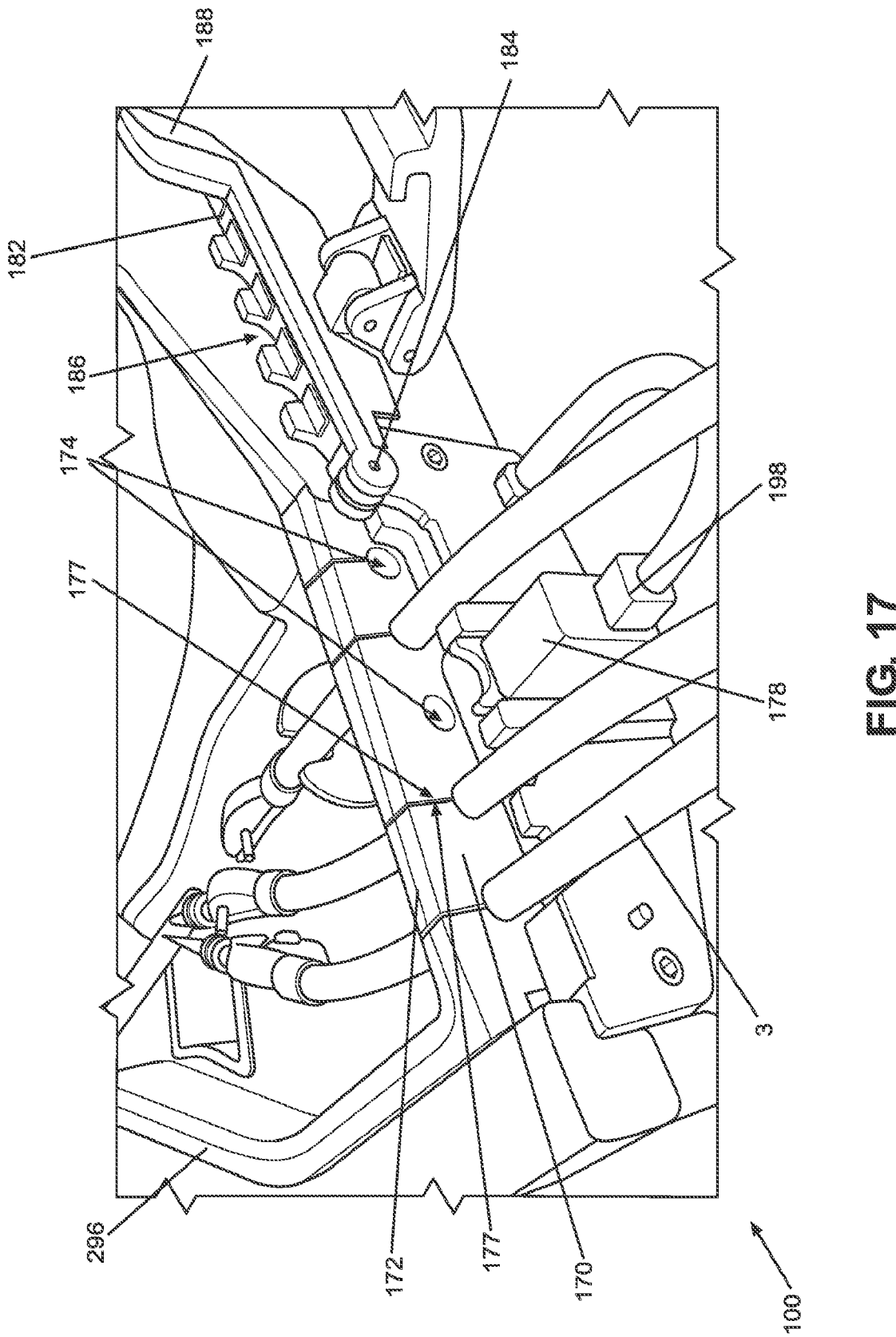
FIG. 17 illustrates a perspective view of the cannulation chamber of FIGS. 15 and 16, showing the slit seal in a closed configuration with the securing bar in the open position.

The entrance seal 170 may be movable between an open configuration and a closed configuration. In the open configuration, the slits 176 are opened, and in the closed configuration, the slit seals 176 are closed as described above. When the entrance seal 170 is in the open configuration, one or more cannulas 3 may be introduced through the open slits 176 into the respective ports 174, as shown in FIG. 16. When the cannulas 3 are disposed in the ports 174, the entrance seal 170 may be moved to the closed configuration, such that each cannula 3 is secured in the respective port 174 and the slit 176 is closed, as shown in FIG. 17. To remove one or more cannulas 3, the entrance seal 170 may be moved from the closed configuration to the open configuration, such that each slit 176 is opened, and the cannulas 3 may be moved out of the respective ports 174 and through the open slits 176.

The entrance seal 170 may include a movable actuator 178 configured to selectively transition the entrance seal 170 from the open configuration to the closed configuration and vice versa. The movable actuator 178 may be a button, a lever, a handle, or another suitable component. In some aspects, the second inlet 198 may be defined on or adjacent to the actuator 178. In some exemplary aspects depicted in FIGS. 15-18, the actuator 178 may be a handle fixedly attached to the entrance seal 170. A channel 180 (shown in FIG. 15) may be defined on the housing 108 configured to slidably receive the actuator 178, such that the actuator 178 may be configured to move within the channel 180 between at least two positions.

In some aspects, the actuator 178 is configured to be moved, within the channel 180 into a first position or into a second position different from the first position. In the first position, the entrance seal 170 is in the closed configuration, and in the second position, the entrance seal 170 is in the open configuration. It will be appreciated that other positions are envisioned, such as a position where the entrance seal 170 may be in a partly-opened position. The actuator 178 may be configured to be releasably secured in the first position, in the second position, or in both positions. In some aspects, when the actuator 178 is in the moved into the second position, the actuator 178 may be configured to contact a portion of the housing 108 such that the actuator 178 does not move back into the first position until actuated to do so. In some aspects, the actuator 178 may be configured to be gripped by a user and moved within the channel 180 between the first and second positions. In other aspects, a motor (not shown) may be operationally attached to the actuator 178 and configured to cause the actuator 178 to move between the first and second positions in response to a command by the user or a pre-programmed algorithm.

Strain Relief Bar

In some aspects, it may be further desirable to secure cannulas inserted at the cannula entrance 162 to prevent them from moving axially within the cannulation chamber 150 and specifically within the ports 174 and 190. If cannulas are not secured, there is an increased risk that one or more cannulas may be inadvertently pulled out of the cannulation chamber 150, disconnected from the respective cannulated blood vessel in the umbilical cord, pushed into the fetus, or otherwise moved relative to one or more other cannulas in such a way as to interfere with blood flow to and/or from the cannulated umbilical cord. Such inadvertent movements may cause physical injury to the fetus, may damage umbilical tissue, or may cause blood loss. As such, some embodiments described throughout this application include mechanisms to help secure the cannulas relative to the cannula entrance 162 to prevent undesired movement of the cannulas.

Referring again to FIGS. 14-18, a securing bar 182 may be disposed on the housing 108. The securing bar 182 may be configured to selectively secure or release the cannulas disposed in the cannula entrance 162. The securing bar 182 may have an open configuration, in which the cannulas are not secured, and a closed configuration, in which the cannulas are secured. In the closed configuration, the securing bar 182 may contact the one or more cannulas and press them against a portion of the housing 108. It will be understood that the securing bar 182 should contact the cannulas with enough force to secure them between the securing bar 182 and the housing 108, but not so much force that the cannulas are damaged or flow through the cannulas is significantly hindered. The contact of the cannulas against the housing 108 and the securing bar 182 may frictionally secure the cannulas in place to prevent them from sliding within the ports 174. When the securing bar 182 is in the open configuration, the securing bar 182 is spaced away from the cannulas, and the cannulas are not frictionally secured against the housing 108.

In some aspects, the securing bar 182 may include a plurality of notches 186 configured to receive the cannulas therein when the securing bar 182 is in the closed configuration. The securing bar 182 may be hingedly attached to the housing 108 at a hinge 184, such that the securing bar 182 may be pivoted along the hinge between the open and the closed configurations. In some aspects, it may be advantageous to lock the securing bar 182 when it is in the closed configuration to prevent inadvertent movement of the securing bar 182 to the open configuration. In such aspects, the securing bar 182 may include a lock 188 configured to releasably engage with the housing. In some aspects, the lock 188 may include a notch or opening defined on the securing bar 182 that is configured to contact a respective locking member on the housing 108.

Figure 15:
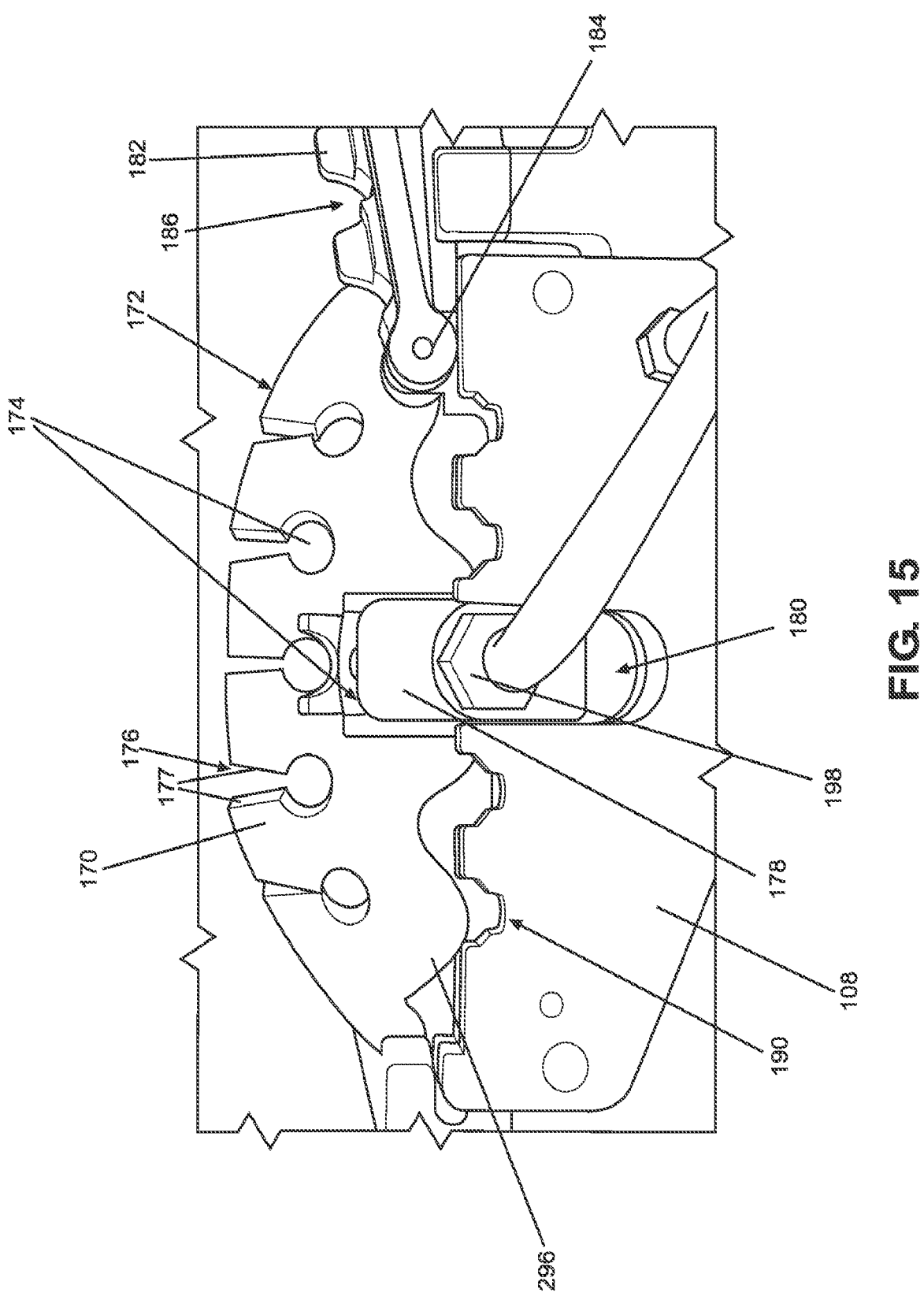
FIG. 15 illustrates a front view of a cannulation chamber according to another aspect, showing a slit seal in an open configuration without cannulas.
Figure 18:
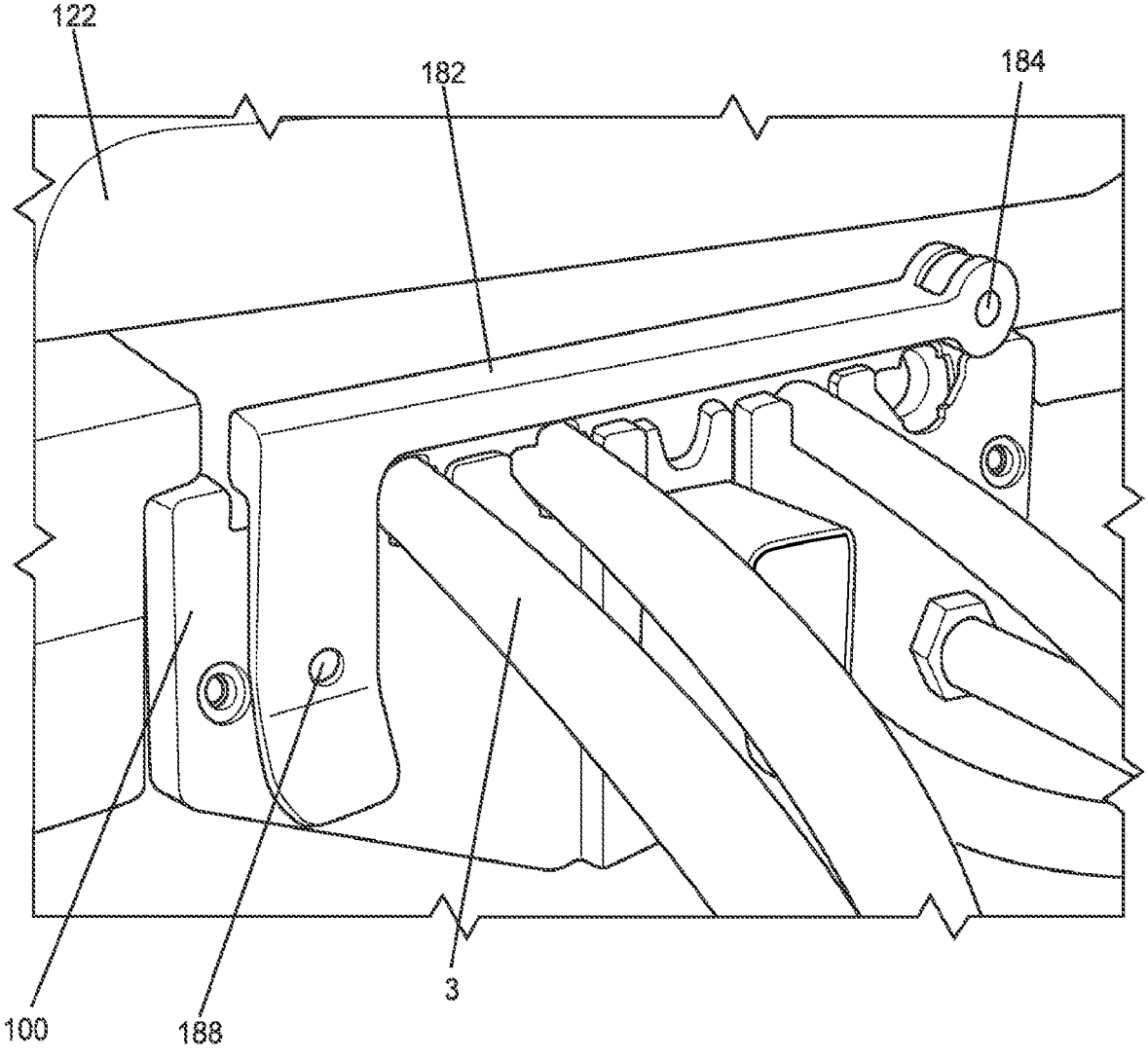
FIG. 18 illustrates another perspective view of the cannulation chamber of FIGS. 15-17, showing the slit seal in a closed configuration with the securing bar in the closed position.

In operation, the securing bar 182 may be in the open configuration when the entrance seal 170 is in the open configuration, and the securing bar 182 may be moved into the closed configuration after the entrance seal 170 has been moved into its closed configuration. FIGS. 15 and 16 depict both the entrance seal 170 and the securing bar 182 in their respective open configurations; FIG. 17 depicts the entrance seal 170 in its closed configuration and the securing bar 182 in its open configuration; and FIG. 18 depicts both the entrance seal 170 and the securing bar 182 in their respective closed configurations.

In some aspects, when the securing bar 182 is in its open configuration, the lid 112 may be prevented from fully engaging the base 100 as described above. In such an exemplary arrangement (see, e.g. FIG. 17), the securing bar 182, in its open configuration, is disposed between the base 100 and the lid 112 and may act as a physical barrier to the lid 112 securely contacting the base 100. This may help prevent accidentally skipping the step of moving the securing bar 182 into the closed configuration, which helps ensure that the securing bar 182 is in its closed configuration prior to commencing with operation of the fetal chamber assembly 10.

Flow Path Through Fetal Chamber Assembly

In operation, the fetal chamber assembly 10 is configured to receive a suitable liquid therein to flow through the growth chamber 120 and the cannulation chamber 150. The liquid may contact the fetus inside the growth chamber 120 and the fetus's umbilical cord inside the cannulation chamber 150 and in the growth chamber 120. It will be understood that the liquid must be biocompatible with the fetus so as not to cause injury to the fetus. It will also be appreciated that the liquid should preferably not be corrosive or damaging to the components of the fetal chamber assembly 10. In some aspects described throughout this application, the liquid may include physiological saline solution (PSS). The liquid may include synthetic amniotic fluid. The PSS is composed of liquids that are beneficial for fetal growth. The PSS may be controlled for various parameters, such as temperature, pressure, nutrient content, gaseous content, sterility, and/or other characteristics. In some aspects, it may be preferable that the PSS resembles, at least partly, amniotic fluid found in a natural human womb during pregnancy. Although the descriptions throughout this application are directed to PSS, it will be understood that the PSS may vary in composition, and other suitable liquids may be used with or instead of the described PSS.

The PSS is introduced into the fetal chamber assembly 10 from a PSS source. In some aspects, it may be preferred that the PSS does not remain inside the fetal chamber assembly 10 in a stagnant state, and is instead moved at an advantageous flow rate. Avoiding stagnant liquid may help prevent bacterial growth inside the fetal chamber assembly 10. The fetal chamber assembly 10 may be configured to pass the PSS therethrough, such that new, or fresh, PSS enters the fetal chamber assembly 10, moves therethrough, and then exits the fetal chamber assembly 10, rather than continuously cycle the same PSS in a closed loop within the fetal chamber assembly 10. Introducing new PSS instead of cycling the same PSS may help prevent bacterial growth and buildup, help remove contaminants from the fetal chamber assembly 10, and may provide better gas and nutrient exchange for fetal development.

Figure 21:
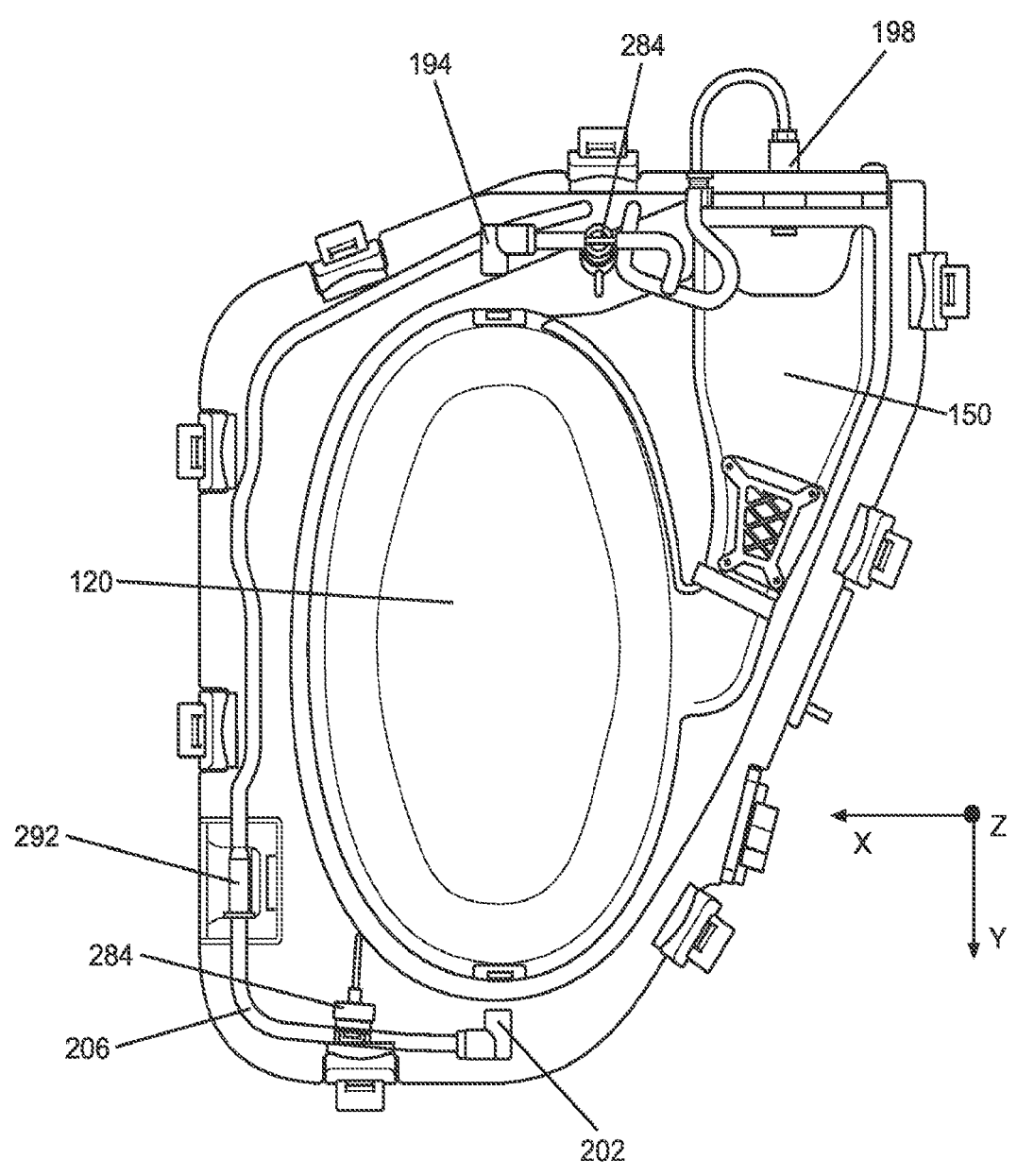
FIG. 21 illustrates a top view of a fetal chamber assembly, showing flow connections according to an aspect of the disclosure.

Referring to FIG. 21, an exemplary PSS flow path is depicted within the base 100 of the fetal chamber assembly 10. It will be appreciated that other suitable flow paths may be used, and the exact arrangement of the flow path as shown in the figures is not intended to be limiting. The PSS is introduced into the fetal chamber assembly 10 from a PSS source and is split into two separate inlets: a first inlet 194 and a second inlet 198. As briefly explained above, the first inlet 194 is defined in the growth chamber 120, such that the PSS from the first inlet 194 is moved into the growth chamber 120, and the second inlet 198 is defined at the cannula entrance 162 of the cannulation chamber 150, such that the PSS from the second inlet 198 is moved into the cannulation chamber 150. The PSS is configured to move generally along the longitudinal direction y towards an outlet 202. The outlet 202 is spaced from the first and second inlets 194, 198 along the longitudinal direction y. In some aspects, the outlet 202 is disposed in the growth chamber 120 opposite the first inlet 194, such that the fetus may be positioned between the first inlet 194 and the outlet 202. The first inlet 194 may be disposed in the growth chamber 120 closer to the head of the fetus than to the feet of the fetus, while the outlet 202 may be disposed such that it is closer to the feet of the fetus than the head of the fetus. This allows the PSS that flows from the first inlet 194 towards the outlet 202 to generally flow in the direction from the fetus's head towards the fetus's feet. Although the fetal chamber assembly 10 may be rotated along different axes, as will be discussed in detail below, it may be preferable to maintain orientation of the fetal chamber assembly 10 such that the outlet 202 is disposed at the lowest point of the growth chamber 120 (relative to gravity) so that the PSS may flow downward, due to gravity, towards the outlet 202. Such a flow path may be advantageous in keeping contaminants (e.g. meconium) away from the fetus's head by having a continuous flow of PSS that can move any contaminants towards the feet and towards the outlet 202, rather than move them towards or keep them adjacent to the fetus's head. Aspiration of contaminants (such as meconium) may result in respiratory complications or otherwise interfere with the fetus's development, so it may be preferable to maintain a flow of PSS that direct any contaminants or foreign bodies away from the fetus's head.

An outlet channel 206 extends from the outlet 202 and leads to a waste receptacle configured to receive the PSS after it has moved through and out of the fetal chamber assembly 10. The outlet channel 206 may be disposed, at least partly, within the housing 108. The outlet channel 206 may be configured such that the PSS flowing therethrough can contact, flow adjacent to, or flow through one or more components of the fetal chamber assembly 10. Referring to FIG. 21, for example, a meconium sensor assembly 292 may be disposed on or adjacent to the outlet channel 206, such that the PSS liquid flowing through the outlet channel 206 is subject to sensing by the meconium sensor assembly 292, as will be discussed in detail below.

In some aspects, the fetal chamber assembly 10 may include a plurality of outlets 202. Each outlet 202 may be configured to fluidly communicate with the same outlet channel 206, or, alternatively, may be configured to fluidly communicate with separate outlet channels 206.

In operation, the PSS enters the fetal chamber assembly 10 at the first and second inlets 194, 198 and flows towards the outlet 202. Although the fetal chamber assembly 10 is depicted having a dividing wall 158 that separates the growth chamber 120 and the cannulation chamber 150, it should be understood that the dividing wall 158 may have different dimensions in different embodiments, and the flow of the PSS liquid may be affected by the specific arrangement of the dividing wall 158. For example, as can be seen in FIGS. 2-4, the dividing wall 158 extends from the housing 108 upwards (towards the lid 112 when the fetal chamber assembly 10 is closed) along the vertical direction z. In some preferred aspects, the dividing wall 158 may be configured to extend in the vertical direction z such that the top of the dividing wall 158 is between the housing 108, from which the dividing wall 158 extends, and a plane, defined by the lateral and longitudinal directions x and y, in which the top surface of the seal 296 is disposed. Simply put, the height of the dividing wall 158 (measured in the vertical direction z from the housing 108) is less than the height of the seal 296. In such embodiments, when the fetal chamber assembly 10 is closed and the lid 112 is sealingly secured with the base 100, the PSS liquid may pass over the dividing wall 158 in the space defined between the dividing wall 158 and the lid 112. Such embodiments may be preferred to decrease areas of stagnant liquid within the fetal chamber assembly 10, which, in turn, decreases prevalence of bacterial growth. Additionally, such embodiments may make closing the fetal chamber assembly 10 simpler, as only a single seal 296 may be used. In some alternative aspects, the dividing wall 158 may be configured to have a height such that the top of the dividing wall 158 matches the height of the seal 296, so that when the fetal chamber assembly 10 is closed, no space is defined between the dividing wall 158 and the lid 112, and the PSS is not permitted to pass over the dividing wall 158.

The PSS may be introduced into the fetal chamber assembly 10 from a single source and using a single pump. At the fetal chamber assembly 10, the PSS may be split into two (or more) inlets as described above. In some preferred embodiments, each inlet does not have a separate pump or similar mechanism for moving the PSS therethrough independently of the other inlet. As such, the distribution of quantity of PSS between individual inlet ports does not need to be actively controlled. Referring still to FIG. 21, each of the first and second inlets 194, 198 may be configured to receive either the same amount of PSS or different amounts of PSS depending on the parameters of the fetal chamber assembly 10. Similarly, the PSS being introduced through each of the first and second inlets 194, 198 may have either substantially the same pressure or may have different pressures.

In some aspects, the quantity of the PSS that is introduced into each of the first and second inlets 194, 198 may depend on the position of the fetal chamber assembly 10, and more specifically on the position of the first and second inlets 194, 198 relative to each other. The distribution of PSS among different inlets may depend on the pressure difference of the PSS as it is directed to each inlet. The relative position of each inlet may change based on how the fetal chamber assembly 10 is disposed; the fetal chamber assembly 10 may be translated in 1, 2, or 3 directions and may be rotated along a plurality of axes. For purposes of this discussion, the fetal chamber assembly 10 may be translated along the lateral direction x, along the longitudinal direction y, and/or along the vertical direction z. The fetal chamber assembly 10 may be rotated along a pitch axis that is parallel to the lateral direction x, along a roll axis parallel to the longitudinal direction y, and/or along a yaw axis parallel to the vertical direction z. The specific location of each of the pitch, roll, and yaw axes relative to the fetal chamber assembly 10 may differ between various embodiments and is not intended to limit the description below unless indicated otherwise. The fetal chamber assembly 10 may be configured to rotate around other axes as well, and embodiments in this disclosure are not limited to the pitch, roll, and yaw axes described above.

Figure 43:
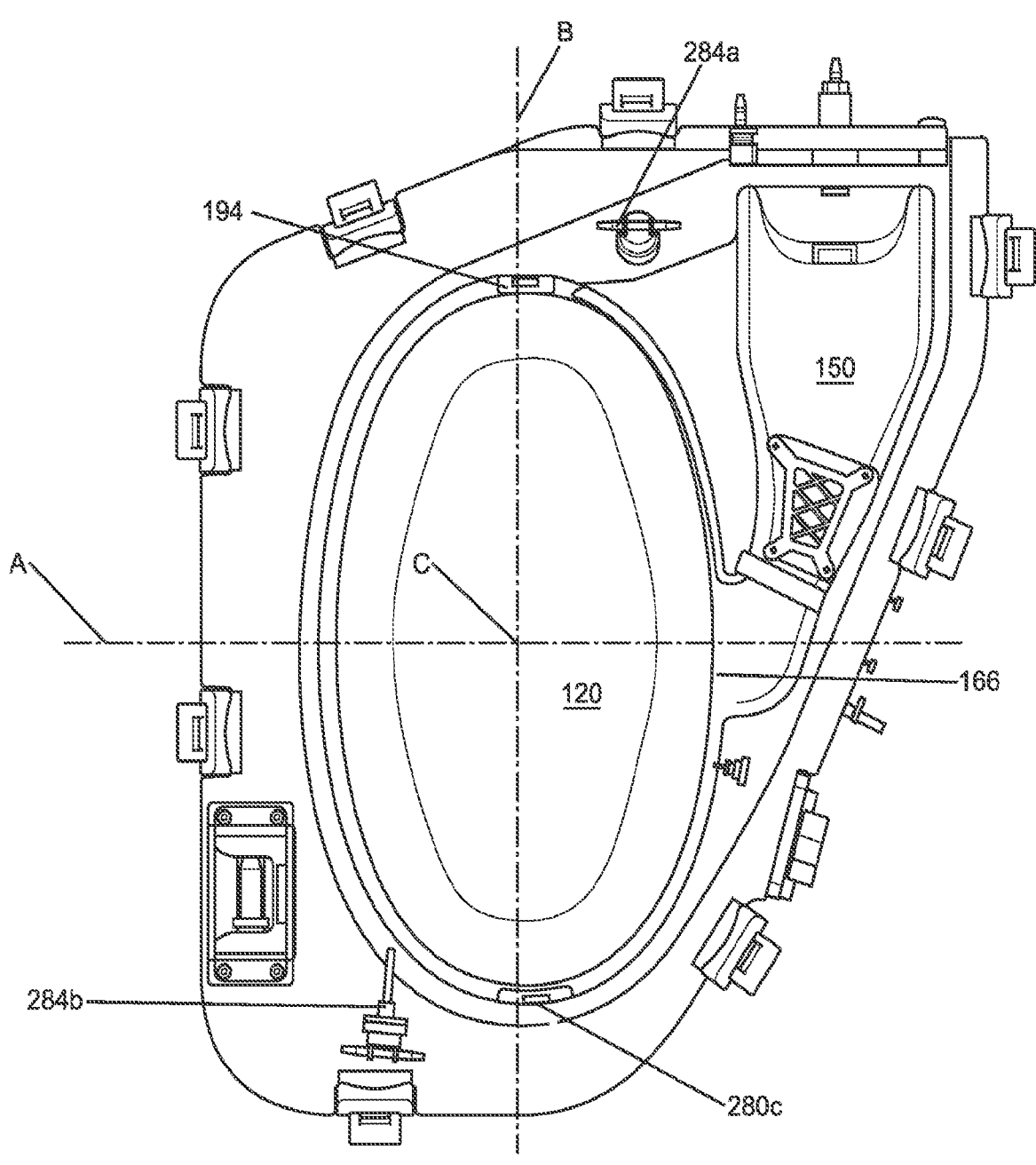
FIG. 43 illustrates a top view of a fetal chamber assembly according to another aspect of the disclosure, showing pressure sensors disposed therein.

For example, referring to the exemplary arrangement of the first and second inlets 194, 198 shown in FIG. 21 (also seen in FIG. 3), the first inlet 194 and the second inlet 198 are shown to be in the same plane defined by the lateral direction x and the longitudinal direction y. In such an arrangement, the PSS that is introduced to the two inlets may have the same pressure. As such, the flow rate of the PSS may be equal at the first inlet 194 and at the second inlet 198. If the fetal chamber assembly 10 is rotated about the roll axis in a first direction, one of the first and second inlets 194, 198 will be disposed higher (along the vertical direction z and relative to ground) than the other of the first and second inlets 194, 198. The fetal chamber assembly 10 may be rotated about the roll axis in a second direction opposite the first direction, such that the relative arrangement of the first and second inlets 194, 198 above is reversed. The inlet that is higher will have a lower pressure of PSS than the inlet that is lower. The farther the fetal chamber assembly 10 is rotated along the roll axis, the greater the relative distance becomes between the first and second inlets 194, 198, and the greater the pressure difference becomes. Whichever of the first and second inlets 194, 198 is relative lower than the other of the inlets will receive proportionally more of the PSS liquid therein compared to the other inlet. Exemplary, non-limiting pitch and roll axes according to one embodiment are depicted in FIG. 43.

This distribution may be due to the mechanism configured to introduce the PSS to the fetal chamber assembly 10 (e.g. a pump). The pump may be configured to move the PSS to the fetal chamber assembly 10 but not actively guide the flow into a specific inlet—that is, the pump is configured to move the PSS liquid into the fetal chamber assembly 10, but the liquid will flow in the direction of least resistance. When the first and second inlets 194, 198 are in the same horizontal plane defined by the lateral direction x and the longitudinal direction y, the flow may move into both inlets evenly because they both have the same resistance. When the fetal chamber assembly 10 is rotated along the roll axis in the first direction, the inlet that is higher along the vertical axis z (relative to the ground) has a greater resistance to flow than the inlet that is relatively lower, as it is harder to move the liquid higher against gravity than to a point that is relatively lower.

The fetal chamber assembly 10 may be configured to be rotated around the pitch axis. When the fetal chamber assembly 10 is rotated around the pitch axis in a first direction, one or both of the first and second inlets 194, 198 may be arranged relatively higher than the outlet 202. If the fetal chamber assembly 10 is rotated along the pitch axis in a second direction opposite the first direction, the outlet 202 may be disposed relatively higher than the one or both of the first and second inlets 194, 198. In some preferred embodiments, it may be advantageous to keep the fetal chamber assembly 10 in such an arrangement where the outlet 202 is relatively lower than at least one of the first and second inlets 194, 198. In some aspects, the outlet 202 may be preferably disposed lower than both the first and second inlets 194, 198. This may be preferable to ensure that the flow of PSS is continuously moving from the first and second inlets 194, 198 in the direction of the outlet 202. Raising the outlet 202 above the inlets may lead to flow rates that are slower than desired or lead to stagnation of the PSS liquid inside the growth chamber 120, the cannulation chamber 150, or both. As noted above, it is preferred to minimize or eliminate stagnation of liquid to decrease risk of bacterial infection.

In some aspects, a second mechanism for moving the liquid (e.g. a second pump) may be disposed in fluid communication with the outlet channel 206 and may be configured to facilitate movement of the PSS in the outlet channel 206 out of the fetal chamber assembly 10.

Meconium Sensing

During gestation, the fetus may sometimes release meconium into its immediate environment. While meconium itself is generally sterile, its presence in the fetal chamber assembly 10 may increase the risk of bacterial growth. Meconium may clog or damage components within the fetal chamber assembly 10 and may interfere with development of the fetus. In some instances, the fetus may aspirate the meconium, which may cause health problems for the fetus, such as infection. As such, it is desirable to monitor the fetal chamber assembly 10 during its operation for presence of meconium. If meconium is detected, it may be removed from the fetal chamber assembly 10 as will be discussed in detail below.

As shown in FIGS. 2-5, a meconium sensor assembly 292 may be disposed on the base housing 108 of the base 100. The meconium sensor assembly 292 is configured to detect presence of meconium within the liquid (e.g. PSS) that is flowing through the fetal chamber assembly 10. It will be appreciated that the fetal assembly 10 may include a plurality of strategically placed meconium sensor assemblies 292, for example, within the cannulation chamber 150, within the growth chamber 120, or in another portion of the fetal chamber assembly 10.

Figure 22A:
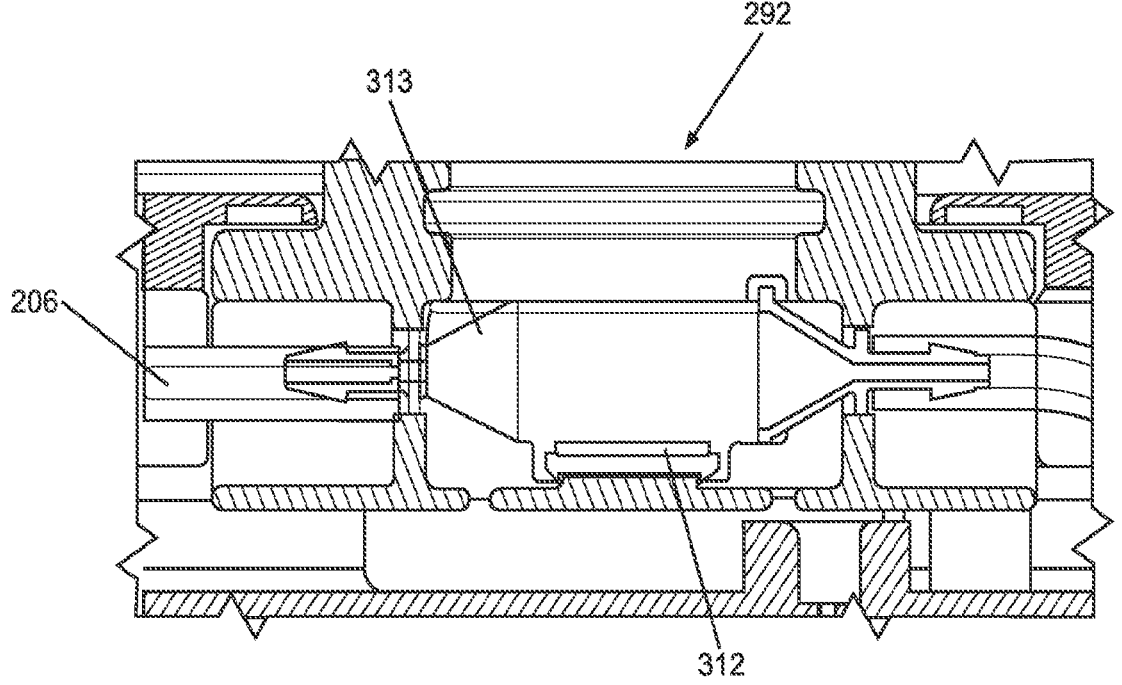
FIG. 22A illustrates a side cross-sectional view of a meconium sensor assembly according to an aspect of the disclosure.
Figure 22B:
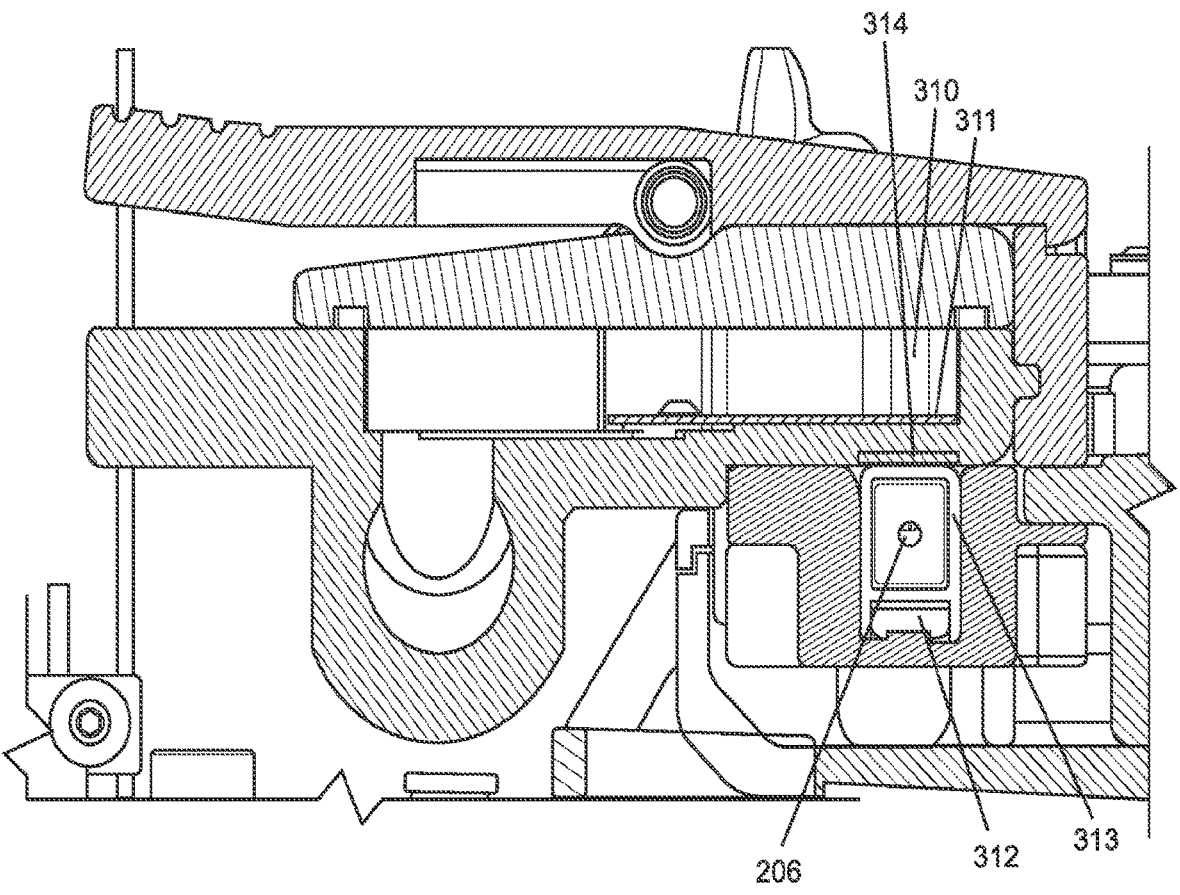
FIG. 22B illustrates a rear cross-sectional view of the meconium sensor assembly of FIG. 22A.
Figure 23:
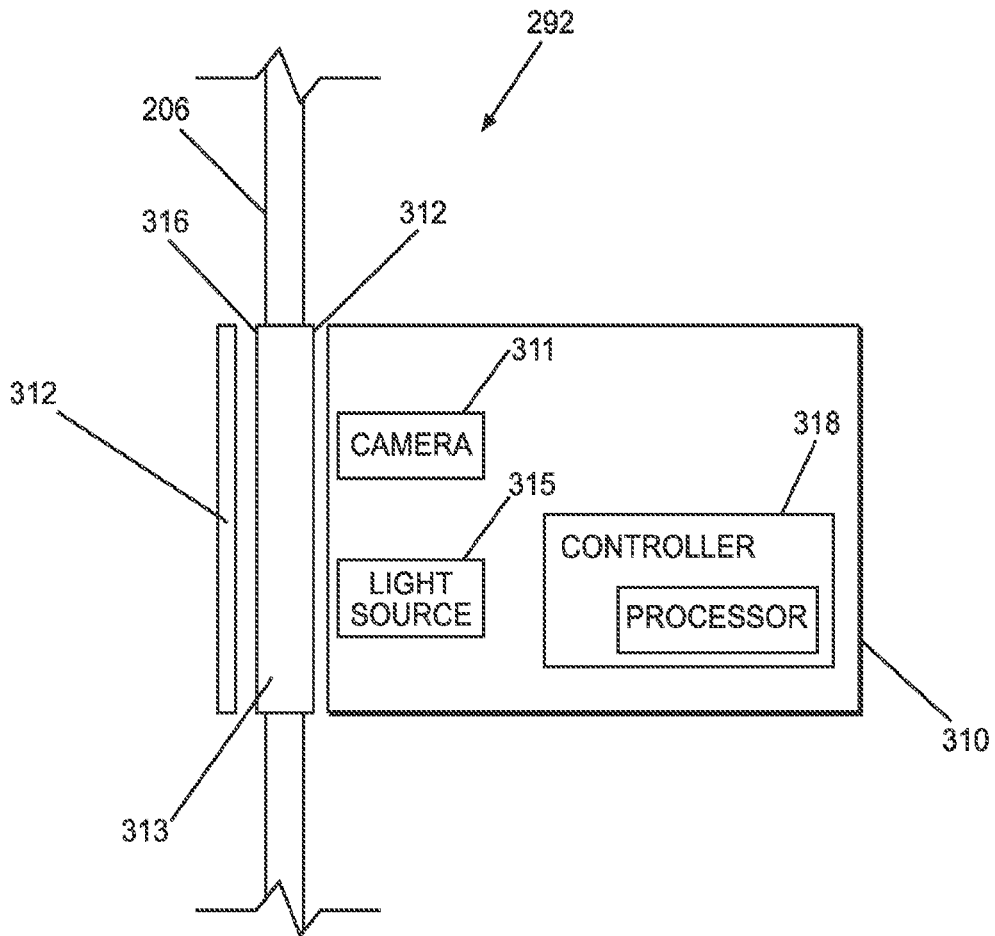
FIG. 23 illustrates a schematic of a meconium sensor assembly according to another aspect of the disclosure.

In some preferred embodiments, as shown in FIGS. 21, 22A, and 22B, for example, the meconium sensor assembly 292 may be disposed within or adjacent to the outlet channel 206. The meconium sensor assembly 292 may be in-line with the outlet channel 206. FIG. 23 depicts an exemplary, nonlimiting schematic of a sample arrangement of a meconium sensor assembly 292 as it is disposed adjacent to the outlet channel 206. It will be appreciated that this schematic is not shown to scale, and that other arrangements may be utilized. The meconium sensor assembly 292 includes a meconium sensor assembly housing 313 and a sensor 310. The liquid in the outlet channel 206 may enter the sensor assembly housing 313. The sensor 310 is configured to detect any presence of meconium within the liquid in the sensor assembly housing 313. It will be appreciated that a specific threshold amount of meconium may be predetermined for operation of the fetal chamber assembly 10. As liquid enters the outlet channel 206 at the outlet 202, the liquid travels along the outlet channel 206 and exits the fetal chamber assembly 10. After the liquid is moved into the outlet channel 206, the liquid may pass through or adjacent to the meconium sensor assembly 292.

If the sensor 310 detects presence of meconium in the liquid that surpasses the predetermined threshold, the meconium sensor assembly 292 may cause the fetal chamber assembly 10 to notify the user, trigger an alarm, or modify its operation in response to the detected meconium. Placing the meconium sensor assembly 292 within the outlet 206 may be advantageous for accurate detection of meconium due to the flow of liquid through the fetal chamber assembly 10. As explained above, the flow of liquid moves generally in the direction from the first and second inlets 194, 198 towards the outlet 202, and, as such, generally in the direction from the fetus's head towards the fetus's feet. Any meconium that the fetus excretes may be carried by the flow of liquid towards the outlet 202 and into the outlet channel 206. As explained above, the relative arrangement of the inlets 194, 198 and outlet 202, as well as the general shape of the growth chamber 120 and the cannulation chamber 150, help decrease instances of stagnant liquid and areas within the growth or cannulation chambers 120, 150 where bacteria can proliferate. As such, the advantageous design and placement of components may also help direct most or all of the excreted meconium into the outlet 202, such that the amount of meconium detected by the meconium sensor assembly 292 represents a more accurate amount of meconium that is excreted by the fetus.

As briefly noted above, the meconium sensor assembly 292 includes a sensor assembly housing 313 and a sensor 310. The sensor 310 may be a spectral sensor that includes a camera 311 configured to be pointed at a reflector surface 312. The reflector surface 312 may be a Lambertian reflector. The reflector surface 312 may include polytetrafluoroethylene (PTFE). In some aspects, the reflector surface 312 may include a single color. In some aspects, the reflector surface 312 may be white. A light source 315 may be disposed on the camera 311 or adjacent thereto at a specified distance from the reflector surface 312. The light source 315 can direct light at the reflector surface 312 such that at least a portion of the light reflects from the reflector surface 312 towards the camera 311. The camera 311 is arranged opposite the reflector surface 312, such that the sensor assembly housing 313, which includes the liquid flowing therethrough, is disposed between the camera 311 and the reflector surface 312. In some aspects, the outlet channel 206 may extend through or be in line with the sensor housing 213.

The liquid moving through the outlet channel 206 can move into the sensor assembly housing 313 adjacent the sensor 310. When in the sensor assembly housing 313, the liquid can therefore pass between the camera 311 and the reflector surface 312. The camera 311 may be a single-pixel camera configured to detect an optical change (relative to predetermined values) in the fluid between the camera 311 and the reflector surface 312. For example, in some aspects, the camera 311 may be configured to detect the relative intensity of two or more wavelengths. The camera 311 has to be able to view the reflector surface 312; as such, the materials between the camera 311 and the reflector surface 312 should be at least translucent enough for the camera to see and detect color of the reflector surface 312. This arrangement allows for the reflection of light from any material that may be present within the liquid passing thorough the outlet channel 206, as well as from the reflector surface 312, which serves as a constant backdrop to measure the spectral footprint against. In some embodiments, the sensor assembly housing 313 may include a first transparent or translucent window 314 disposed on the sensor assembly housing 313 between the camera 311 and the reflector surface 312. A second transparent or translucent window 316 may be disposed on the sensor assembly housing 313 opposite the first window 314 and also between the camera 311 and the reflector surface 312. The camera 311 may be configured to view the reflector surface 312 through the first window 314, through the sensor assembly housing 313 and the liquid therein, and through the second window 316. It will be appreciated that, in some aspects, additional windows may be arranged on the sensor 310, the sensor assembly housing 313, or elsewhere on the fetal chamber assembly housing 108.

The sensor 310 may include a controller 318 having a processor configured to use the camera 311 to detect a change in color that is different from the reflector surface 312. The processor may include a program that defines a preferred color spectrum range of interest. Different materials or components that are positioned between the camera 311 the reflector surface 312 may have different colors. In the preferred embodiments, the processor may be configured to identify a color range consistent with color of meconium. In some aspects, the color range may include red, yellow, brown, combinations of the above, or related colors. If color within the programmed range is detected, it may be indicative of presence of a particular material. In the preferred aspects, for example, if the camera 311 detects a red, yellow, brown, or similar color, this may be indicative of presence of meconium.

In some aspects, the sensor 310 may be configured to detect six different wavelengths within a visible or near-infrared spectrum. Visible spectrum has the capacity to convert individual spectrum readings to RGB or HSV values. In some aspects, HSV may have a benefit over RGB of having an intuitive method of interpreting color by using color mapping to a 3D polar space based on measured hue, saturation, and value. In such exemplary aspects, measurement of the hue may be used to quantify the detected color in a 360 degree space; measurement of saturation may be used to quantify the amount of color as a percentage; and measurement of value may be used to quantify brightness as a percentage. Regions in the 360 degree space may be associated with specific materials (e.g. meconium or blood). Such measurements allow for accurate detection and quantity of the material of interest. Configuring a processor to focus on the relevant region in the HSV space allows for monitoring of the specific materials of interest while disregarding presence of materials not of interest that may be associated with other regions of the HSV space.

In some aspects, the blood sensor may be an optical sensor that detects the presence of blood by the absorption of specific spectral lines by the blood constituents and the relative intensity of specific wavelengths. The sensor may emit different wavelengths alternately and detect the transmitted or reflected intensity. The sensor may emit multiple wavelengths simultaneously and filtered detectors measure the intensity of specific wavelengths.

If the camera 311 detects presence of a color within the programmed color range, the controller 318 may be configured to notify the user, trigger an alarm, or modify operation of the fetal chamber assembly 10. It will be appreciated that the liquid flowing through the outlet channel 206 may include various colors, and so configuring the sensor to focus only on colors pertaining to the material being monitored (e.g. meconium or blood) can help prevent false-positives.

Meconium Removal

Meconium that is excreted by the fetus into the growth chamber 120 may be removed from the fetal chamber assembly 10 to reduce risk of infection, bacterial growth, or damage of assembly components. The amount of meconium inside the fetal chamber assembly 10 may be estimated by the meconium sensor assembly 292 as described above. Meconium may be visible within the growth chamber 120 and/or the cannulation chamber 150. In some aspects, it may be advantageous to remove the meconium if the amount of meconium detected by the sensor 310 in the meconium sensor assembly 292 exceeds a predetermined threshold.

While it is possible to open the fetal chamber system 10 (e.g. by de-coupling the lid 112 from the base 100) and removing the meconium from within the liquid (e.g. PSS) therein, it may be preferable to remove the meconium without unlocking and opening the fetal chamber system 10. This helps maintain the controlled environment for the fetus without disturbing the fetus, exposing the fetus or the interior of the fetal chamber assembly 10 to external contaminants, or pausing operation of the fetal chamber assembly 10 (e.g. without pausing continuous flow of the liquid through the assembly). As such, in some aspects, it may be preferable to remove meconium via a dedicated removal port through which a user may insert a tool into the growth chamber 120 or cannulation chamber 150 and suction, scoop, or otherwise remove meconium present in the liquid.

Figure 24:
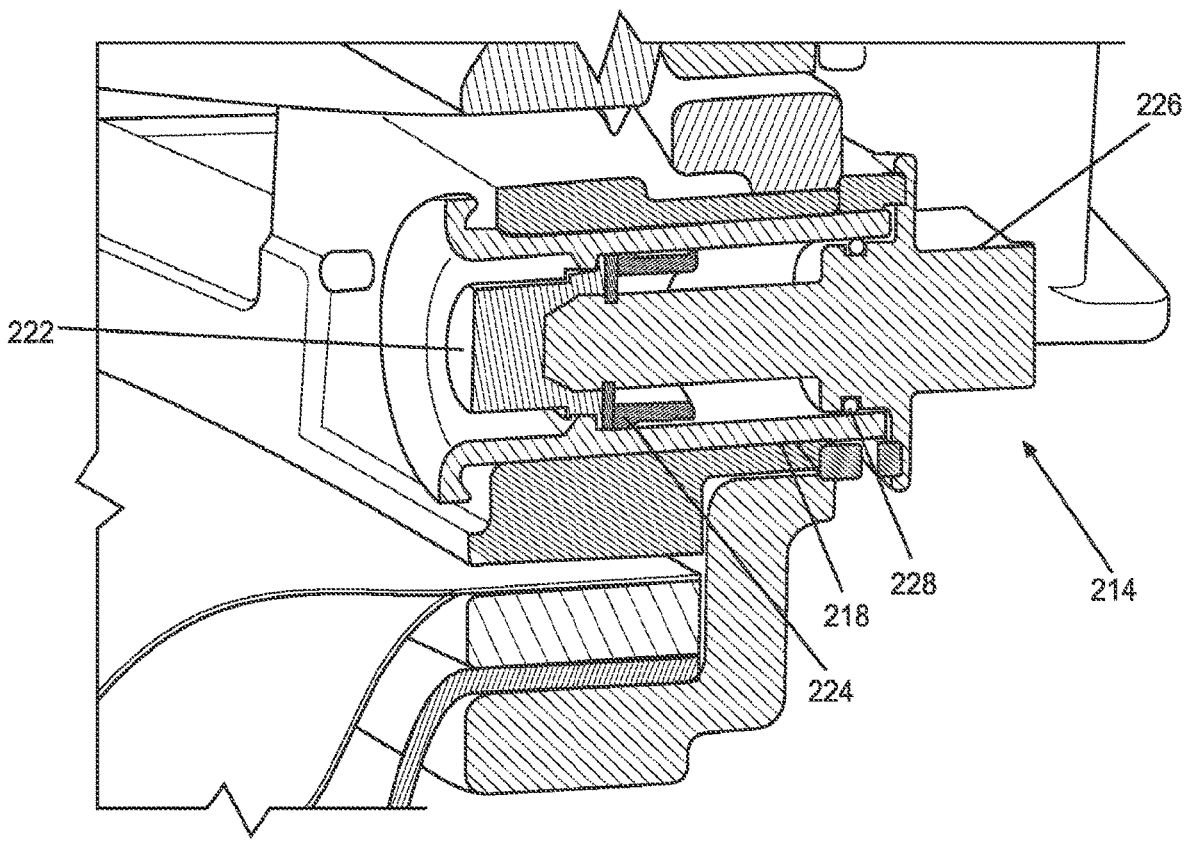
FIG. 24 illustrates a cross-sectional perspective view of a meconium removal assembly according to an aspect of the disclosure.

As shown in FIGS. 2-5, a meconium removal assembly 214 may be disposed on the base 100. Referring now to FIG. 24, which shows a cross-sectional view of an exemplary meconium removal assembly 214, a meconium removal port 218 may be defined on the base 100 and may extend through the housing 108. The meconium removal port 218 may be in fluid communication with the growth chamber 120 and with the environment external to the fetal chamber assembly 10. A valve 222 is disposed within the meconium removal port 218. The valve 222 may be a check valve or another one-way valve. It will be appreciated that the valve 222 should prevent liquid from leaking out of the interior of the fetal chamber assembly 10 out through the meconium removal port 218. In some aspects, the valve 222 may include a trocar seal. In some aspects, the valve 222 may include a cross-slit seal. In some aspects, the valve 222 may include a radial seal. The valve 222 may be configured to be opened with a dedicated tool that is inserted into the meconium removal assembly 214 (as will be discussed in detail below). A radial seal 224 may be disposed within the meconium removal port 218 to preclude liquid from passing therethrough and out of the meconium removal port 218. The radial seal 224 may be disposed adjacent the valve 222. The radial seal 224 may be a redundancy or fail-safe in the event the valve 222 leaks. In some aspects, the meconium assembly 214 may further include a cap 226. The cap 226 may be configured to be disposed at least partly within the meconium removal port 218 when the meconium removal assembly 214 is closed. The cap 226 may be configured to contact the valve 222 to provide physical support thereto and to help prevent leaks from within the fetal chamber assembly 10 through the valve 222. The cap 226 may include one or more sealing members thereon configured to form a seal within the meconium removal assembly 214 in the event of a leak. As shown in FIG. 24, the sealing member may include an O-ring 228 disposed circumferentially around the cap 226 and configured to provide a liquid-tight seal between the cap 226 and the meconium removal port 218 when the cap 226 is inserted into the meconium removal port 218. The O-ring 228 may be a redundancy in the event that the valve 222 leaks.

To remove meconium from within the growth chamber 120, the cap 226 may be removed from within the meconium removal port 218. A dedicated tool may be used to remove the meconium. In some aspects, meconium may be removed via a suction catheter that is inserted into the growth chamber 120 through the meconium removal assembly 214. The suction catheter may be connected to an external suction device configured to create a pressure differential inside the suction catheter to suck liquid and meconium therethrough.

Because the meconium may be disposed in the growth chamber 120 in close proximity to the fetus, it is preferable to utilize a suction catheter that is soft and devoid of abrasive or sharp surfaces to decrease risk of injury to the fetus. Because such preferred catheters are soft, it may be difficult to introduce them into the growth chamber 120 through the valve 222 described above. Furthermore, the soft suction catheter may be devoid of rigid structures, making it difficult for a user to direct the suction catheter to the desired location where the meconium is residing. As such, a dedicated tool may be utilized in conjunction with the catheter to help introduce the catheter into the fetal chamber assembly 10 and to direct the catheter to the desired location.

Figure 25:
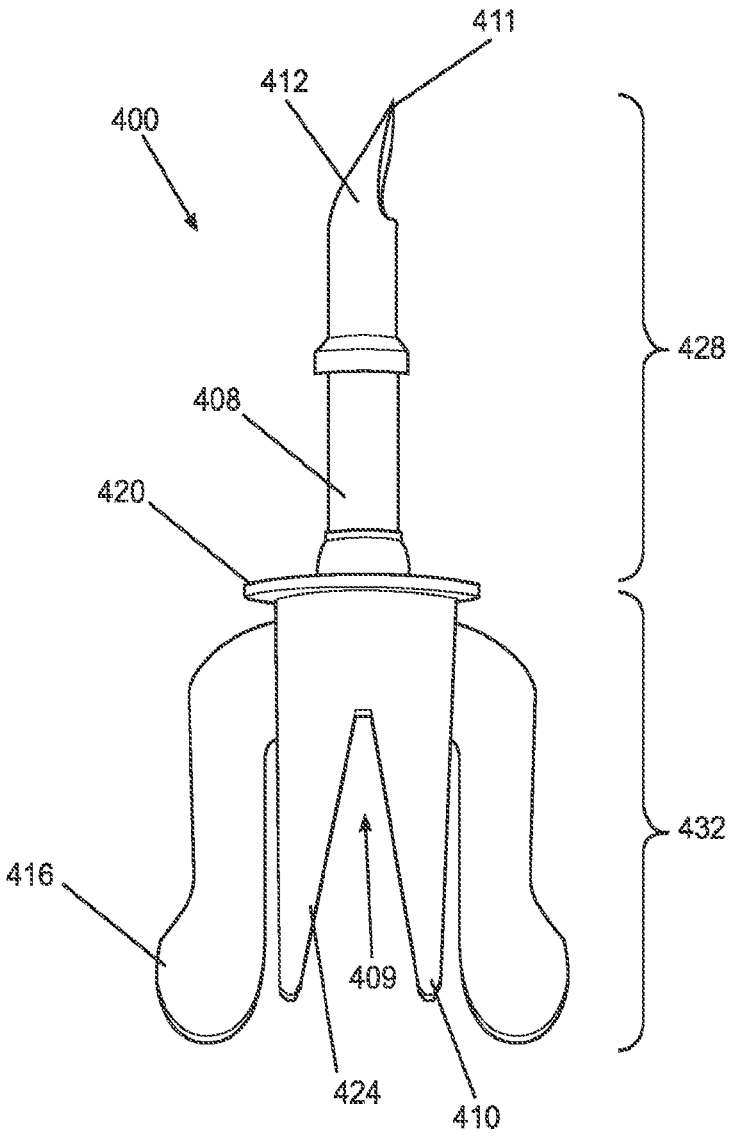
FIG. 25 illustrates a front view of a meconium removal adapter according to an aspect of the disclosure.
Figure 26:
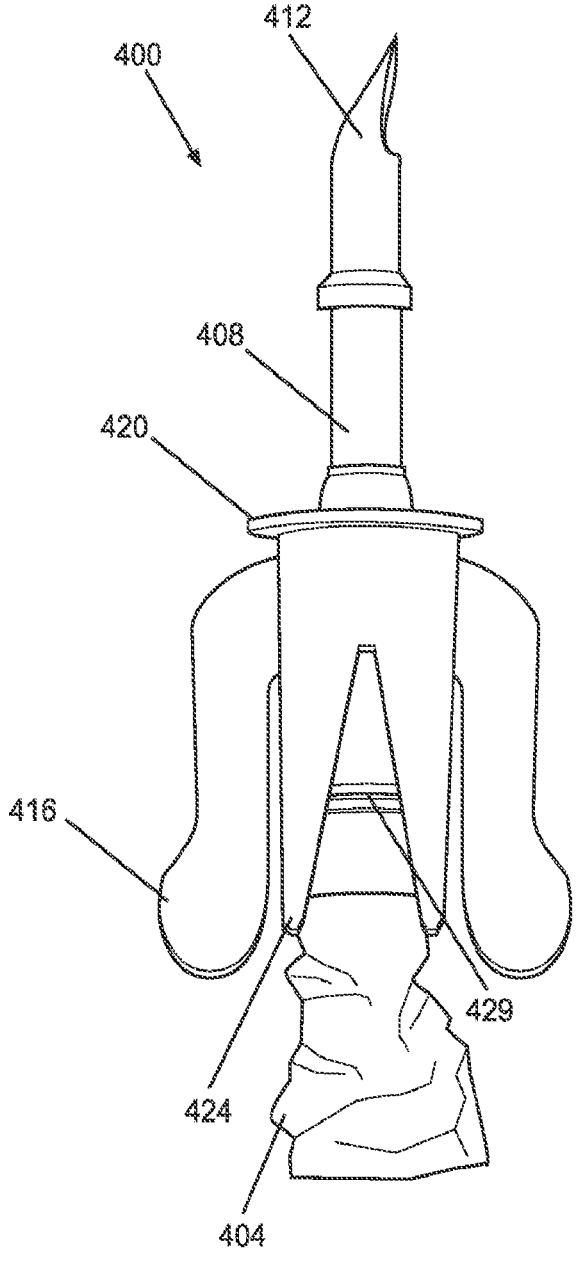
FIG. 26 illustrates the meconium removal adapter of FIG. 25 with a suction catheter attached thereto.

Referring to FIGS. 25 and 26, an exemplary embodiment of a catheter adapter 400 is depicted. The adapter 400 includes a body 408 having a first end 410 and a second end 411 spaced along the body 408 away from the first end 410. A passage 409 extends through the body 408 between the first and second ends 410, 411. The first and second ends 410, 411 are open and in fluid communication with the passage 409. A catheter 404 is configured to be received into the passage 409 at the first end 410. The catheter 404 may extend through the passage 409 and exit therefrom at the second end 411.

The body 408 may define a head 412 disposed thereon adjacent the second end 411. The head 412 may be arcuate and may have a predetermined curvature. The passage 409 may be defined by the shape of the body 408, including the shape of the head 412. As such, the passage 409 may curve along the curvature of the head 412. The catheter 404 introduced into the passage 409 may follow the curvature of the passage 409 as the catheter 404 is moved from the first end 410 towards and out of the second end 411. The curvature of the head 412 may define the direction that the second end 411 faces. In some aspects, where the head 412 may be curved, the catheter 404 may be introduced into the adapter 400 at the first end 410 along a first linear direction and may exit the adapter 400 at the second end 411 along a second linear direction that is not parallel to the first linear direction. In some aspects, the head 412 may be tapered to facilitate insertion of the adapter 400 into and through the valve 222. It will be appreciated that the second end 411 is preferably designed to decrease risk of injuring the fetus or damaging components inside the growth chamber 120. The second end 411 may be rounded and may define an atraumatic tip thereon.

The catheter 404 may include a collar 429 configured to help orient and fix the catheter 404 relative to the adapter 400. The collar 429 may be configured to slidably receive the catheter 404 therethrough so that the length of catheter being fed into the adapter 400 can be controlled. A corresponding retention element 424 may be disposed on the adapter 400 and be configured to releasably engage with the collar 428 to secure the collar 428 to the adapter 400. The retention element 424 may be disposed adjacent the first end 410 of the body 408.

The adapter 400 may define a flange 420 disposed on the body 408 between the first end 410 and the second end 411. The flange 420 may be configured to act as a physical stop when the adapter 400 is being engaged with the meconium removal assembly 214. That is, when the body 408 is introduced into the meconium removal port 218, the flange 420 may be configured to contact the housing 108 after a portion of the adapter 400 has been moved into the meconium removal port 218. When the flange 420 contacts the housing 108, the adapter 400 may be considered to be fully engaged with the meconium removal assembly 214. In some examples, the flange 420 may be configured to interface and to releasably lock with the meconium removal assembly 214, for example, adjacent to the meconium removal port 218. Such interfacing permits the adapter 400 to be rotated relative to the meconium removal port 218 while precluding inadvertent removal of the adapter 400 from within the meconium removal port 218. In some aspects, the flange 420 may define portions of the adapter 400 that are intended to be sterile and portions that are not required to be sterile. To avoid contamination of the fetal chamber assembly 10, it may be preferred that the portion of the adapter 400 that is introduced into the fetal chamber assembly 10 be sterile, while the portion being handled by the user outside of the fetal chamber assembly 10 may be non-sterile. A sterile portion 428 may be defined between the flange 420 and the second end 411. A non-sterile portion 432 may be defined between the flange 420 and the first end 410.

The adapter 400 may include a handle 416 attached to the body 408 and configured to be grasped by a user. The user may hold the handle 416 to insert the adapter 400 into the meconium removal assembly 214, remove the adapter 400 from the meconium removal assembly 214, or rotate the adapter 400 while engaged with the meconium removal assembly 214.

Figure 27A:
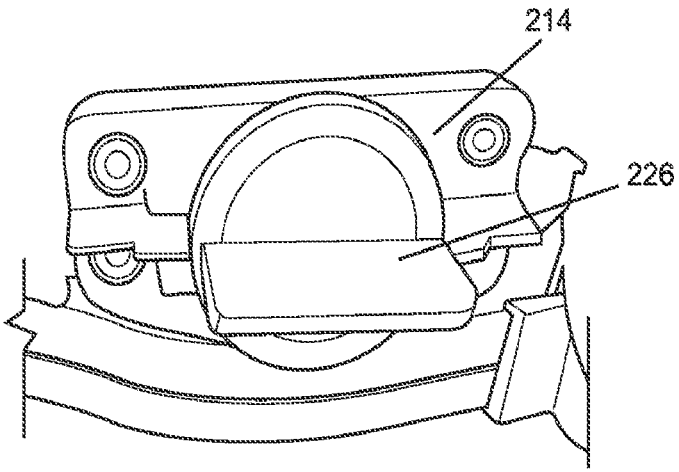
FIG. 27A illustrates a perspective view of a meconium removal assembly with a cap according to an aspect of the disclosure.
Figure 27B:
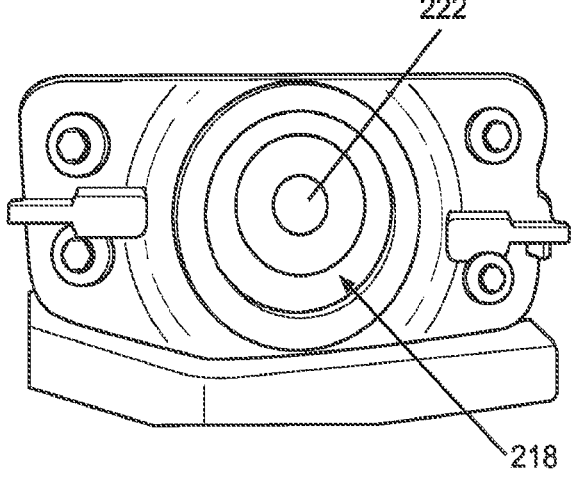
FIG. 27B illustrates a front perspective view of the meconium removal assembly of FIG. 27A without the cap.
Figure 27C:
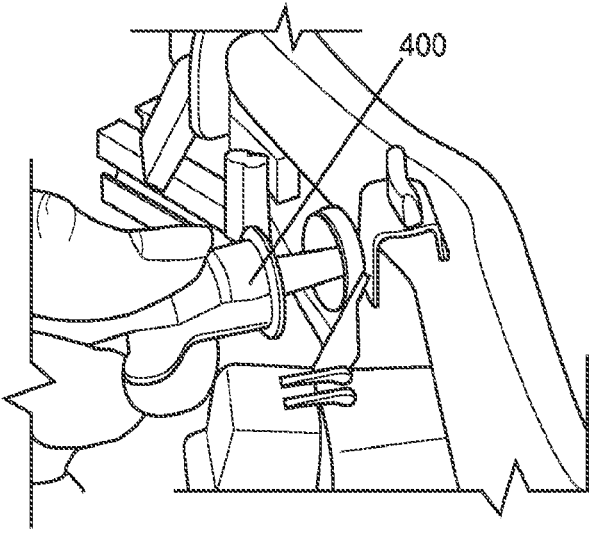
FIG. 27C illustrates a perspective view of the meconium removal assembly of FIGS. 27A and 27B, showing the meconium removal adapter partially inserted into the meconium removal assembly.
Figure 27D:
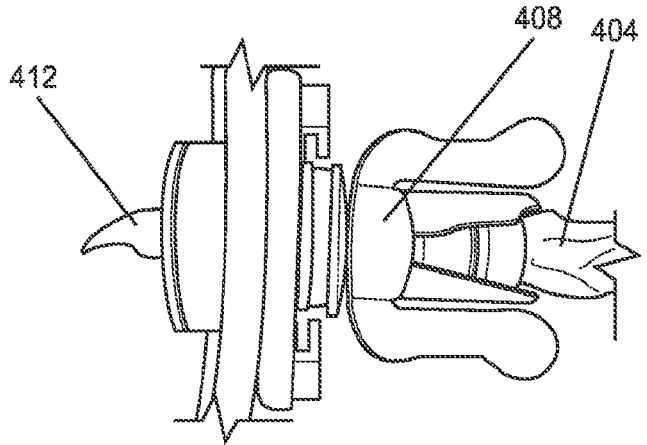
FIG. 27D illustrates a side view of the meconium removal assembly of FIGS. 27A-27C, showing the meconium removal adapter fully inserted into the meconium removal assembly.

In practice, to remove meconium from the growth chamber 120, the user may first prepare the meconium removal assembly 214 for receiving the catheter 404. FIG. 27A depicts an exemplary embodiment of a meconium removal assembly 214 showing the cap 226 engaged therein. The step of preparing the meconium removal assembly 214 may include removing the cap 226, such that the valve 222 is accessible (see FIG. 27B). The user may introduce the adapter 400 into the meconium removal port 218 and through the valve 222. The user may position the head 412 adjacent the valve 222 and apply sufficient force onto the adapter 400 against the valve 222 to open the valve 222. In some aspects, where the head 412 is tapered, the taper may facilitate aligning the adapter 400 with the valve 222. The taper may require less force to be applied by the user to cause the valve 222 to open. FIG. 27C depicts the adapter 400 being partly engaged with the meconium removal assembly 214. The user may then continue to move the adapter 400 through the valve 222 until at least the head 412 and the open second end 411 exit the meconium removal port 214 and are disposed within the growth chamber 120. In some aspects, the user may continue moving the adapter 400 into the meconium removal port 218 and into the growth chamber 120 until the flange 420 contacts the housing 108, precluding further movement of the adapter 400 into the fetal chamber assembly 10. In this step, the adapter 400 may be fully engaged with the meconium removal assembly 214, such that the sterile portion 428 is inside the meconium removal port 218 and/or the growth chamber 120, while the non-sterile portion is outside of the fetal chamber assembly 10. FIG. 27D depicts a fully-engaged adapter 400.

Figure 27E:
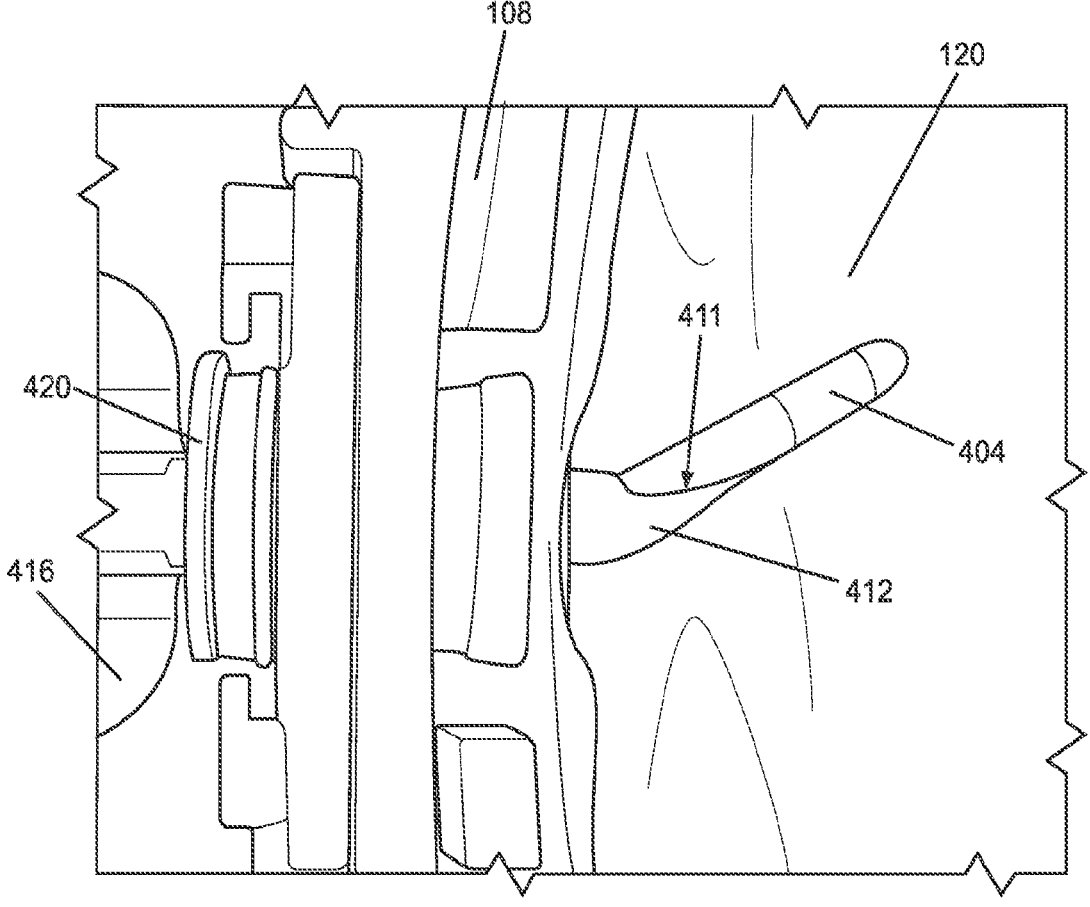
FIG. 27E illustrates a side view of the meconium removal assembly of FIGS. 27A-27D, showing the meconium removal adapter fully inserted into the meconium removal assembly and the suction catheter inserted into the meconium removal adapter.
Figure 28:
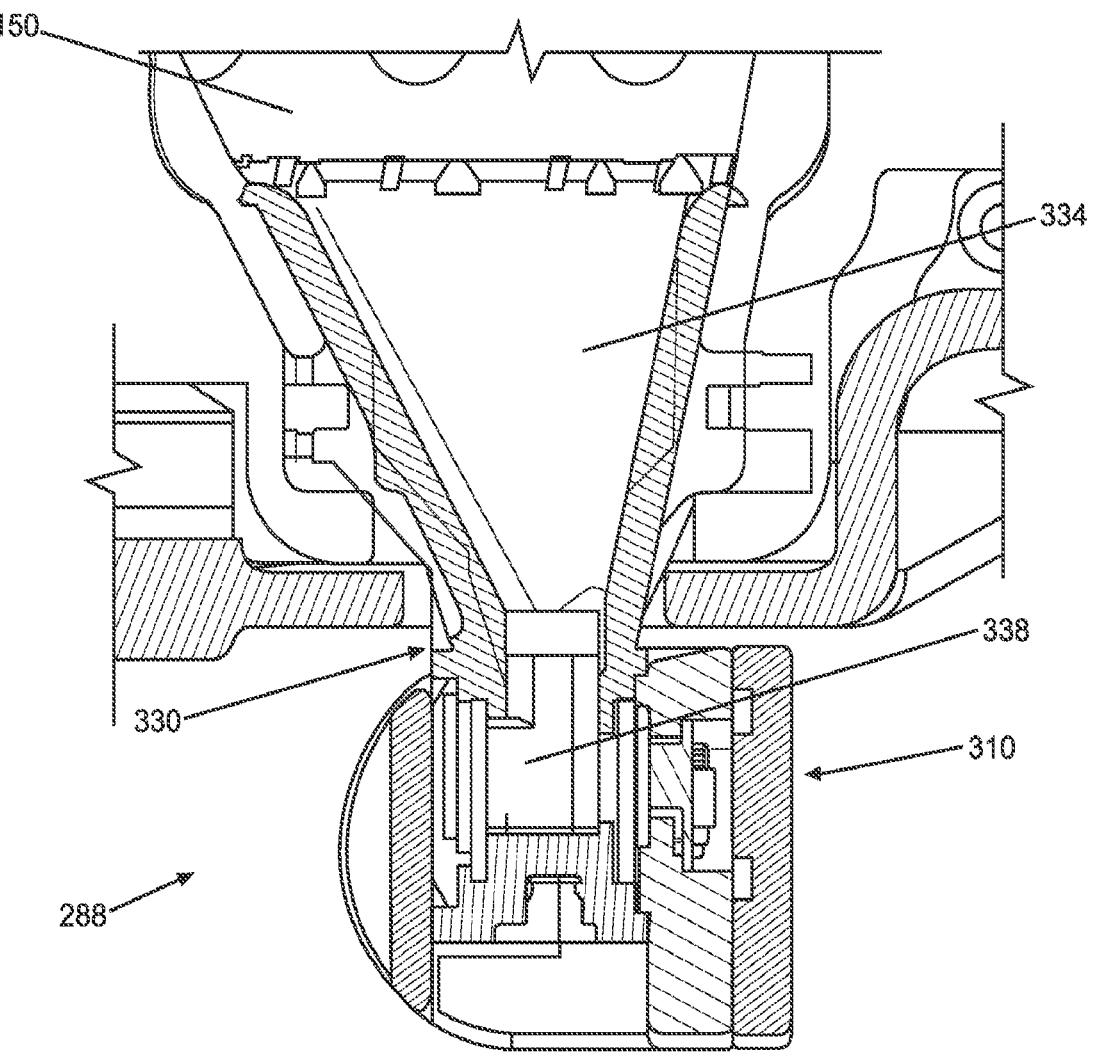
FIG. 28 illustrates a side cross-sectional view of a blood sensor assembly according to an aspect of the disclosure.

The catheter 404 may be connected to the adapter 400 (for example, via engagement of the collar 429 with the retention element 424) prior to moving the adapter 400 through the meconium removal assembly 214. Alternatively, the catheter 404 may be introduced into the adapter 400 after the adapter 400 is fully engaged with the meconium removal assembly 214. The catheter 404 may be fed into the growth chamber 120 through the adapter 400. To direct where the soft catheter 404 should go (e.g. to the region containing meconium), the user may rotate the adapter 400 within the meconium removal assembly 214, such that the open second end 411, through which the catheter 404 exits the adapter 400, is facing the desired direction. In aspects where the head 412 is curved, the step of rotating the adapter 400 allows the user to aim second end 411 in the desired direction. When the adapter 400 is in the preferred direction, the catheter 404 may be fed through the adapter 400. FIG. 27E depicts the catheter 404 having been fed through the adapter 400 and extending out of the second end 411 defined on the curved head 412.

The steps of rotating and orienting the adapter 404 and advancing the catheter 404 therethrough can be repeated as needed until the catheter 404 reaches the meconium. The user may then actuate the external suction device (not shown) connected to the catheter 404 to cause the meconium to be sucked into the catheter 404 and out of the fetal chamber assembly 10. Once the desired meconium is removed, the catheter 404 may be retracted through the adapter 400. The adapter 400 may then be pulled back through the valve 222 and out of the meconium removal port 218. The valve 222 is configured to close to prevent escape of liquid from within the growth chamber 120 as the adapter 400 is removed therefrom. The cap 226 may be re-inserted into the meconium removal port 218. In some aspects, a new, sterile cap 226, which is different from the original cap 226, may be introduced in order to avoid contamination. The steps of removing meconium described above may be repeated as necessary. In some aspects, it may be preferable to not reuse some of the components above, such as the catheter 404, the adapter 400, and/or the cap 226 in order to avoid contamination of the growth chamber 120.

Although the above description provides examples of removing meconium specifically from the growth chamber 120, it will be understood that meconium may be present in other parts of the fetal chamber assembly 10, such as the cannulation chamber 150, and it may be removed via the disclosed meconium removal assembly 214 from those regions as well. In some aspects, the fetal chamber assembly 10 may include additional meconium removal assemblies 214 disposed advantageously on the fetal chamber assembly 10 to allow access to regions where meconium may be present.

The meconium sensor assembly 292 can be configured to detect color changes indicative of presence of meconium, as described above. In some aspects, the meconium sensor assembly 292 may additionally be configured to detect changes of color corresponding to presence of blood in the liquid passing through the outlet channel 206. The presence of blood in the liquid that exits the growth chamber 120 may be indicative of fetal bleeding. Blood in the growth chamber 120 or the cannulation chamber 150 may indicate a leak between one or more cannulated vessels in the umbilical cord and the respective cannulas connected thereto. It is preferable to monitor the fetal chamber assembly 10 for presence of blood and to address such a problem before the fetus can be injured.

Blood Sensor Assembly

As such, aspects of the fetal chamber assembly 10 may include one or more blood sensors configured to detect the presence of blood within the fetal chamber assembly 10. Specifically, the blood sensors may be configured to detect blood in the growth chamber 120, in the cannulation chamber 150, and/or in the outlet channel 206. In some preferred embodiments, as shown for example in FIGS. 3-5, a blood sensor assembly 288 may be disposed within or adjacent to the cannulation chamber 150. In operation, the cannulated umbilical cord of the fetus is disposed, in part, in the cannulation chamber 150. Specifically, the portions of the umbilical cord that is connected to the cannulas is in the cannulation chamber 150. In some instances, one or more blood vessels in the umbilical cord may rupture due to the stresses associated with the cannulation process. In some cases, the blood vessels may become partially or fully disconnected from the respective cannulas connected to them (i.e. decannulated). In such instances, blood may exit the blood vessels of the umbilical cord and enter the cannulation chamber 150, mixing with the liquid therein. Such leaks can lead to fetal blood loss, harming the fetus. Additionally, blood that leaks out of the fetal blood circuit may not have been passed through important components of the external circulation system to which the fetus is connected, and specifically may have not passed through the oxygenator, heater, or other components that ensure proper blood characteristics for fetal development. Blood leaks such as those described above are more common at the region of the cannulation of the umbilical cord. As such, it may be advantageous to dispose the blood sensor 288 in proximity to the cannulation region. In some aspects, it may be beneficial to position the blood sensor assembly 288 downstream of the cannulated portion of the umbilical cord, such that the liquid that flows through the cannulation chamber 150 (e.g. from the second inlet 198) may carry any blood that leaks out towards the blood sensor assembly 288.

Referring to a specific embodiment of a blood sensor assembly 288 as shown in FIGS. 28-34, the blood sensor assembly 288 may include a blood sensor assembly housing 330 and a sensor 310 configured to engage with the housing 330. The housing 330 is designed to be able to receive liquid having blood, if present, therein and to position it such that the fluid can be analyzed by the sensor 310 for presence of blood. As shown in FIGS. 28-33, the housing 330 includes a funnel 334 and a sensing chamber 338 in fluid communication with the funnel 334. The sensing chamber 338 may be spaced from the funnel 334 generally along the vertical direction z. The funnel 334 includes a first opening 332 at one end thereof and a second opening 333 at the other end thereof opposite from, and spaced along the vertical direction from, the first opening 332. Blood, PSS, or other material may enter the funnel 334 at the first opening 332 and flow towards the second opening 333. The blood, PSS, or other material can exit the funnel 334 at the second opening 333 and enter the sensing chamber 338.

The funnel 334 includes a plurality of tapered walls 335 extending between the first opening 332 and the second opening 333. The tapered walls 335 are arranged such that they all taper towards each other along the vertical direction z from the first opening 332 to the second opening 333. The tapered walls 335 are disposed such that the first opening 332 is larger than the second opening 333. For example, opposing tapered walls 335 are spaced farther apart from each other (e.g. either along the transverse direction x or the longitudinal direction y) adjacent to the first opening 332 than adjacent to the second opening 333. The depicted embodiments of blood sensor assemblies 288 are shown having four tapered walls 335. However, it will be appreciated that the funnel 334 may include another suitable number of walls, for example, three walls. In some aspects, the funnel 334 may be conical and may have a single wall extending circumferentially and defining the funnel 334.

The arrangement of the tapered walls 335 described above allows for the funnel 334 to be dimensioned such that any blood present in the liquid in the cannulation chamber 150 can enter the funnel 334 and be moved towards the sensor chamber 338. In general, blood is denser than the liquid (e.g. PSS) present in the cannulation chamber 150. As such, any blood that is present in the liquid will be acted on by gravity such that the blood settles within the liquid to the bottom-most surface ("bottom-most" being defined by the orientation of the fetal chamber assembly 10 in relation to gravity).

Figure 32:
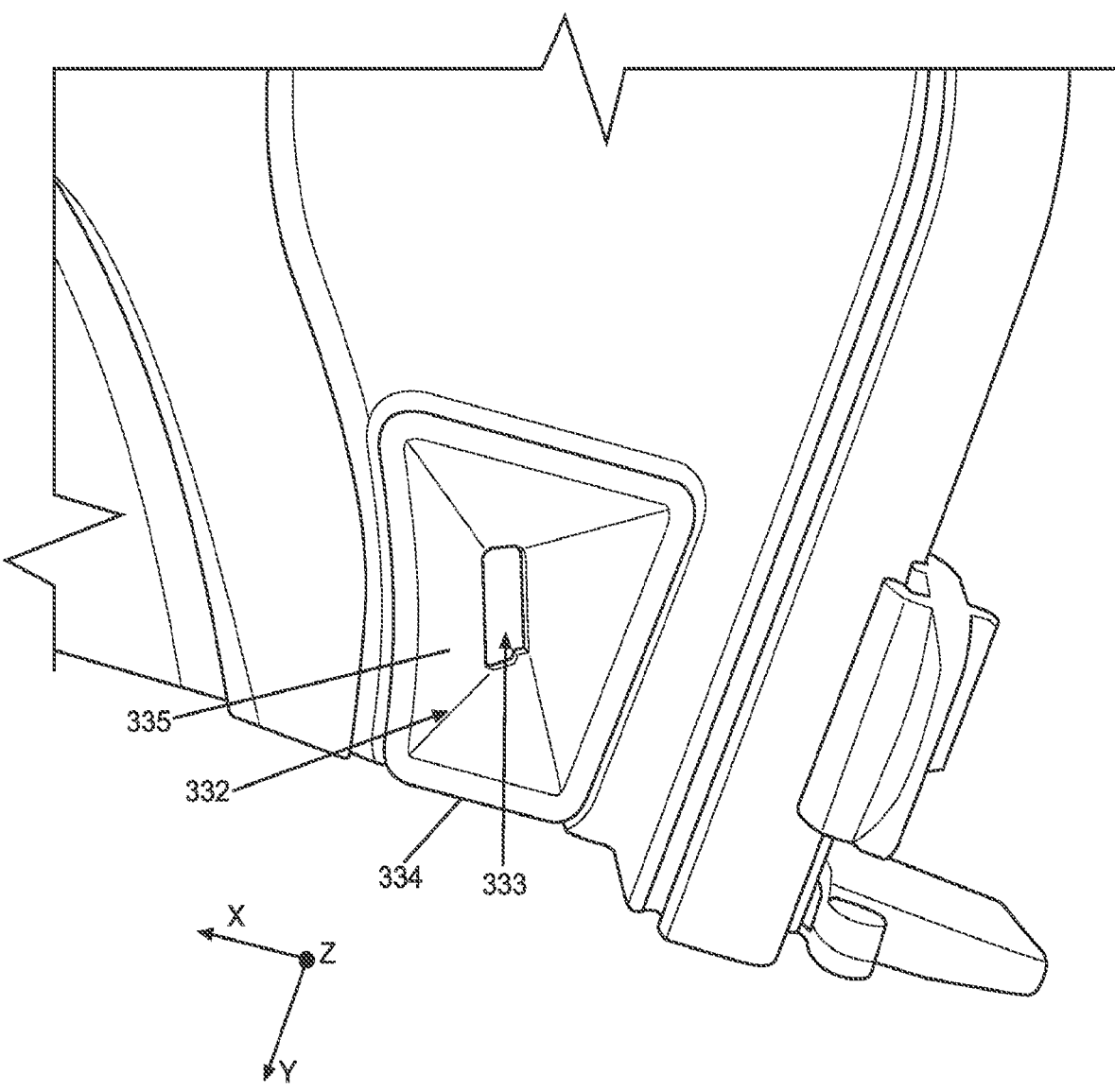
FIG. 32 illustrates a top perspective view of the housing of FIGS. 31A and 31B when in the fetal chamber assembly according to an aspect of the disclosure.
Figure 33:
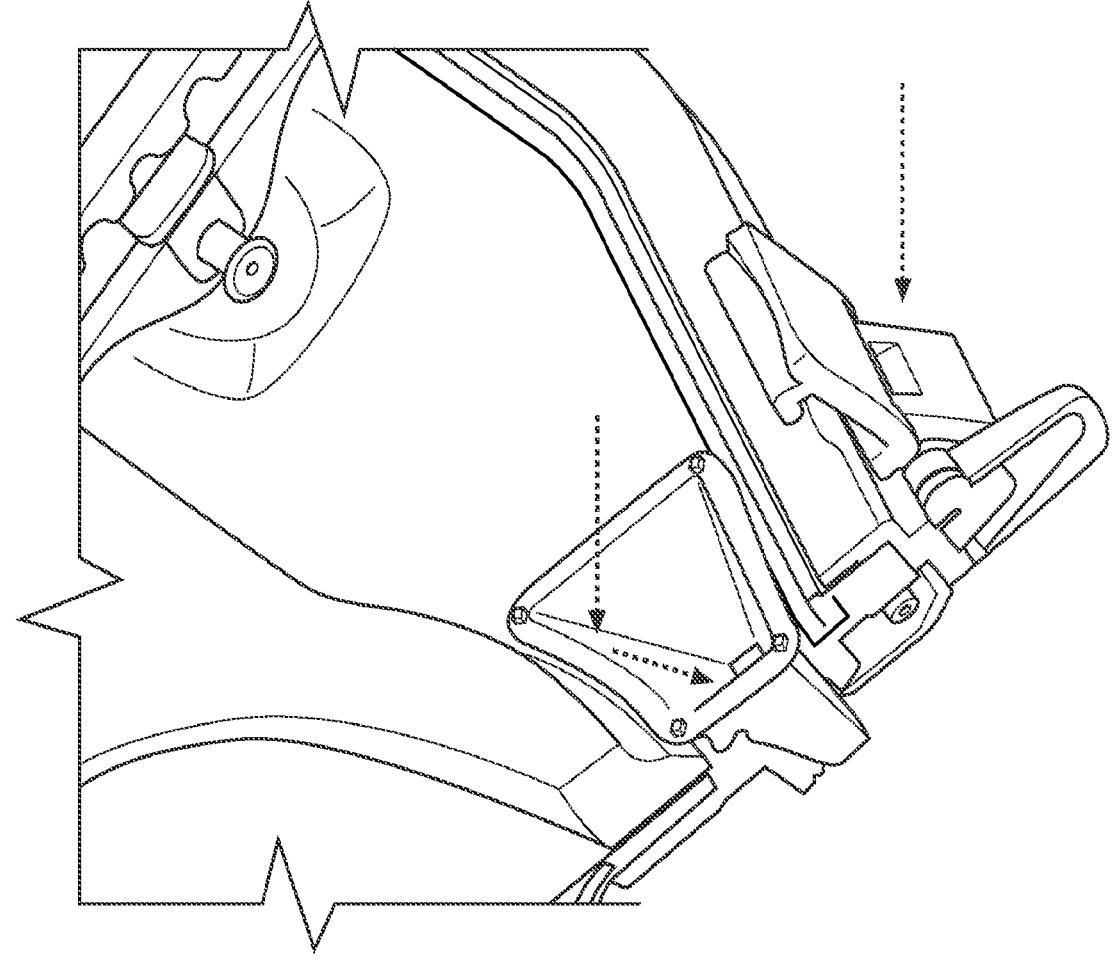
FIG. 33 illustrates a perspective view of the housing of FIG. 32 showing an exemplary blood flow due to gravity into the housing of FIG. 32.

In some aspects, the fetal chamber assembly 10 may be translated and/or rotated along one or more directions or axes. As described previously, the fetal chamber assembly 10 may be translated along the lateral direction x, along the longitudinal direction y, and/or along the vertical direction z. The fetal chamber assembly 10 may be rotated along a pitch axis that is parallel to the lateral direction x, along a roll axis parallel to the longitudinal direction y, and/or along a yaw axis parallel to the vertical direction z. The specific location of each of the pitch, roll, and yaw axes relative to the fetal chamber assembly 10 may differ between various embodiments and is not intended to limit the description below unless indicated otherwise. It is advantageous to monitor the fetal chamber assembly 10 for presence of blood regardless of the relative position of the fetal chamber assembly 10. Thus, it is preferable that the blood sensor assembly 288 is configured to detect blood regardless of its position relative to gravity. FIG. 32 shows an exemplary blood sensor assembly 288 with the tapered walls 335 extending between the first opening 332 and the second opening 333. The slope of each tapered wall 335 may be advantageous to directing blood along the wall 335 from the first opening 332 towards and through the second opening 333 and into the sensing chamber 338. If the fetal chamber assembly 10 is rotated about the roll or pitch axes, gravity may cause any blood present to move relatively downward (in the direction of gravity). FIG. 33 depicts an exemplary rotation of the fetal chamber assembly 10 along the roll axis. The direction of gravity is depicted in FIG. 33. An exemplary depiction of blood flowing within the cannulation chamber 150 is shown. The blood flows parallel to the force of gravity acting on it until the blood contacts the tapered wall 335. The blood then continues to flow along the tapered wall 335 through the funnel 334 towards the sensing chamber 338. Although after contacting the tapered wall 335 the blood does not necessarily flow solely parallel to the force of gravity, the blood flow still follows a generally-downward vector that is parallel to gravity, which causes the blood to continue to flow along the tapered wall 335. The depiction of FIG. 33 is intended to show just one possible arrangement of the fetal chamber assembly 10 and how blood would flow into and through the funnel 334 as acted on by gravity. It will be appreciated that the fetal chamber assembly 10 may be rotated along the roll axis in either direction, as well as rotated along the pitch axis in either direction. In all anticipated positions of the fetal chamber assembly 10, blood present in the cannulation chamber 150 may follow a similar pattern as shown in FIG. 33—that is, blood may flow through the liquid in the cannulation chamber 150 parallel to gravity until the blood contacts a tapered wall 335, at which point the blood will continue to flow along the tapered wall 335 until it flows into the sensing chamber 338.

Figure 34:
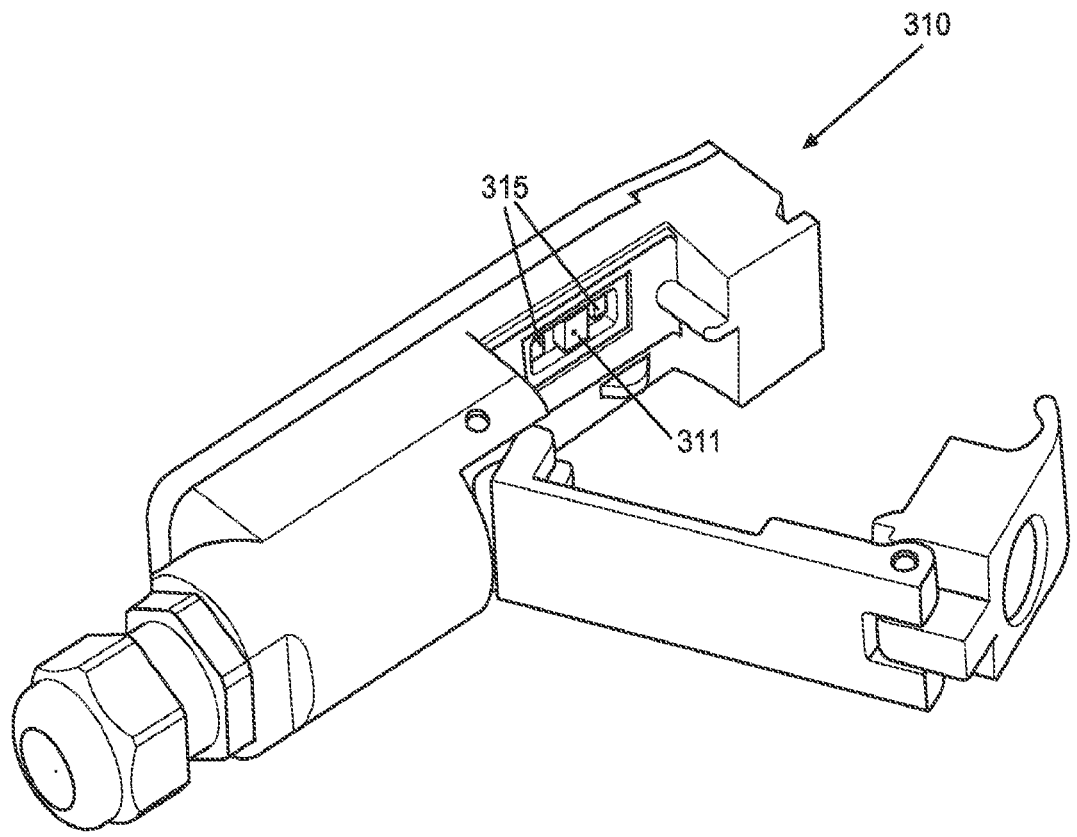
FIG. 34 illustrates an isometric perspective view of a sensor according to an aspect of the disclosure.

As shown in FIGS. 28-31B, the sensing chamber 338 is disposed adjacent to the sensor 310. The sensor 310 may be similar in structure and functionality as the sensor 310 described above with respect to the meconium sensor assembly 292. Components described above with respect to the sensor 310 in the meconium sensor assembly 292 may have the structure and functionality here, and like reference numerals may be used to depict like components. It will be appreciated that the physical dimensions of the sensor 310 in the blood sensor assembly 288 may differ from those of the sensor 310 of the meconium sensor assembly 292. The physical parameters, size, dimensions, and arrangement of components may differ, but it should be understood that the functional components disclosed may operate largely in the same manner as described in previous embodiments. An exemplary sensor 310, such as one used with the blood sensor assembly 288, is depicted in FIG. 34. The sensor 310 includes at least a camera 311 and a light source 315. As shown in FIG. 34, some embodiments may include two light sources 315. The camera 311 of the blood sensor assembly 288 may be substantially the same as the camera 311 of the meconium sensor assembly 292.

Figure 29:
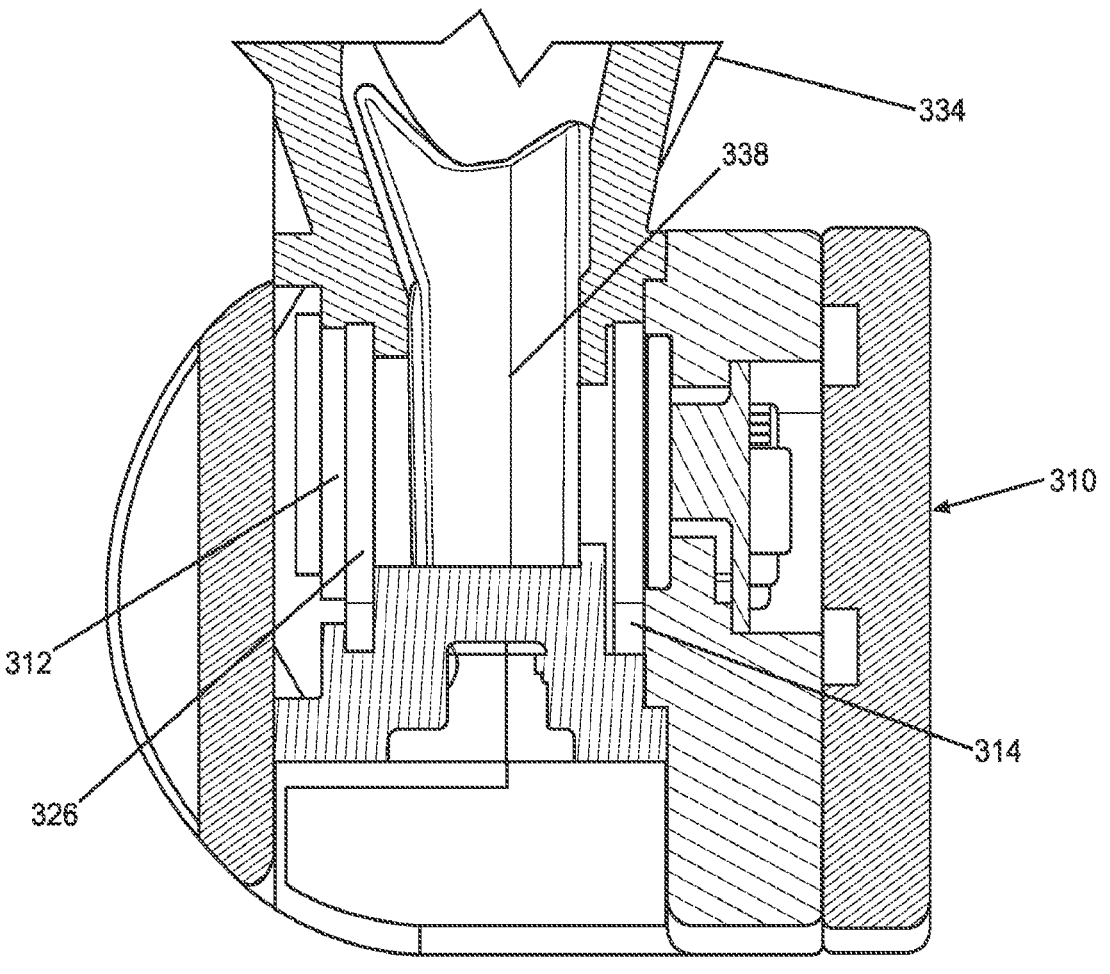
FIG. 29 illustrates a side cross-sectional view of a portion of the blood sensor assembly of FIG. 28.
Figure 30:
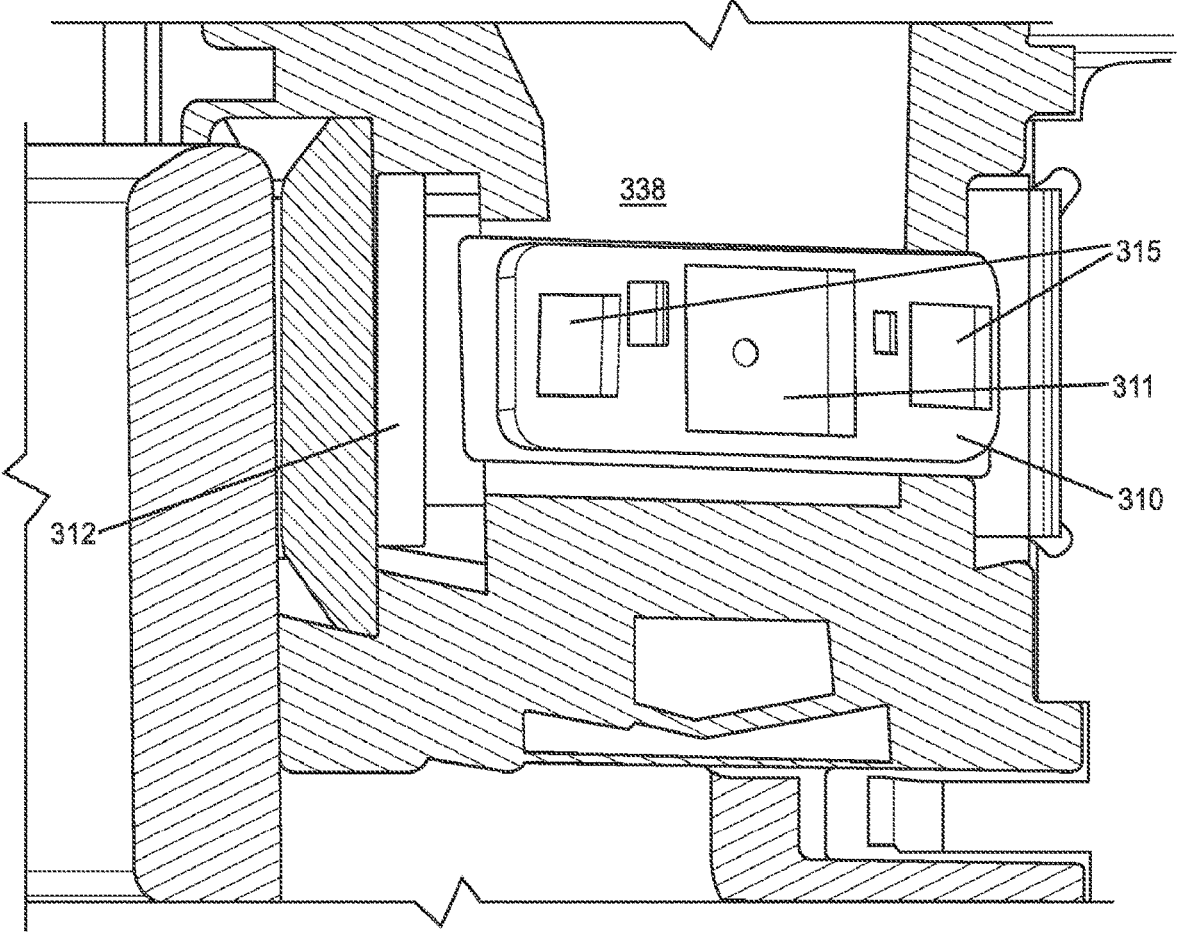
FIG. 30 illustrates a perspective view of a portion of the blood sensor assembly of FIGS. 28 and 29.
Figures 31A, 31B:
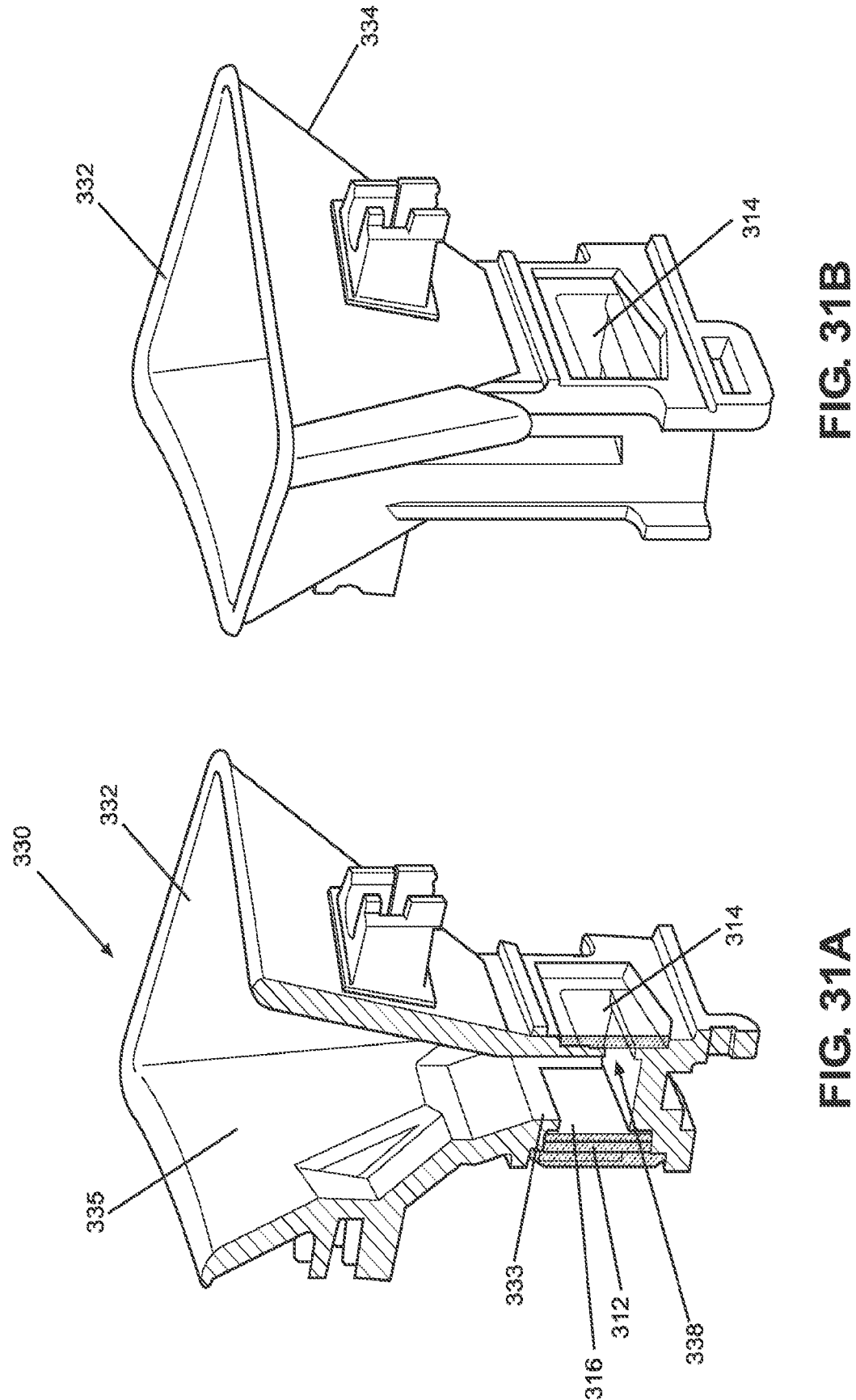
FIG. 31A illustrates a cross-sectional perspective view of the housing of the blood sensor assembly of FIGS. 28-30.
FIG. 31B illustrates a perspective view of the housing of FIG. 31A.

As shown in FIGS. 29 and 30, the sensor 310 is configured to engage with the housing 330. A reflector surface 312 is disposed opposite the camera 311. The sensing chamber 338 may be defined between the camera 311 and the reflector surface 312. The reflector surface 312 may be disposed on the sensor 310 or (as shown in FIGS. 31A and 31B) on the housing 330. A first window 314 may be disposed between the camera 311 and the reflector surface 312. In some aspects, a second window 316 may be disposed between the camera 311 and the reflector surface 312 and be spaced from the first window 314. It will be understood that the camera 311 should have a line of sight to the reflector surface 312 through any of the first and/or second windows 314, 316. The sensor 310 may include a controller and processor as described above and may function in largely the same manner. The sensor 310 may be configured to observe the color parameters of the fluid flowing between the camera 311 and the reflector surface 312 to detect present of blood. For this particular application, the sensor 310 may be configured to focus on red or related colors on the visible light spectrum. If color within the programmed range is detected, it may be indicative of presence of a particular material. In the preferred aspects, for example, if the camera 311 detects a red (or similar) color, this may be indicative of presence of blood. Detection of the desired hue, saturation, brightness, or other parameters may be used to estimate presence of, and quantity of, blood in the fluid passing through the blood sensor assembly 288. It will be appreciated that the fluid flowing through the blood sensor assembly 288 may include various colors, and so configuring the sensor to focus only on colors pertaining to the material being monitored (e.g. blood) can help prevent false-positives. If the camera 311 detects presence of a color within the programmed color range, the controller may be configured to notify the user, trigger an alarm, or modify operation of the fetal chamber assembly 10. In some aspects, if blood is detected in the fetal chamber assembly 10, it is preferable to stop the blood leak before injury to the fetus or damage to the system occurs. Specific mechanisms for doing so will be discussed below.

Emergency Shut Off Assembly

In operation of the fetal chamber assembly 10, the umbilical cord is disposed, in part, in the cannulation chamber 150. One or more cannulas may be connected to respective blood vessels of the umbilical cord. The umbilical cord extends from the fetus into the cannulation chamber 150 via the opening 166. The portion of the umbilical cord that is cannulated is preferably entirely within the cannulation chamber 150 between the cannula entrance 162 and the opening 166. In some instances, one or more cannulas that are connected to blood vessels in the umbilical cord may become disconnected from the respective blood vessels. This may happen if the cannulas are moved, if the fetus is moved, or due to a fetal physiological response. In the event of such decannulation, the fetal blood that is moving through the blood vessels and the cannulas may begin to leak into the cannulation chamber 150, leading to blood loss. Blood may be detected in the fetal chamber assembly 10 via one or more blood sensor assemblies 288 described above.

When a blood vessel is decannulated such that a blood leak occurs, it may be advantageous to stop and contain the blood flow so that blood does not continue to flow out of the umbilical cord. As such, in some aspects of the fetal chamber assembly 10 described throughout this application, an emergency shutoff mechanism is envisioned to allow for blocking blood flow through the umbilical cord in the event of a leak.

Figure 35:
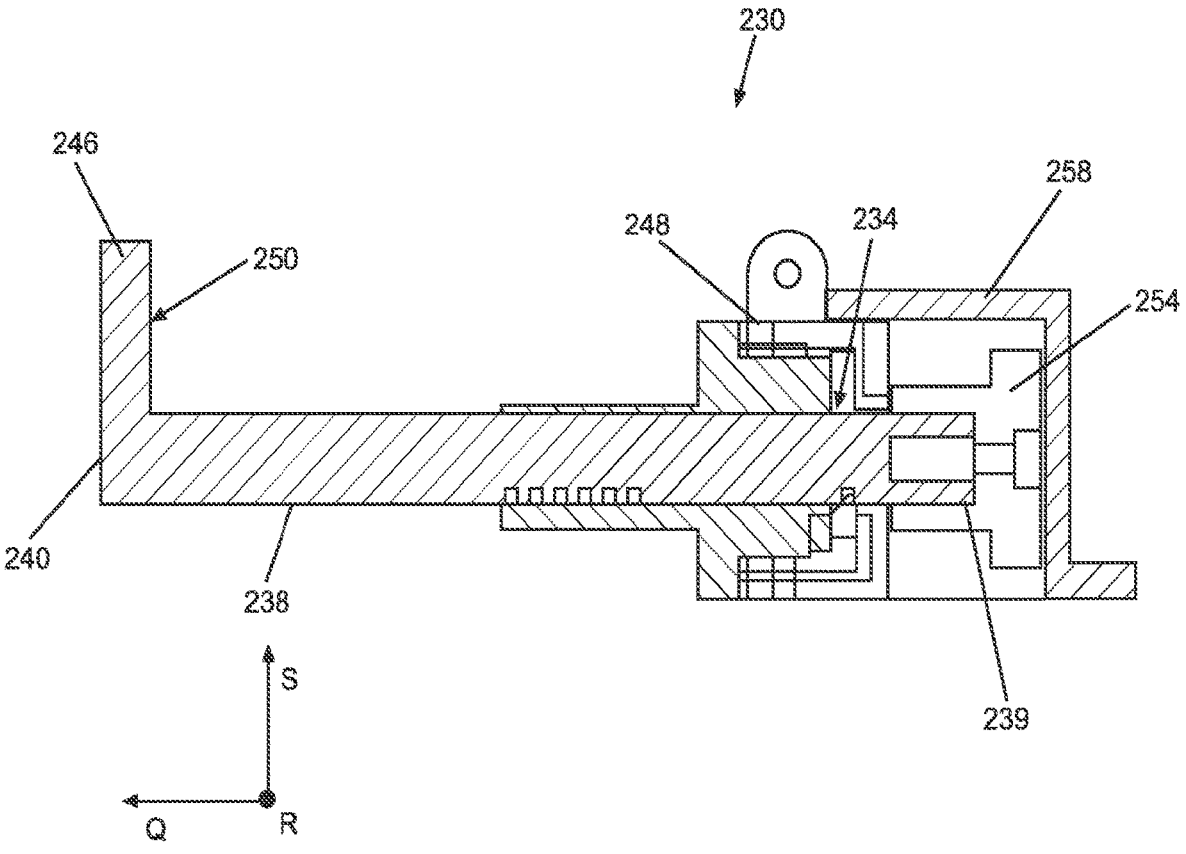
FIG. 35 illustrates a side cross-sectional view of an emergency shutoff assembly according to an aspect of the disclosure.
Figure 36:
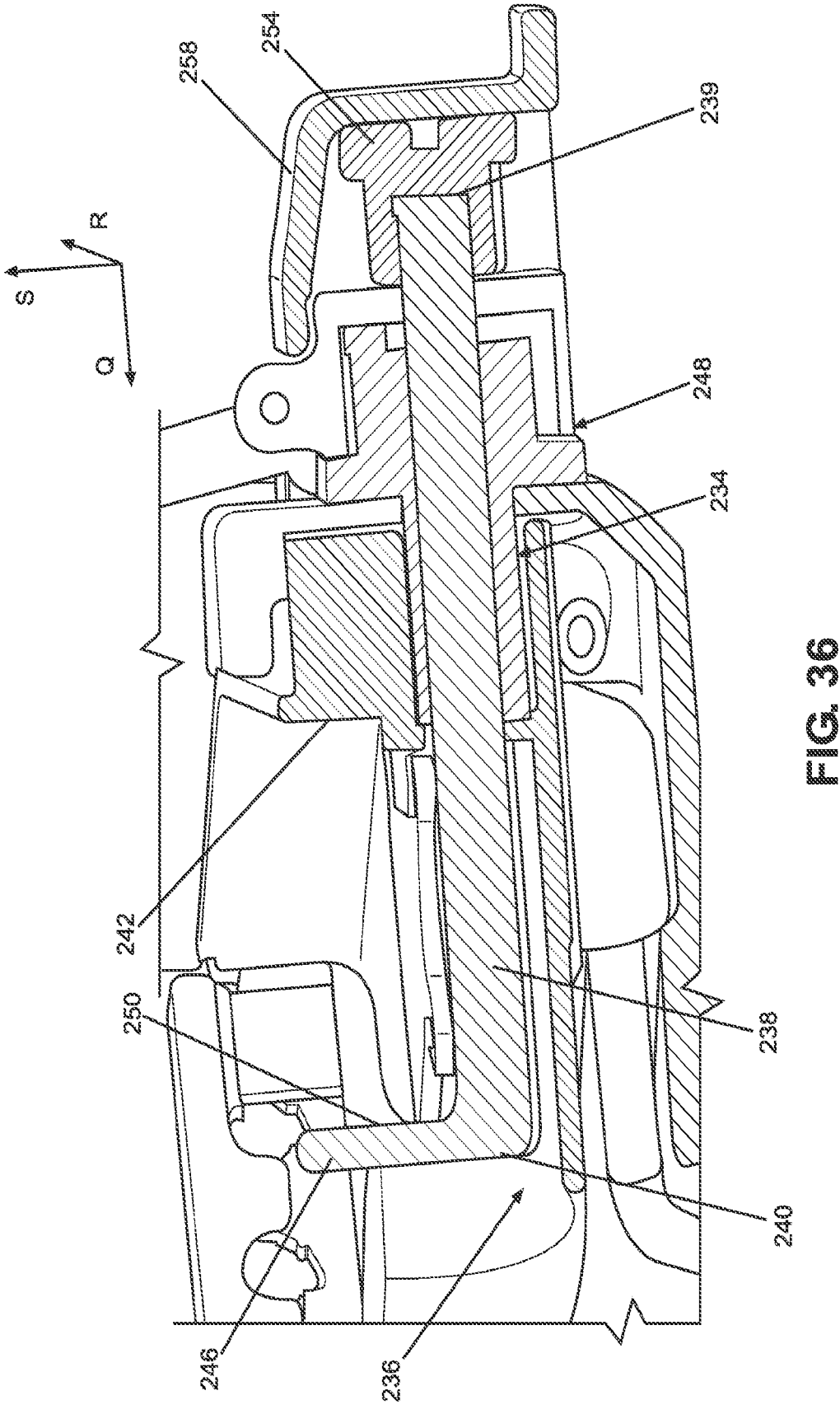
FIG. 36 illustrates a perspective cross-sectional view of the emergency shutoff assembly of FIG. 35 shown within the fetal chamber assembly according to an aspect of the disclosure.
Figure 37:
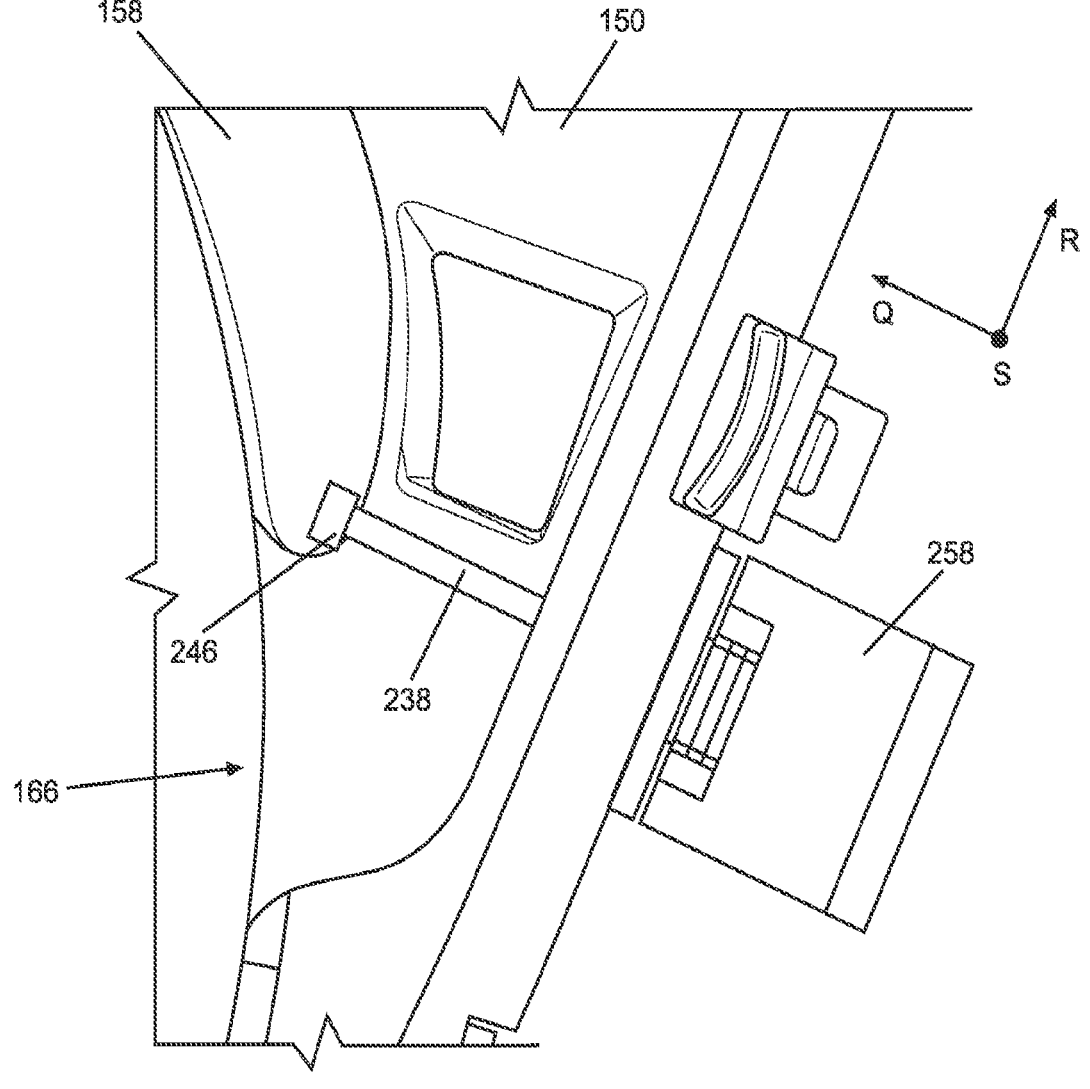
FIG. 37 illustrates a top view of the emergency shutoff assembly of FIGS. 35 and 36.
Figure 38:
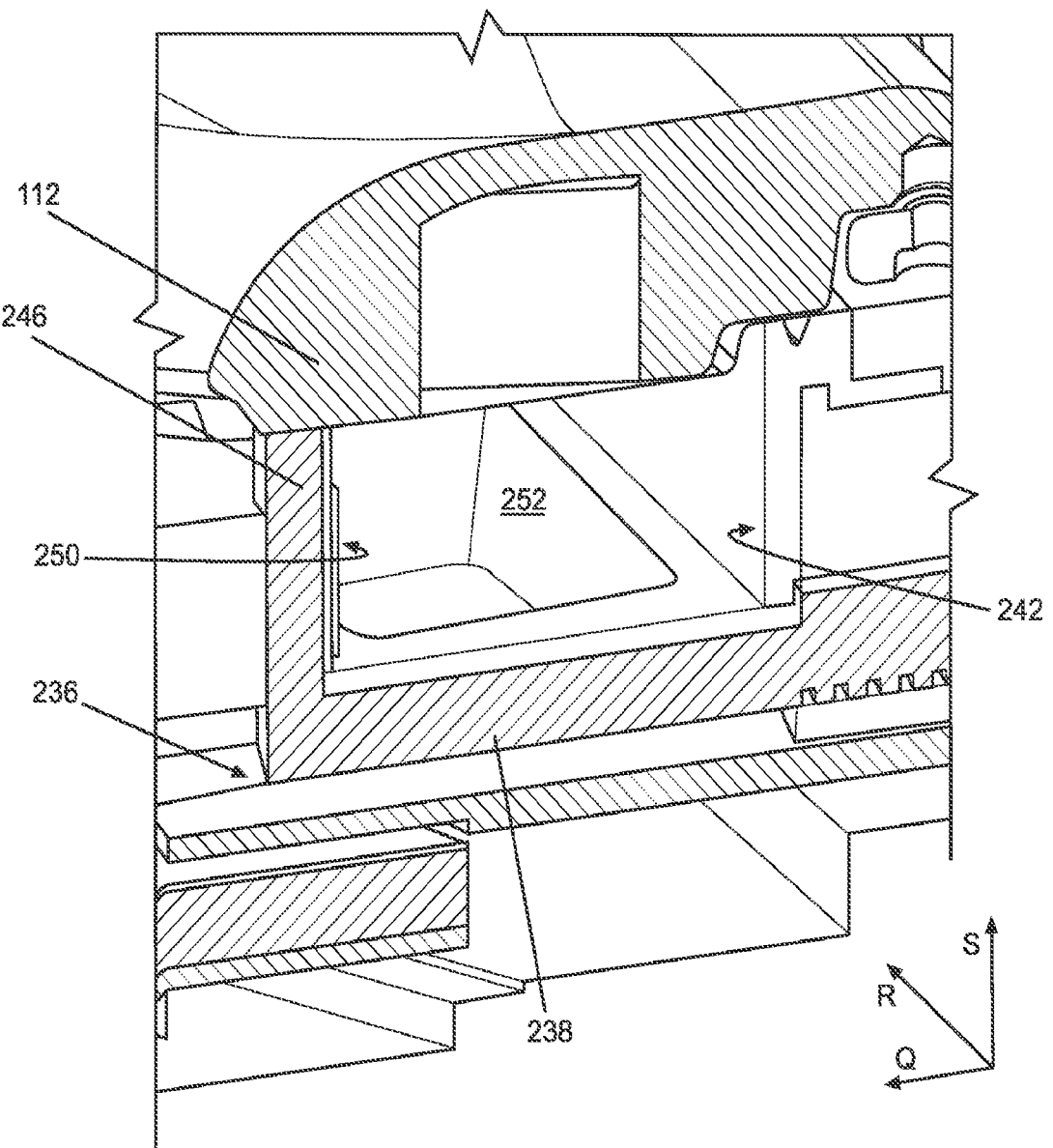
FIG. 38 illustrates another perspective cross-sectional view of the emergency shutoff assembly of FIGS. 35-37.

As shown in FIGS. 2-5, an emergency shutoff assembly 230 is disposed within the base 100. The emergency shutoff assembly 230 may be disposed such that the umbilical cord may be secured to stop blood flow therethrough in the region of the umbilical cord located in the cannulation chamber 150. That is, the emergency shutoff assembly 230 may be configured to block blood flow through the umbilical cord at a portion of the umbilical cord disposed between the opening 166 and the cannula entrance 162. FIG. 35 depicts a cross-sectional view of an exemplary emergency shutoff assembly 230 according to an aspect of the disclosure. FIGS. 36-38 show an emergency shutoff assembly 230 within the fetal chamber assembly 10. A separate set of coordinates is depicted with respect to the emergency shutoff assembly 230 that is separate from the set of coordinates referring to the fetal chamber assembly 10, and includes an axial direction q, a lateral direction r that is perpendicular to the axial direction q, and a vertical direction s that is perpendicular to both the axial and lateral directions q and r.

The emergency shutoff assembly 230 may have a first configuration and a second configuration different from the first configuration. In the first configuration, the emergency shutoff assembly 230 is open such that the umbilical cord in the cannulation chamber 150 is not clamped and blood is permitted to flow therethrough. In the second configuration, the emergency shutoff assembly 230 is closed such that the umbilical cord in the cannulation chamber 150 is clamped to prevent blood from flowing therethrough. The emergency shutoff assembly 230 may be moved from the first, open configuration to the second, closed configuration in the event of decannulation, blood loss, fetal trauma, or another medical emergency, in which it may be advantageous to stop blood flow through the umbilical cord. The emergency shutoff assembly 230 may be moved to the second configuration manually by a user or automatically in response to a stimulus. In some preferred embodiments, the user may actuate the emergency shutoff assembly 230 from outside the fetal chamber assembly 10 to cause the emergency shutoff assembly 230 to move to the second configuration.

Referring to the above referenced FIGS. 35-38, an emergency shutoff assembly 230 includes a movable body 238 that is configured to move relative to the housing 108. A channel 236 may be defined in the housing 108 within which the body 238 may be moved. The body 238 is configured to move in a first direction along the axial direction q or in a second direction opposite the first direction along the axial direction q. The body 238 may be disposed inside the cannulation chamber 150. The body 238 may have a first end 239 and a second end 240 spaced from the first end 239 along the axial direction q. In some aspects, the body 238 may be configured to be disposed, at least in part, within housing 108 or outside of the fetal chamber assembly 10, where the housing 108 is positioned between the cannulation chamber 150 and at least a part of the body 238. The body 238 may extend across the cannulation chamber 150, for example between the housing 108 and the dividing wall 158. The body 238 may extend along the axial direction q orthogonally to the housing 108, but it will be understood that the body 238 may be disposed at other angles relative to the housing 108 as well. It will be further appreciated that the specific dimensions of the body 238 will depend on the size of the fetal chamber assembly 10, and specifically, for example, the size of the cannulation chamber 150 and the distance between the dividing wall 158 and the housing 108.

A shutoff port 234 may be defined in the housing 108 and may extend entirely through the housing 108, such that the shutoff port 234 is open to both the cannulation chamber 150 and the environment outside of the fetal chamber assembly 10. The shutoff port 234 may be defined through the housing 108 along the axial direction q. The body 238 may be configured to move, at least in part, within the shutoff port 234. The shutoff port 234 may include a seal therein or thereon configured to prevent liquid from inside the cannulation chamber 150 to move outside of the shutoff port 234 and to prevent contaminants or debris from entering the cannulation chamber 150 through the shutoff port 234. It will be understood that, in aspects where the seal 298 is disposed on the interior of the housing 108 and is between the body 238 and the shutoff port 234 extending through the housing, that the shutoff port 234 may extend through the seal 298 as well.

The body 238 is operatively connected to an actuator 254 that is configured to cause the body 238 to move. The actuator 254 may be direct affixed to the body 238, or, alternatively, the actuator 254 may be connected to the body 238 via one or more intermediate components. In some aspects, the actuator 254 may be a handle. In alternative aspects, the actuator 254 may be a lever, a button, or another suitable mechanism configured to cause the body 238 to move. In some preferred embodiments, as depicted in FIGS. 35-38, the actuator 254 may be a handle configured to be pulled by a user to cause the body 238 to move and to transition the emergency shutoff assembly 230 into the second, closed configuration. In some aspects, such as the alternative embodiment depicted in FIGS. 41A and 41B, the actuator 254 may be a button configured to be pushed by a user to cause the body 238 to move.

The actuator 254 may be disposed on the exterior of the fetal chamber assembly 10 such that it is separated from the cannulation chamber 150 by at least a portion of the housing 108. In some aspects, at least a portion of the actuator 254 may be disposed within the shutoff port 234. An optional lid 258 may be disposed adjacent the actuator 254 and be configured to cover the actuator 254. The lid 258 may be advantageous to prevent accidental movement of the actuator 254. The lid 258 may be attached to the housing 108 via a known mechanism, such as hingedly, screwed on, friction fit, or via break-away connection.

The body 238 includes a head 246 extending away from the body 238. In some aspects, as depicted in FIGS. 35-38, the head 246 may extend orthogonally away from the body 238, for example along the vertical direction s. The head 246 may extend generally away from the base 100. The head 246 defines a clamping surface 250 thereon, which is configured to face the housing 108 and the shutoff port 234. The clamping surface 250 may be arranged in a plane defined by the vertical direction s and the lateral direction r, and may be orthogonal to the axial direction q. The specific orientation of the clamping surface 250 may be arranged differently and may depend on the respective arrangement of a base surface 242, as will be discussed below.

A base surface 242 is defined on the housing 108 or on the seal 296 and may be adjacent the shutoff port 234. The base surface 242 may be disposed in the plane defined by the lateral direction r and the vertical direction s. In preferred embodiments, the base surface 242 may be parallel to the clamping surface 250 and may be spaced from the clamping surface 250 along the axial direction q. The position, dimensions, and arrangement of the clamping surface 250 and the base surface 242 should be selected such that they are configured to contact the umbilical cord with sufficient pressure to close blood vessels within the umbilical cord.

As shown in FIG. 38, when the emergency shutoff assembly 230 is in the first, open configuration, a cross-sectional area 252 is defined by the clamping surface 250, the base surface 242, and the body 238. When the fetal chamber assembly 10 is in the closed configuration such that the lid 112 is engaged with the base 100, the space is further defined by the lid 112. The umbilical cord may be arranged to pass through this cross-sectional area 252. When the emergency shutoff assembly 230 is moved to the second, closed position, the body 238 and the head 246 are moved along the axial direction q towards the base surface 242. When the emergency shutoff assembly 230 is in the second position, the cross-sectional area 252 is still defined by the clamping surface 250, the base surface 242, and the body 238, but the cross-sectional area 252 is smaller than when the emergency shutoff assembly 230 is in the first position. The umbilical cord extending through the cross-sectional area 252 is retained within the cross-sectional area 252 regardless of whether the emergency shutoff assembly 230 is in the first position or in the second position. So, when the fetal assembly 10 is operational, the umbilical cord may be configured to always be positioned within the cross-sectional area 252 such that a portion of the umbilical cord is always disposed between the clamping surface 250 and the base surface 242. This ensures that the umbilical cord can always be compressed due to the relative movement of the clamping surface 250 with the base surface 242. By ensuring that the umbilical cord is retained within the cross-sectional area 252 between the clamping surface 250 and the base surface 242, the umbilical cord is prevented from being inadvertently moved into such an arrangement that at least a portion of the umbilical cord is not positioned between the clamping surface 250 and the base surface 242.

In some aspects, the emergency shutoff assembly 230 may include a device configured to prevent accidental reversal of the shutoff process. In preferred embodiments, a ratcheting mechanism 248 may be configured to engage with the body 238, the actuator 254, or both, to prevent the emergency shutoff assembly 230 from being moved from the second, closed position back to the first, open position. In some aspects, when the body 238 is moved towards the base surface 242, the ratcheting mechanism 248 (or similar device) may prevent the body 238 from moving in the opposite direction away from the base surface 242. The ratcheting mechanism 248 may allow for securing the base surface 242 and the clamping surface 250 relative to each other such that the cross-sectional area 252 has a desired size to accommodate the size of the umbilical cord being disposed therein. Such an arrangement allows for the emergency shutoff assembly 230 to be utilized with umbilical cords of varying sizes. In some aspects, a lock may be used instead or in addition to the ratcheting mechanism 248. Having such a device may prevent accidental unclamping of the umbilical cord after the emergency shutoff assembly 230 had been moved to the second position to clamp the umbilical cord and stop blood from flowing therethrough. Unintentional unclamping of the umbilical cord may lead to blood loss, injury to the fetus, or contamination of the fetal chamber assembly 10.

Figure 39B:
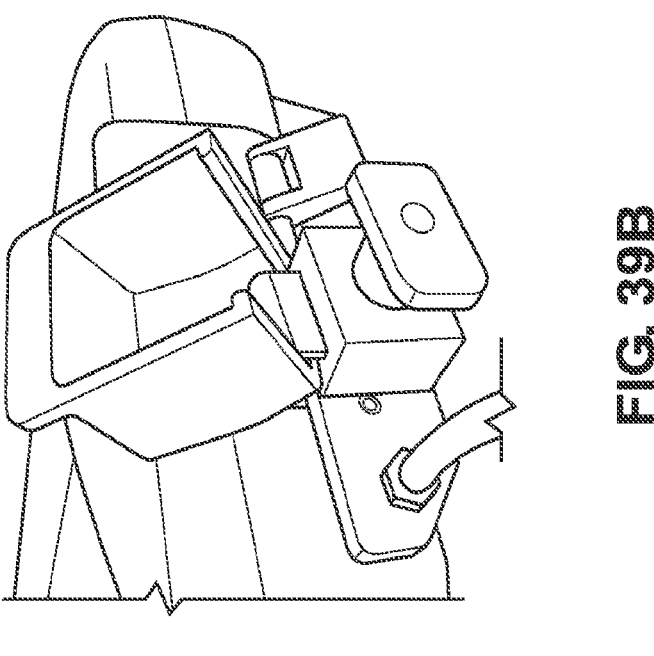
FIG. 39B illustrates an isometric view of the emergency shutoff assembly of FIG. 39A, showing an open lid.
Figure 39A:
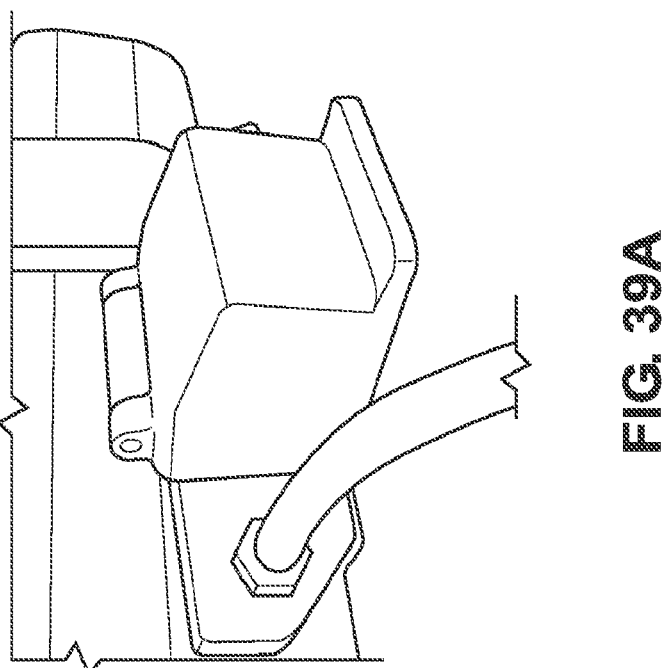
FIG. 39A illustrates an isometric view of an emergency shutoff assembly according to another aspect of the disclosure, showing a closed lid.

FIGS. 39A and 39B depict another embodiment of the emergency shutoff assembly 230. FIG. 39A shows the lid 258 in a closed position, such that the lid 258 covers the actuator 254. The lid 258 is shown hingedly attached to housing 108. In FIG. 39B, the lid 258 is shown in the open position, having been pivoted about the hinged attachment, such that the actuator 254 is uncovered. In FIG. 39B, a user may grasp the actuator 254 and actuate the emergency shutoff assembly 230 from the first configuration to the second configuration to secure the umbilical cord. As depicted in FIGS. 39A and 39B, the actuator 254 may be a handle, and the user may pull the handle away from the housing 108 to actuate the emergency shutoff assembly 230.

Figure 40:
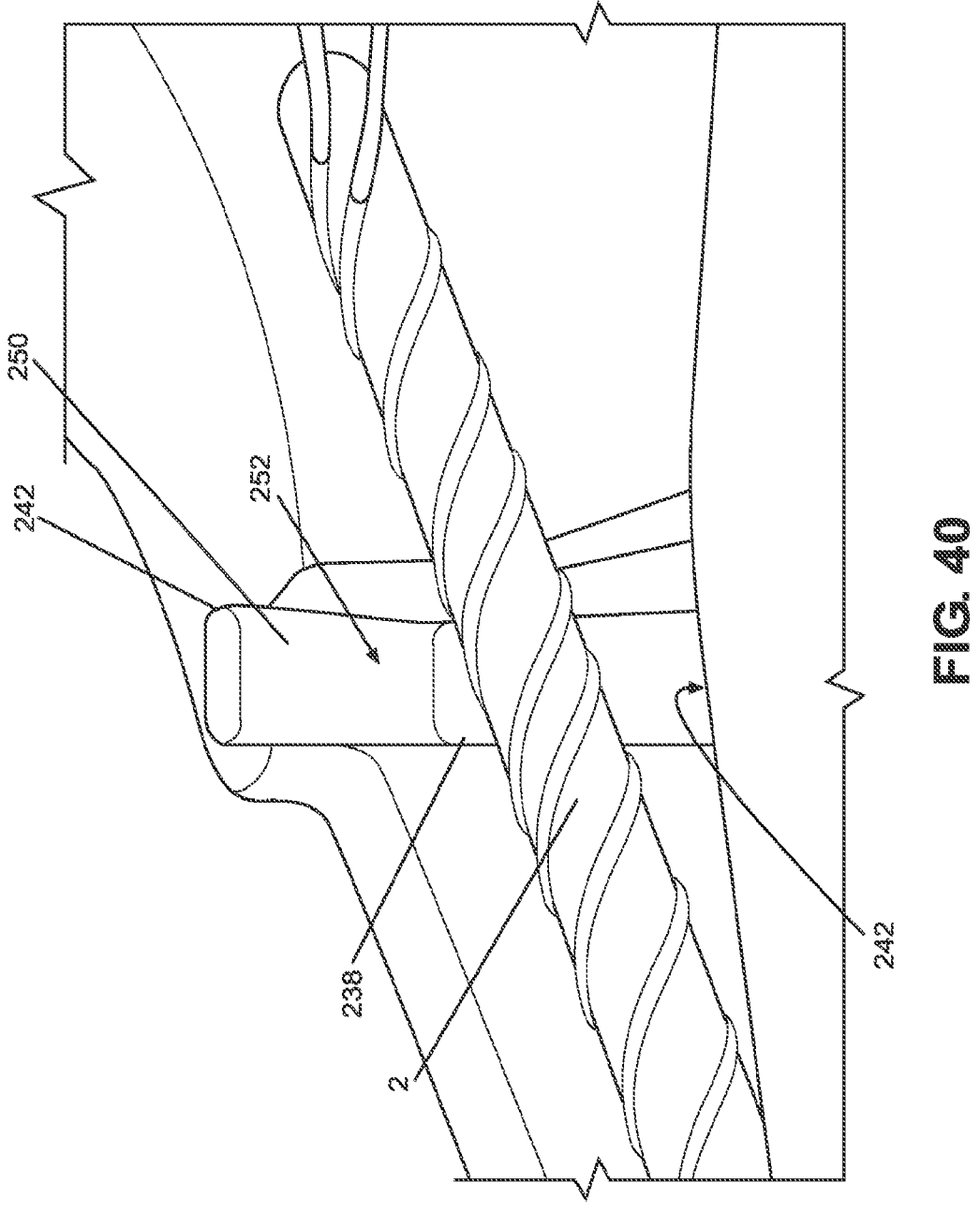
FIG. 40 illustrates another isometric view of the emergency shutoff assembly of FIGS. 39A and 39B, showing an umbilical therein.

FIG. 40 depicts an exemplary setup of the emergency shutoff assembly 230 shown in FIGS. 39A and 39B, where an umbilical cord 2 is disposed in the cross-sectional area 252 defined between the contact surface 250 and the base surface 242 on the housing 108. In FIG. 40, the emergency shutoff assembly 230 is in the first, open position, where the umbilical cord 2 is within the cross-sectional area 252 but is not securely clamped between the contact surface 250 and the base surface 242. It will be appreciated that in practice, the umbilical cord 2 may contact the contact surface 250 or the base surface 242 while still not being forcefully clamped between the two surfaces. In the second, closed position of the emergency shutoff assembly 230, the umbilical cord 2 is forcefully acted on by the contact and base surfaces 250, 242 such that one or more blood vessels in the umbilical cord 2 are blocked and does not permit blood to flow therethrough.

In operation, the umbilical cord is cannulated and disposed in the cannulation chamber 150. The emergency shutoff assembly 230 is in its first position, where the umbilical cord is not clamped between the contact and base surfaces 250, 242. If one or more cannulas that are connected to the umbilical cord become dislodged and blood begins to leak, it may be advantageous to clamp the umbilical cord such that the blood vessels therein no longer allow blood flow through them to prevent further blood loss. In such an event, the user may use the actuator 254 to transition the emergency shutoff assembly 230 from its first position to its second position as explained above. In some aspects with an optional lid 258, the user may first move the lid 258 so that the actuator 254 is accessible. When the emergency shutoff assembly 230 is in the second position, the umbilical cord is securely clamped between the contact and base surfaces 250, 242, and blood is no longer permitted to flow through the blood vessels therein. In some aspects, this action cannot be reversed by the user simply moving the actuator 254 in another direction. After the umbilical cord has been clamped shut, the user may open the fetal chamber assembly 10 to access the umbilical cord.

In some aspects, the act of clamping the umbilical cord may damage one or more blood vessels or surrounding tissue in the umbilical cord. As such, it may be preferable to not reuse the same section of the umbilical cord. In such cases, it may be advantageous to sever the umbilical cord adjacent to the cross-sectional area 252 between the cross-sectional area 252 and the fetus. The severed umbilical cord can then be cannulated anew. The user may then reset the emergency shutoff assembly 230 by moving it from the second position to the first position and placing the re-cannulated umbilical cord back into the cannulation chamber 150, such that the umbilical cord extends through the cross-sectional area 252. The step of resetting the emergency shutoff assembly 230 may be performed from inside the fetal chamber assembly 10. This step may involve moving the body 238 along the axial direction q away from the housing 108. This step may be accomplished without using the actuator 254.

Figure 41A:
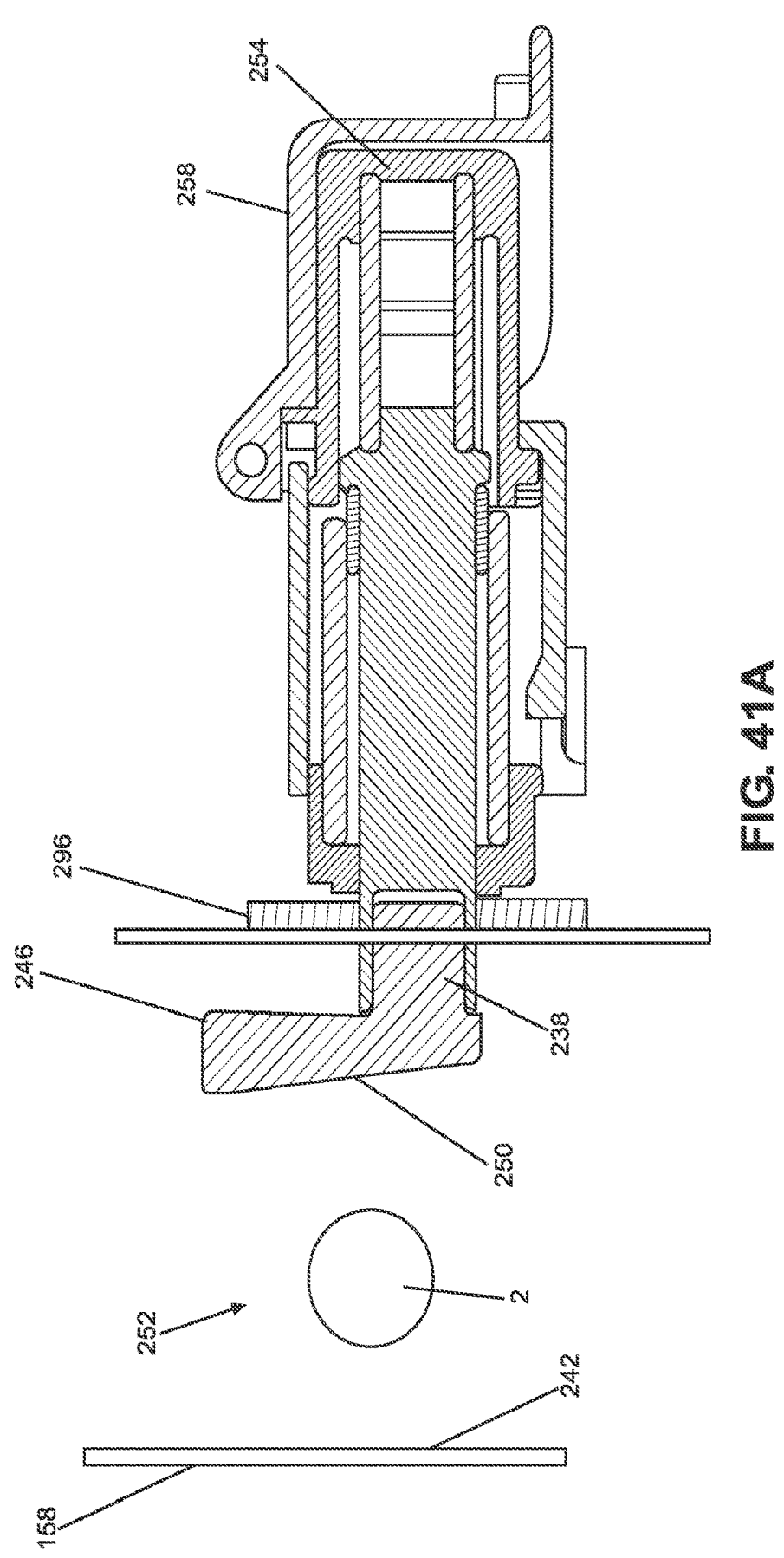
FIG. 41A illustrates a cross-sectional side view of an emergency shutoff assembly according to yet another aspect of the disclosure, showing an open configuration with an unclamped umbilical cord.
Figure 41B:
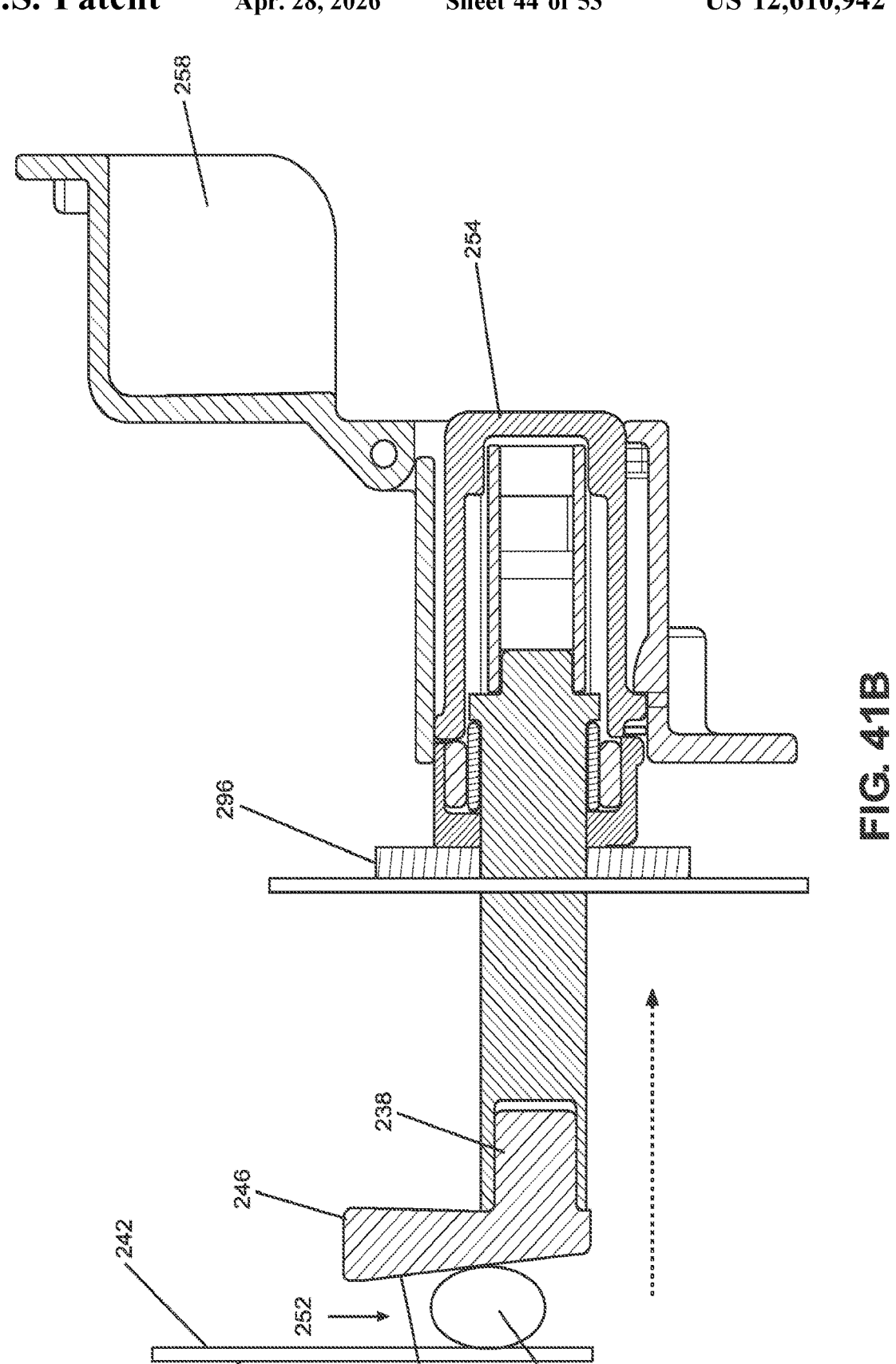
FIG. 41B illustrates a cross-sectional side view of the emergency shutoff assembly of FIG. 41A, showing a closed configuration with a clamped umbilical cord.

Referring to FIGS. 41A and 41B, an alternative embodiment of an emergency shutoff assembly 230 is depicted. In this embodiment, the relevant base surface 242 is disposed opposite the housing 108 from the embodiments described above. For example, the base surface 242 may be defined on the dividing wall 158. The clamping surface 250 is disposed on the opposite side of the head 246 from the embodiments described above. As such, the cross-sectional area 252 that is defined between the clamping surface 250 and the base surface 242 is defined between the head 246 and the dividing wall 158. When this embodiment of the emergency shutoff assembly 230 depicted in FIGS. 41A and 41B is moved to its second, closed position, the head 246 is moved away from the housing 108 and towards the dividing wall 158, thus clamping the umbilical cord 2 between the contact surface 250 and the base surface 242 on the dividing wall 158. In such aspects, the actuator 254 may be a button. Pressing the button may cause a spring to exert a predefined force onto the body 238 to cause the body 238 to move towards the base surface 242. It will be appreciated that the force applied on the body 238 should be sufficient to not only move the body 238, but also to compress the umbilical cord 2 to block blood flow through its blood vessels.

Temperature Sensing

In addition to blood and meconium, the fetal chamber assembly 10 may be configured to monitor various other parameters of the liquid (e.g. PSS) flowing therethrough. In some aspects, one or more temperature sensors may be disposed throughout the fetal chamber assembly 10 to measure temperature of the liquid, components of the fetal chamber assembly 10, or the fetus itself. In some aspects, the fetal chamber assembly 10 may include a plurality of temperature sensors arranged strategically throughout the fetal chamber assembly 10 to provide an accurate measurement of temperature. As shown in FIGS. 3 and 4, the fetal chamber assembly 10 may include temperature sensors 280 disposed within growth chamber 120 to measure the liquid therein. The temperature measurements from some or all of the plurality of temperature sensors may be analyzed to calculate an average temperature within the fetal chamber assembly 10, to determine temperature differences in various areas of the fetal chamber assembly 10, to confirm temperature sensor function, and/or to monitor specific regions individually.

Figure 42:
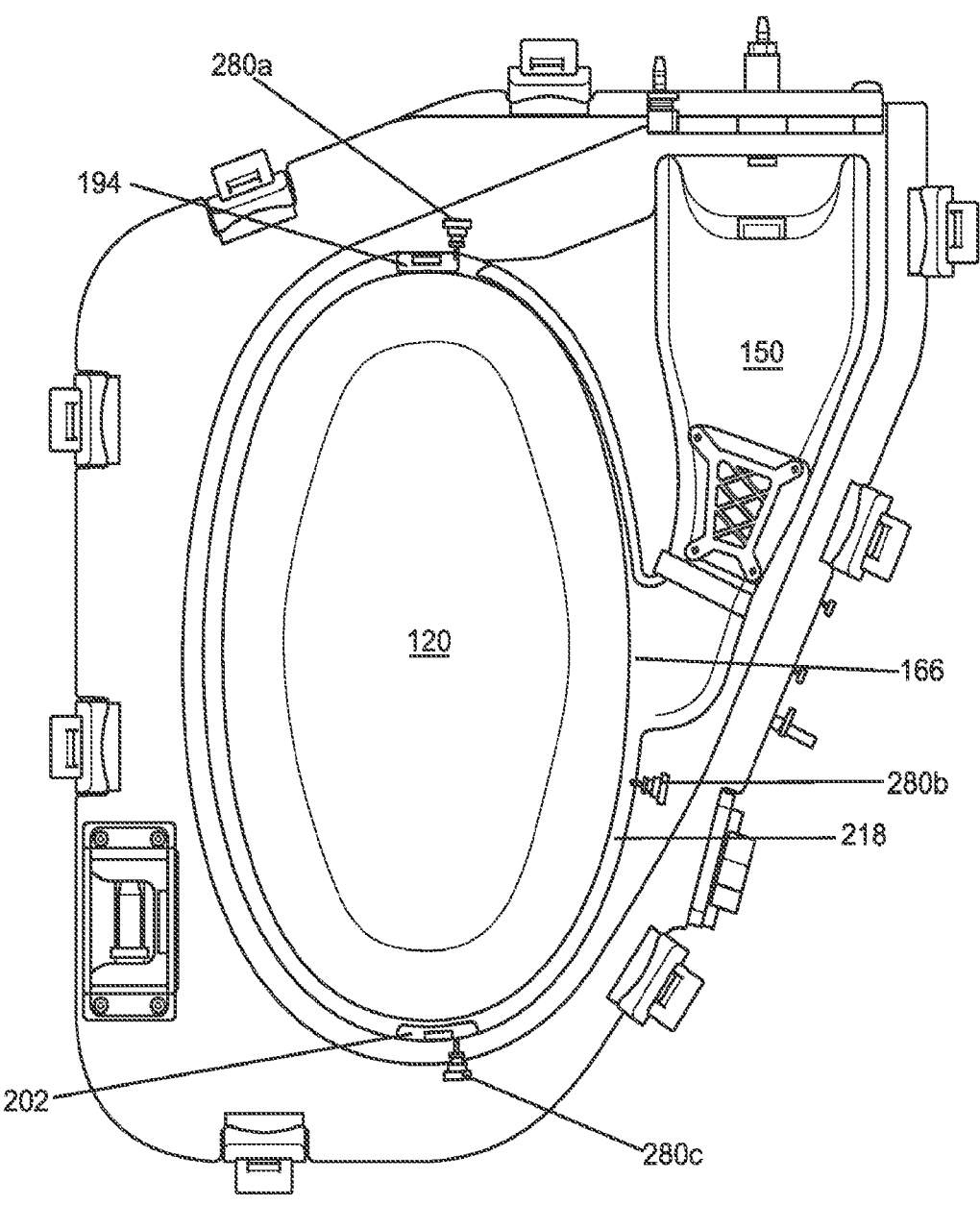
FIG. 42 illustrates a top view of a fetal chamber assembly according to another aspect of the disclosure, showing temperature sensors disposed therein.

Referring to FIG. 42, an exemplary layout of three temperature sensors 280 is depicted. Although FIG. 42 shows three temperature sensors 280, it should be understood that the fetal chamber assembly 10 may be designed with a different number of temperature sensors. For example, 1, 2, . . . 10, or another suitable number of temperature sensors 280 may be envisioned. Additionally, "secondary" temperature sensors 280 may be arranged as redundancies in the event one or more "primary" temperature sensors 280 become un-operational or defective. Primary and secondary temperature sensors may be substantially the same, with the difference being in intended use.

The temperature sensors 280 may be disposed partly or entirely inside the growth chamber 120, the cannulation chamber 150, and/or a fluid channel within the housing 108. The specific arrangement will depend on which region the particular temperature sensor 280 is intended to monitor. As shown in FIG. 42, in some embodiments, the fetal chamber assembly 10 may include three temperature sensors 280 disposed in various regions of the growth chamber 120. For purposes of this disclosure, the three temperature sensors 280 in FIG. 42 are individually labeled as a first temperature sensor 280*a*, a second temperature sensor 280*b*, and a third temperature sensor 280*c*. It will be appreciated that the first, second, and third temperature sensors 280*a-c* may be functionally and structurally the same. The first temperature sensor 280 may be arranged adjacent the first inlet 194. When the fetus is disposed in the growth chamber 120, the first temperature sensor 280 will be the closest of the three depicted temperature sensors to the fetus's head. It may be advantageous to have an accurate measurement of the temperature of liquid in the region of the fetus's head. Additionally, the placement of the first temperature sensor 280 adjacent the first inlet 194 can allow for accurate sensing of temperature of the liquid as the liquid first enters the growth chamber 120.

The second temperature sensor 280*b* may be disposed adjacent the opening 166 between the cannulation chamber 150 and the growth chamber 120. The second temperature sensor 280*b* may be adjacent to the meconium removal port 218. The second temperature sensor 280*b* may be disposed at least partially within the growth chamber 120 between the opening 166 and the meconium removal port 218. Such placement may be advantageous as it allows for accurate temperature monitoring immediately downstream of where the liquid from the cannulation chamber 150 enters the growth chamber 120 and mixes with the liquid within the growth chamber 120. Monitoring the temperature in this region allows for making sure liquid that enters the cannulation chamber through the second inlet 198 is sufficient temperature. In some aspects, it may be advantageous to monitor temperature adjacent the meconium removal port 218. If, during operation, meconium is removed via the meconium removal port 218, as described in detail above, it may be advantageous to monitor the liquid in the immediate vicinity of the meconium removal port 218 to detect any change in temperature caused by the opening of the port and by the insertion of the meconium removing catheter 404 and the catheter adapter 400.

The third temperature sensor 280*c* may be disposed adjacent to the outlet 202. The third temperature sensor 280*c* may be arranged opposite the first temperature sensor 280*a* and may be separated from the first temperature sensor 280*a* along the longitudinal direction y. The third temperature sensor 280*c* may be arranged such that the second temperature sensor 280*b* is disposed between the first and third temperature sensors 280*a*, 280*c*. When the fetus is disposed in the growth chamber 120, the third temperature sensor 280*c* may be the closest of the three temperature sensors to the fetus's feet. It may be advantageous to measure temperature in the region of the fetus's feet and to compare the measurement with the temperature at the fetus's head measured by the first temperature sensor 280*a*. This may indicate how the temperature of the liquid flowing in the direction from the fetus's head towards the fetus's feet changes. Placing the third temperature sensor 280*c* adjacent the outlet 202 may be advantageous to measure temperature of the liquid as it exits the growth chamber 120 and to compare the measurement to the temperature of the liquid as it enters the growth chamber at the first inlet 194 and/or at the opening 166. It will be appreciated that the specific exemplary arrangement of the three temperature sensors 280*a-c* is not intended to be limiting, and that other arrangements of, as well as greater or fewer quantities of, temperature sensors 280 are envisioned. In some aspects, a temperature sensor 280 may be disposed in the cannulation chamber 150, for example adjacent to the second inlet 198.

In operation, it is preferable to maintain the temperature of the liquid inside the fetal chamber assembly 10 within a preferred temperature range. It will be appreciated that temperature of the fetal environment can affect growth and development of the fetus, and that temperatures outside of a preferred range can cause injury to the fetus. As such, in some embodiments, it is preferable to maintain the temperature of the liquid in the growth chamber 120 and in the cannulation chamber 150 to be approximately 37.5 degrees Celsius (C). Variations of temperature may be permissible, and the exact preferred temperature may be varied depending on medical requirements pertaining to the fetus.

The fetal chamber assembly 10 may be configured to cause the entering liquid to be heated or cooled to a desired temperature based on the temperature measurements from the one or more temperature sensors 280. For example, if an individual measurement or an average measurement of temperature is lower than a predetermined threshold, the fetal chamber assembly 10 may be configured to cause the liquid to be heated sufficiently to raise the temperature of the liquid to the desired temperature; conversely, if an individual or average measurement of temperatures is higher than a predetermined threshold, the fetal chamber assembly 10 may be configured to cause the liquid to be cooled sufficiently (or, alternatively, to not be heated) such that the temperature of the liquid is lowered to the desired temperature.

In some aspects, additional temperature sensors (not shown on the fetal chamber assembly 10) may be disposed outside of the fetal chamber assembly 10 to measure temperature of the liquid moving into the fetal chamber assembly 10. These additional temperature sensors may be used to monitor the temperature of the liquid to make sure the liquid is heated or cooled to a desired temperature before it is introduced into the fetal chamber assembly 10.

Pressure Sensing

The fetal chamber assembly 10 may be configured to monitor pressure therein. One or more pressure sensors may be disposed throughout the fetal chamber assembly 10 to measure pressure of the liquid in the growth chamber 120, the cannulation chamber 150, at the first inlet 194, at the second inlet 198, at the outlet 202, at the outlet channel 206, or at another region of the fetal chamber assembly 10. In some aspects, the fetal chamber assembly 10 may include a plurality of pressure sensors arranged strategically throughout the fetal chamber assembly 10 to provide an accurate measurement of pressure. The fetal chamber assembly 10 may be configured to utilize measurements from each of the plurality of pressure sensors to determine an average pressure calculation. As shown in FIG. 21, the fetal chamber assembly 10 may include pressure sensors 284 disposed therein.

Referring to FIG. 43, an exemplary layout of two pressure sensors 284 is depicted. Although FIG. 43 shows two pressure sensors 284, it should be understood that the fetal chamber assembly 10 may be designed with a different number of pressure sensors. For example, 1, 2, . . . 10, or another suitable number of pressure sensors 284 may be envisioned. Additionally, "secondary" pressure sensors 284 may be arranged as redundancies in the event one or more "primary" pressure sensors 284 become un-operational or defective. Primary and secondary pressure sensors may be substantially the same, with the difference being in intended use.

The fetal chamber assembly 10 may be configured to receive measurements from each pressure sensor 284 and to make a calculation based on each individual measurement. The separate measurements may be used to calculate an average pressure within a component of the fetal chamber assembly 10 or a pressure at a particular position relative to the sensors. In some aspects, the values at each pressure sensor 284 can be used to calculate the pressure at the geometric mid-point of the growth chamber 120 or at another preferred region in the growth chamber 120. In some scenarios, it is preferable to continuously monitor the average pressure within the growth chamber 120, specifically when the fetus is disposed therein. As shown in FIG. 43, in some embodiments, the fetal chamber assembly 10 may include two pressure sensors 284 disposed around the growth chamber 120 according to a preferred arrangement. For purposes of this disclosure, the two pressure sensors 284 shown in FIG. 43 are individually labeled as a first pressure sensor 284a and a second pressure sensor 284b. It will be appreciated that the first and second pressure sensors 284a, 284b may be functionally and structurally the same. The use of multiple pressure sensors 284 can advantageously provide pressure readings of a specific area or zone within the growth chamber 120, and the specific regions being monitors may depend on the position of the fetus within the growth chamber 120 relative to the separate pressure sensors 284. Pressure within the fetal chamber assembly 10 can be regulated in response to monitored pressure based on individual pressure measurements at one or more of the plurality of pressure sensors 284 and/or based on a calculated pressure value that is calculated based on the pressure measurements from one or more individual pressure sensors 284.

In some embodiments, the first and second pressure sensors 284a, 284b may be disposed such that each is essentially equidistant from the physical centroid of the growth chamber 120. In some embodiments, the first and second pressure sensors 284a, 284b may be disposed such that each is essentially equidistant from the pitch axis A. Specifically, the first pressure sensor 284a may be disposed adjacent to the portion of the growth chamber 120 that will receive the head of the fetus, and the second pressure sensor 284b may be disposed adjacent to the portion of the growth chamber 120 that will receive the feet of the fetus. That is, the first pressure sensor 284a may be closer to the head of the fetus than to the feet of the fetus. The second pressure sensor 284b may be closer to the feet of the fetus than to the head of the fetus.

The fetal chamber assembly 10 may be configured to notify a user, trigger an alarm, and/or modify position or operation thereon if the measured pressure is outside of a predetermined range. In some aspects, it may be preferable to maintain the pressure within the growth chamber 120 (calculated at the centroid of the growth chamber) between approximately 4 mmHg and 6 mmHg. It will be appreciated that other suitable pressure ranges may be utilized and will depend on parameters of the fetal chamber assembly 10 and the fetus.

As explained in previous sections, the fetal chamber assembly 10 may be translated along the lateral direction x, along the longitudinal direction y, and/or along the vertical direction z, and the fetal chamber assembly 10 may be rotated along a pitch axis that is parallel to the lateral direction x, along a roll axis parallel to the longitudinal direction y, and/or along a yaw axis parallel to the vertical direction z. The specific location of each of the pitch, roll, and yaw axes relative to the fetal chamber assembly 10 may differ between various embodiments and is not intended to limit the description below unless indicated otherwise. In some aspects, the pitch, roll, and/or yaw axes may extend through the centroid of the growth chamber 120. As depicted in FIG. 43, a pitch axis A is shown extending through the centroid C. A roll axis B is shown extending through the centroid C and intersecting with the pitch axis A, the roll axis B being perpendicular to the pitch axis A. It will be understood that the pitch and roll axes A, B may extend in different orientations than depicted, and that the centroid C is an approximation used solely for descriptive purposes and may be defined elsewhere within the growth chamber 120.

In operation, the fetal chamber system 10 may be rotated along the pitch axis A in a first direction or in a second direction opposite the first direction. The fetal chamber system 10 may be rotated along the roll axis B in a third direction or in a fourth direction opposite the third direction, the third and fourth directions being perpendicular to the first and second directions. As such rotation occurs, pressure within the growth chamber will change at different regions of the growth chamber 120. For example, the region of the growth chamber that will be lower (relative to gravity) than another portion of the growth chamber will have higher pressure than the other portion of the growth chamber that is relatively higher. The depicted exemplary arrangement of the first and second pressure sensors 284a, 284b allows for measurement of a pressure differential between the two pressure sensors 284a, 284b in cases when the growth chamber 120 is rotated along the pitch axis A, the roll axis B, or both axes.

The relative distance between the first and second pressure sensors 284a, 284b may be measured along the vertical z direction. As such, when the fetal chamber assembly 10 is in a normal, non-rolled and non-pitched state (being in a plane parallel to the transverse direction x and the longitudinal direction y), the relative distance (along the vertical z direction) between the two pressure sensors 284a, 284b is zero. If the fetal chamber assembly 10 is rotated around the pitch axis A and/or the roll axis B, the relative distance (along the vertical z direction) between the two pressure sensors 284a, 284b is greater than zero. The farther the fetal chamber assembly 10 is rotated along either of the pitch and/or roll axes A, B, the greater the relative vertical distance between the two pressure sensors 284a, 284b. The greater their relative distance, the greater the difference in pressure at each of the first and second pressure sensors 284a, 284b. The pressure variation across the growth chamber 120 is caused by changing the position of the growth chamber 120, which can alter the pressure at different locations throughout the growth chamber 120.

In some aspects, the fetal chamber assembly 10 may be configured to rotate along the pitch axis between 0 degrees and about 90 degrees. The angle of rotation may be measured from the transverse-longitudinal plane defined by the transverse direction x and the longitudinal direction y. In some aspects, the fetal chamber assembly 10 may be configured to rotate along the pitch axis between 0 degrees and about 70 degrees. The rotation along the pitch axis may be in the first direction or the second direction opposite the first direction. In some aspects, the fetal chamber assembly 10 may be configured to rotate along the roll axis between 0 degrees and about 90 degrees (measured from the transverse-longitudinal plane). In some aspects, the fetal chamber assembly 10 may be configured to rotate along the roll axis between 0 degrees and about 45 degrees. The rotation along the roll axis may be in the third direction or the fourth direction opposite the third direction. In some aspects, it may be advantageous to change the position of the fetal chamber assembly 10 with the fetus therein. For example, occasional movement of the fetal chamber assembly 10 may be utilized to resemble in vivo conditions of the fetus in a womb. Movement of the fetal chamber assembly 10 along the various directions and axes described throughout this application may help prevent stagnation of fluid, removal of captured gases within the fluid, decreasing risk of pressure sores associated with the fetus contacting a component at a single point of contact for prolonged time, and generally increasing fetal development.

Figures 44A, 44B, 44C:
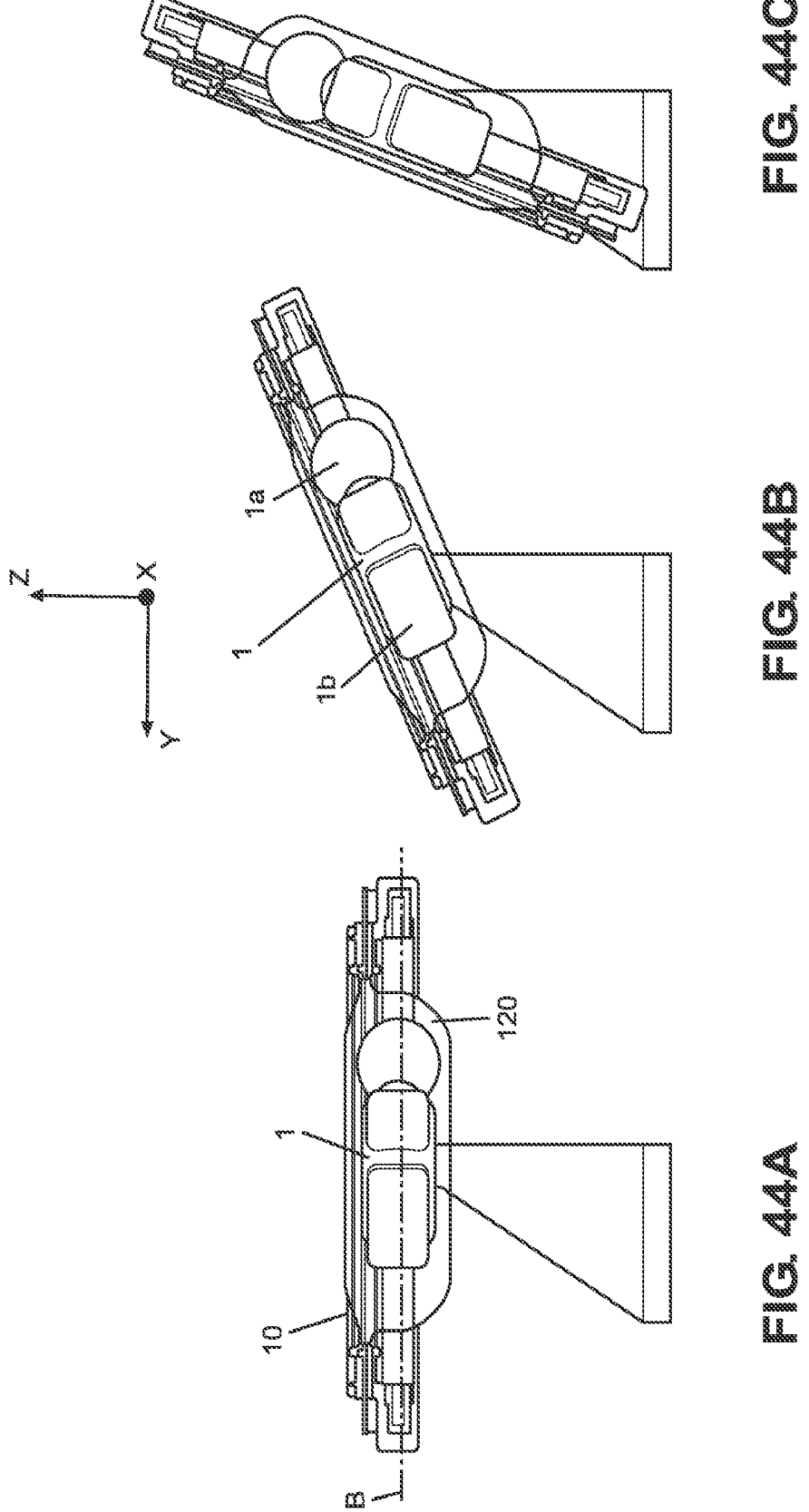
FIG. 44A illustrates a side view of a fetal chamber assembly according to another aspect of the disclosure, shown in a first position.
FIG. 44B illustrates a side view of the fetal chamber assembly of FIG. 44A, shown in a second position.
FIG. 44C illustrates a side view of the fetal chamber assembly of FIGS. 44A and 44B, shown in a third position.
Figures 44D, 44E, 44F:
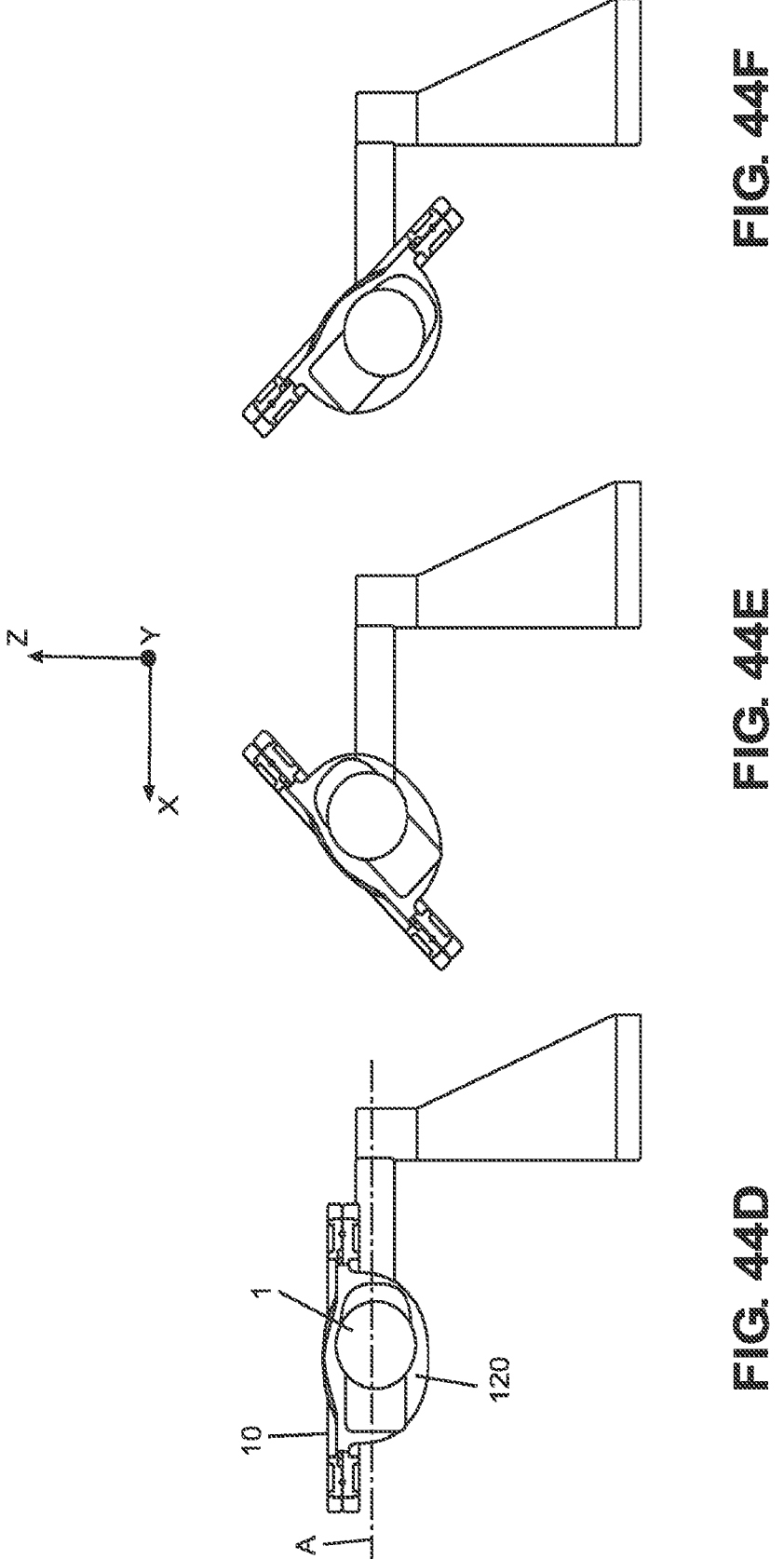
FIG. 44D illustrates a front view of the fetal chamber assembly of FIGS. 44A-44C, shown in the first position.
FIG. 44E illustrates a front view of the fetal chamber assembly of FIGS. 44A-44D, shown in a fourth position.
FIG. 44F illustrates a front view of the fetal chamber assembly of FIGS. 44A-44E, shown in a fifth position.
Figures 45A, 45B, 45C, 45D, 45E:
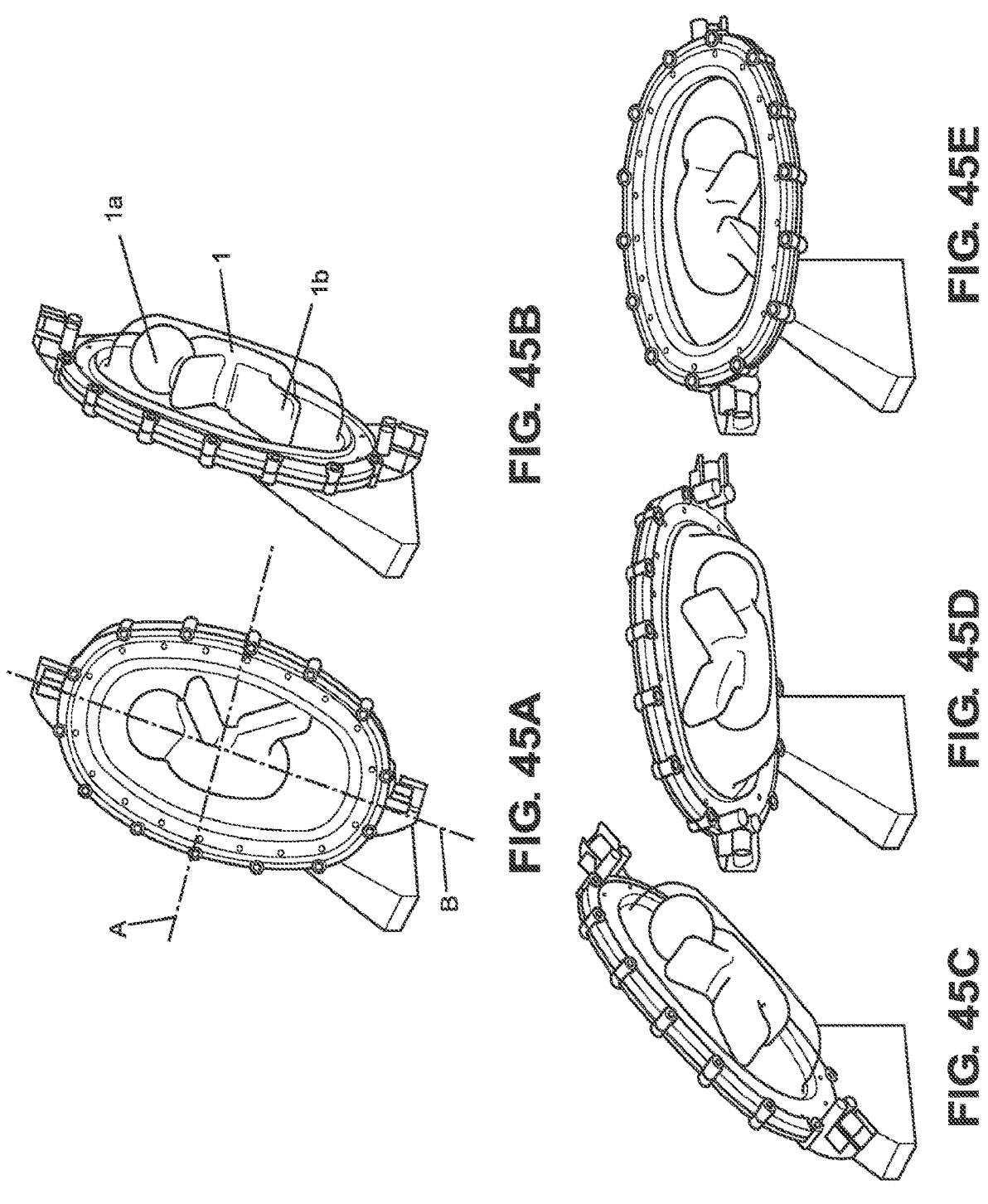
FIG. 45A illustrates an isometric view of the fetal chamber assembly of FIGS. 44A-44E, shown in a sixth position.
FIG. 45B illustrates an isometric view of the fetal chamber assembly of FIGS. 44A-45A, shown in a seventh position.
FIG. 45C illustrates an isometric view of the fetal chamber assembly of FIGS. 44A-45B, shown in an eighth position.
FIG. 45D illustrates an isometric view of the fetal chamber assembly of FIGS. 44A-45C, shown in a ninth position.
FIG. 45E illustrates an isometric view of the fetal chamber assembly of FIGS. 44A-45D, shown in a tenth position.

Referring to FIGS. 44A-44F, an exemplary fetal chamber assembly 10 is shown in various positions depicted from two planes of view; FIGS. 44A-44C are shown in a plane defined by the longitudinal and vertical directions y and z, and FIGS. 44D-44F are shown in a plane defined by the transverse and vertical directions x and z. FIGS. 44A-44C depict the fetal chamber assembly 10 in different exemplary rotational positions relative to the pitch axis A (perpendicular to the roll axis B and parallel to the lateral direction x). Rotation is measured from the transverse-longitudinal plane defined above. In FIG. 44A, the fetal chamber assembly 10 is not rotated around the pitch axis A and is parallel to the transverse-longitudinal plane. In such an arrangement, the relative vertical distance between the first and second pressure sensors 284a, 284b described above is zero. In FIG. 44B, the fetal chamber assembly 10 is shown having been rotated in the first direction along the pitch axis A to an angle of between 0 degrees and 70 degrees. FIG. 44C shows the fetal chamber assembly 10 having been rotated in the first direction to approximately a 70 degree angle. It will be appreciated that the fetal chamber assembly 10 may be rotated further in the first direction beyond 70 degrees. It will also be understood that the fetal chamber assembly 10 may be rotated along the pitch axis A in the second direction opposite the first direction. In some aspects, it may be preferable to only rotate the fetal chamber assembly 10 in the first direction such that the head 1a of the fetus 1 is always positioned even with or above the feet 1b of the fetus 1, as shown in FIGS. 44A-44C.

Referring to FIGS. 44D-44F, the fetal chamber assembly 10 is shown in different exemplary rotational positions about the roll axis B. FIG. 44D depicts the fetal chamber assembly 10 not rotated along the roll axis B. FIG. 44E shows the fetal chamber assembly 10 having been rotated along the third direction at approximately a 45 degree angle. FIG. 44E shows the fetal chamber assembly 10 having been rotated along the fourth direction at approximately a 45 degree angle. It will also be understood that the fetal chamber assembly 10 may be rotated along the roll axis B to angles smaller than 45 degrees or greater than 45 degrees.

FIGS. 45A-45E depict isometric views of the fetal chamber assembly 10 of FIGS. 44A-44E above. The fetal chamber assembly 10 is shown in various positions having been rotated about both, the pitch axis A and the roll axis B. It will be appreciated that the depicted positions are exemplary and not limiting, and that the fetal chamber assembly 10 may be rotated into other positions not shown in these figures. In some aspects, rotation of the fetal chamber assembly 10 around the pitch axis A may range from 0 degrees to about 70 degrees. In some aspects, rotation of the fetal chamber assembly 10 around the roll axis B may range from 0 degrees to about 45 degrees in each rotational direction. As noted above, it may be preferable to rotate the fetal chamber assembly 10 along the pitch axis A in only a single direction such that the head 1a of the fetus 1 is never disposed lower than the fetus's feet 1b (relative to gravity).

Air Removal

In some aspects, gas may become trapped within the fetal chamber assembly 10 during loading of the fetus, during the cannulation process, during removal of meconium, or during movement of the fetal chamber assembly 10. The gas may include air and may include a common mixture of atmospheric gases. In some aspects, air may seep inside the fetal chamber assembly 10 at one or more of the ports described throughout this application. Furthermore, dissolved gases in the liquid being moved into and through the fetal chamber assembly 10 may separate out of the liquid. During operation of the fetal chamber assembly 10, gases may escape from the fetus during normal gestation processes and enter the environment immediately adjacent the fetus (i.e. the liquid surrounding the fetus in the growth chamber 120). The air (or other gases) may be disposed, in gaseous form, between the base 100 and the lid 112. In some aspects, pockets of air may form in the growth chamber 120 and/or in the cannulation chamber 150.

Air present within the growth chamber 120 and/or the cannulation chamber 150 may be hazardous to the fetus. In some aspects, presence of air may interfere with desired imaging of the fetus during gestation. For example, air may impede ultrasound imaging of the fetus in the growth chamber 120. In some aspects, presence of air may lead to drying of assembly components, tubing, cannulas, and the like. This may lead to physical cracks or breaks in the components, which may cause leaks within the fetal chamber assembly 10. It is preferable to keep the fetus and its umbilical cord submerged within liquid during the gestation process. If parts of the fetus or its umbilical cord contact the air, the fetus or the umbilical cord may dry out or otherwise damaged. Further, the air trapped inside the fetal chamber assembly 10 may be non-sterile and may contain contaminants, viruses, bacteria, or other impurities that are undesirable within the fetal chamber assembly 10.

It may be preferable to remove at least a portion of the air trapped within the fetal chamber assembly 10. The air may be moved out of the growth chamber 120 and/or the cannulation chamber 150 through one or more air removal ports 260 disposed on the fetal chamber assembly 10 (see, generally, FIG. 2). An air removal port 260 may be disposed on the base 100 or on the lid 112. In some embodiments, the air removal port 260 may be disposed on the cannulation chamber membrane 308 (as shown in FIG. 2). In some embodiments, the air removal port 260 may be disposed on the top membrane 124 of the growth chamber 120. In some further embodiments, the air removal port 260 may be disposed on the housing 108 of the base 100 (see, also, FIG. 2). In some aspects, the fetal chamber assembly 10 may include a plurality of air removal ports 260 disposed throughout the fetal chamber assembly 10.

Figure 46:
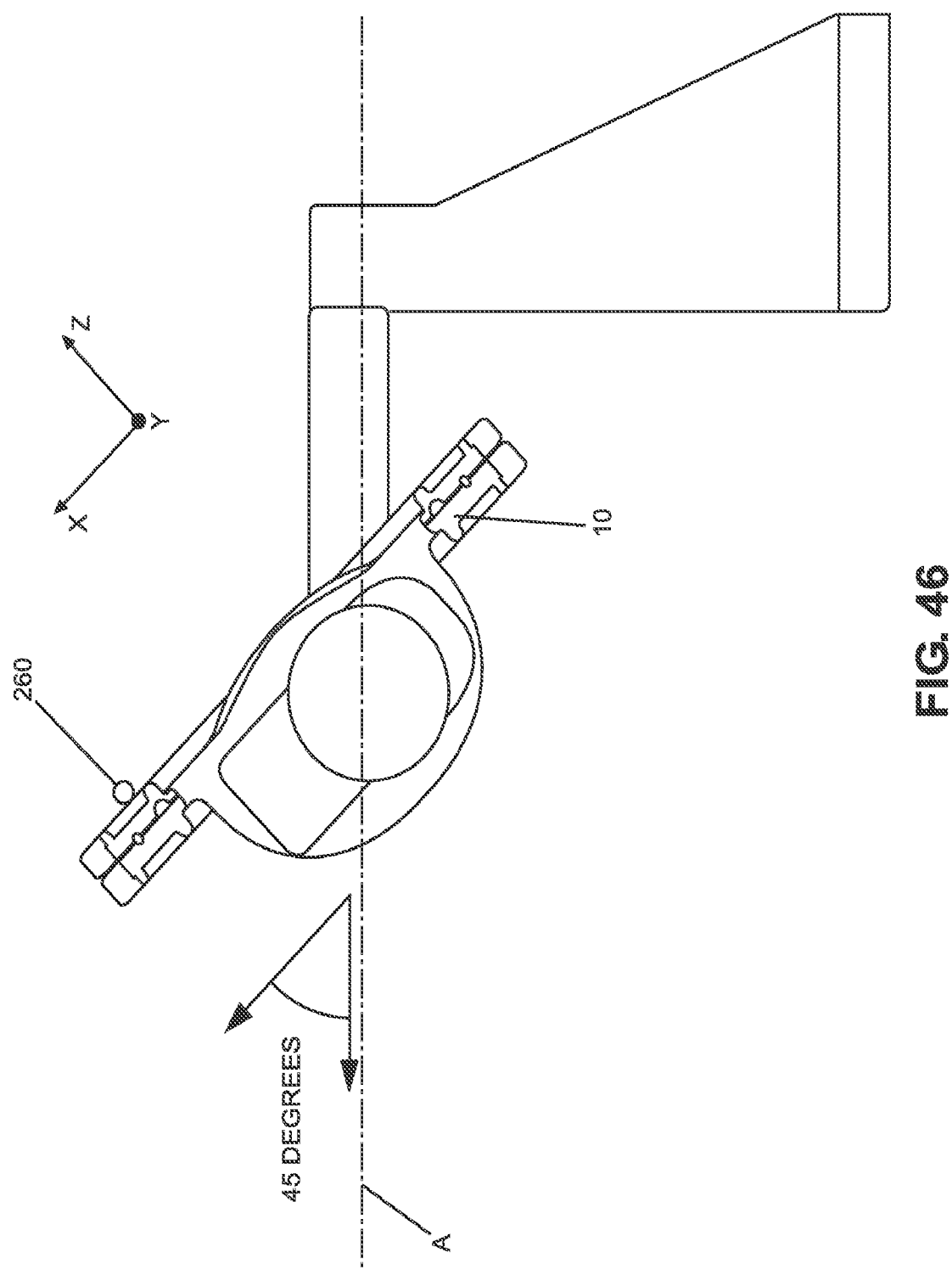
FIG. 46 illustrates a front view of a fetal chamber assembly according to yet another aspect of the disclosure.

Each air port 260 defines a passage extending therethrough that fluidly communicates between the interior space 104 of the fetal chamber assembly 10 (i.e. the space between the base 100 and lid 112) and the environment outside of the fetal chamber assembly 10. Because the liquid that will be flowed through the fetal chamber assembly 10 is heavier and denser than air, the liquid (e.g. PSS) will naturally fall downward (with gravity) and displace air, such that air is located relatively above the liquid ("above" being measured from the liquid in the direction against gravity). Due to the shapes of components of the fetal chamber assembly 10, air bubbles that are formed may be trapped in a region of the fetal chamber assembly 10 that does not include an air removal port 260. As such, it may be preferable to move the fetal chamber assembly 10 such that the trapped air bubbles are directed towards the one or more air removal ports 260. As explained previously, the fetal chamber assembly 10 may be rotated along the pitch, roll, and yaw axes. In operation, a user can rotate the fetal chamber assembly 10 along one, two, or all three of the pitch, roll, and yaw axes to direct the trapped air bubbles to the desired air removal port 260. In some exemplary embodiments, as shown in FIG. 46, the fetal chamber assembly 10 may be rotated along the roll axis up to approximately 45 degrees (measured from the transverse-longitudinal plane defined earlier) such that air trapped between the base 100 and the lid 112 is moved towards the air removal port 260 disposed on the cannulation chamber membrane 308. As the air is moved adjacent the air removal port 260, the air may flow through the air removal port 260 and out of the fetal chamber assembly 10.

Figure 47:
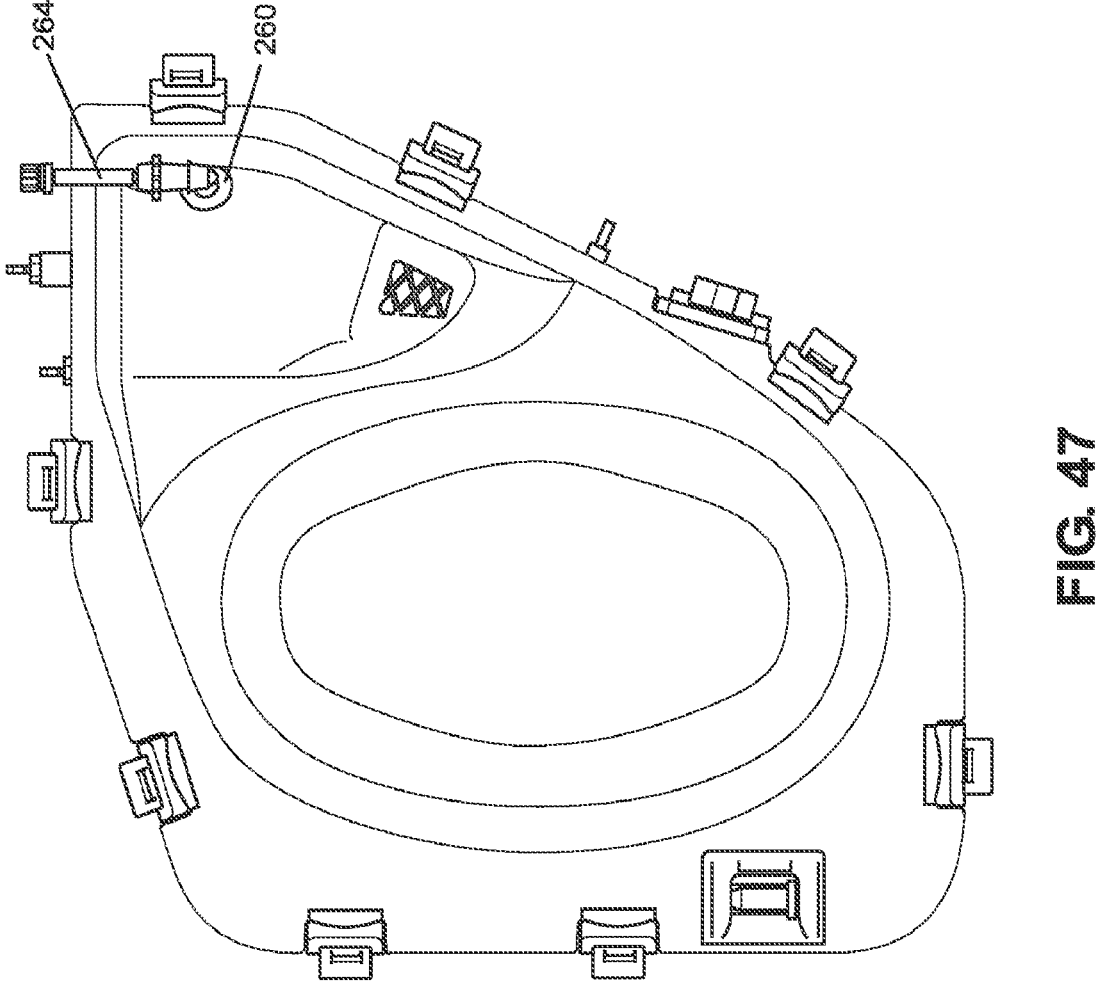
FIG. 47 illustrates a top view of a fetal chamber assembly according to yet another aspect of the disclosure, showing an air removal port and air removal assembly.

In some aspects, the user may deform, push, or palpate the top membrane 124 or the cannulation chamber membrane 308 to direct the air in the desired direction towards the air removal port 260. In some aspects, an air removal port 260 may be disposed on the housing 108. For example, the air removal port 260 may be disposed adjacent to the meconium removal port 218. Referring to FIG. 47, an exemplary arrangement of a fetal chamber assembly 10 is depicted. The fetal chamber assembly 10 is shown having been rotated along the roll axis to a desired angle. An air bubble 380 can be seen disposed adjacent to the air removal port 260. Liquid 382 is shown beneath the air bubble 380 ("beneath" being relative to the vertical direction in the direction of gravity). A user 384 is shown applying force to the top membrane

124. The force and the relative position of the fetal chamber assembly 10 causes the air bubble 380 to be moved towards the air removal port 260, where the air may be discharged from the fetal chamber assembly 10.

Figure 48:
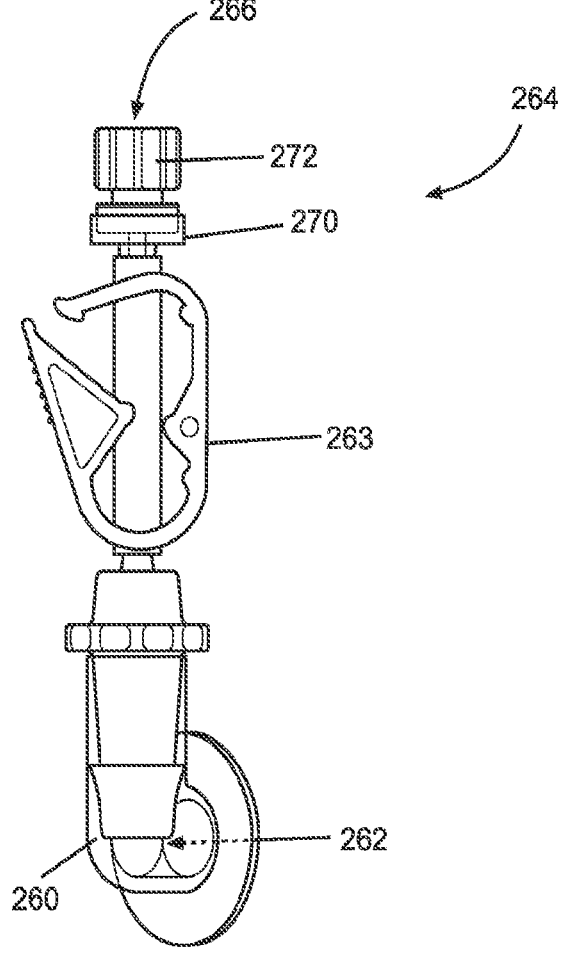
FIG. 48 illustrates a front view of an air removal assembly according to an aspect of the disclosure.
Figure 49:
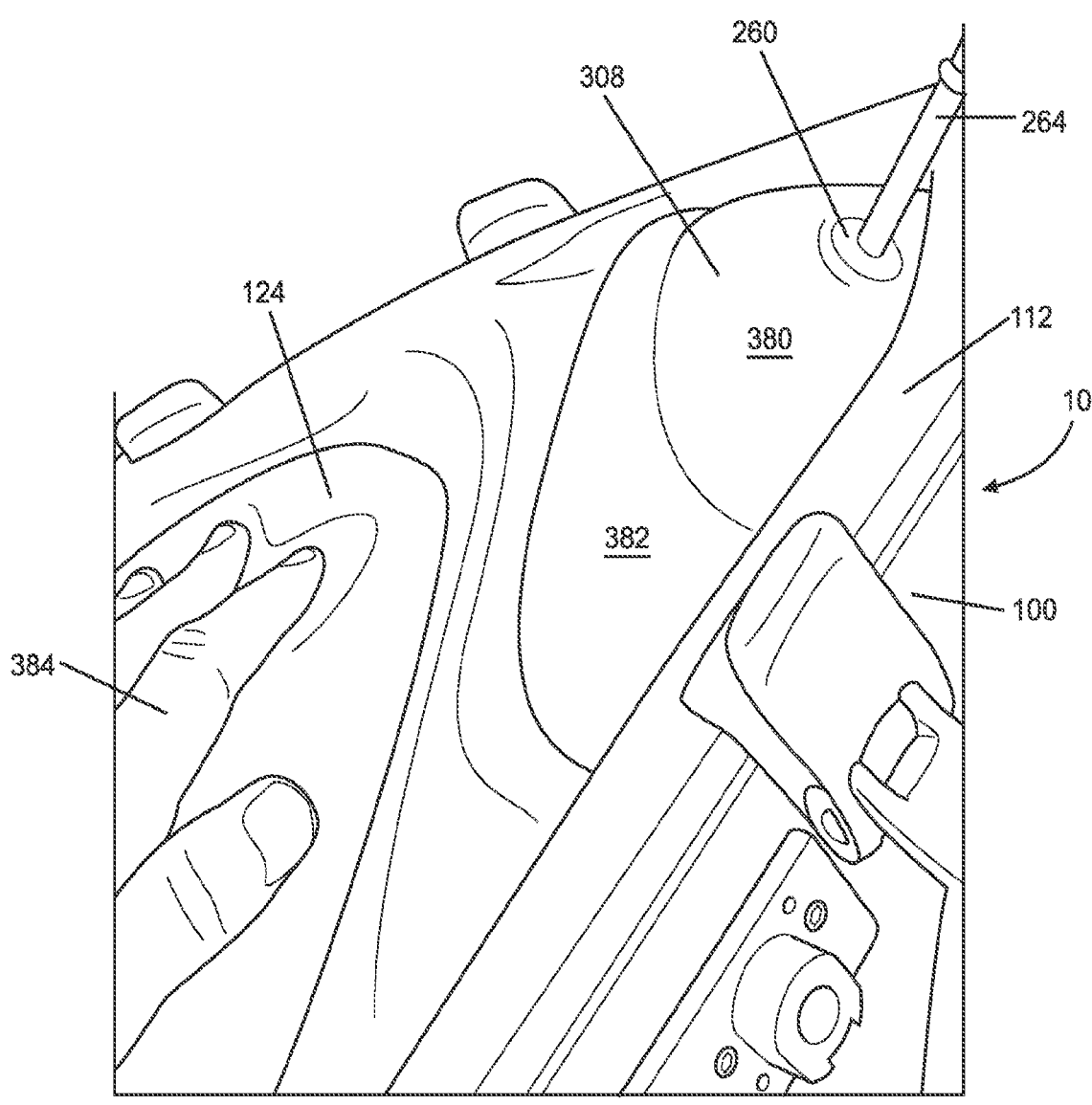
FIG. 49 illustrates a perspective view of a fetal chamber assembly according to yet another aspect of the disclosure, showing air adjacent to an air removal port.

The air removal port 260 may be configured to receive an air removal assembly 264 therein. The air removal assembly 264 allows for selectively opening and closing the air removal port 260, such that air may pass through or be precluded from passing through, respectively. Referring to FIGS. 47-48, an exemplary air removal assembly 264 is depicted engaged with an exemplary air removal port 260. It will be appreciated that other similar devices may be utilized. The air removal port 260 includes a passage 262 extending therethrough that fluidly communicates with both the interior surface 104 and the environment outside of the fetal chamber assembly 10. The air removal port 260 is configured to receive an air removal assembly 264 into the passage 262. The air removal assembly 264 defines a passage 266 extending therethrough. The passage 266 is configured to be in fluid communication with the passage 262. When the air removal assembly 264 is engaged with the air removal port 260, the passage 266 is in fluid communication with the interior space 104 and the environment outside of the fetal chamber assembly 10. The air removal assembly 264 may include a clamp 268 configured to selectively block or unblock the passage 266. It will be understood that the material of the air removal assembly 264 should be deformable enough such that it may be compressed by the clamp 268 and resilient enough to return to an uncompressed position when the clamp 268 is opened. The air removal assembly 264 may comprise a plastic or silicone tube. The air removal assembly 264 may further include a check valve 270 configured to allow air or liquid to pass therethrough in one direction (e.g. in the direction out of the fetal chamber assembly 10) while precluding passage of materials in an opposite direction (e.g. into the fetal chamber assembly 10). A vented cap 272 may be disposed on the air removal apparatus 264 to allow air to escape from the air removal apparatus 264 through the passage 266 while preventing entrance of external contaminants or debris into the passage 266. The cap 272 may be removably connected to the air removal assembly 264 such that the cap 272 can be selectively opened or closed by the user to allow air to be removed. In some aspects, the cap 272 may be threadably connected to the air removal apparatus 264. In some aspects, the cap 272 may contain a hydrophobic filter to allow gas but not liquid to escape.

The disclosed systems and devices may be configured for use with fetuses, including term and preterm fetuses. The preterm fetus may be a premature fetus (for example, less than 37 weeks estimated gestational age, particularly 28 to 32 weeks estimated gestational age), extreme premature fetuses (24 to 28 weeks estimated gestational age), or pre-viable fetuses (20 to 24 weeks estimated gestational age). The gestation periods are provided for humans, though corresponding preterm fetuses of other animals may be used. In some aspects, the preterm fetus may have no underlying congenital disease. In other aspects, the fetus may have limited capacity for pulmonary gas exchange, for example, due to pulmonary hypoplasia or a congenital anomaly affecting lung development, such as congenital diaphragmatic hernia. The disclosed systems may be configured such that the fetus may be maintained within the system for as long as needed (for example, for days, weeks or months) until the fetus is capable of life without the system. The particular size, shape, and dimensions of the disclosed fetal chamber assemblies 10 will depend on the intended use, the size of the fetus, and manufacturing constraints. In some exemplary embodiments, the fetal chamber assembly 10 may have a first dimension measured along the longitudinal direction y of between about 10 inches and about 24 inches; between about 14 inches and about 20 inches; or in another suitable range. The fetal chamber assembly 10 may have a second dimension measured along the transverse direction x of between about 8 inches and about 22 inches; between about 12 inches and about 18 inches; or in another suitable range. The fetal chamber assembly 10 may have a third dimension measured along the vertical y direction of between about 2 inches and about 12 inches; between about 4 inches and about 10 inches; or in another suitable range.

While systems and methods have been described in connection with the various embodiments of the various figures, it will be appreciated by those skilled in the art that changes could be made to the embodiments without departing from the broad inventive concept thereof. It is understood, therefore, that this disclosure is not limited to the particular embodiments disclosed, and it is intended to cover modifications within the spirit and scope of the present disclosure as defined by the claims.

What is claimed:

1. A growth chamber for use with a fetal chamber assembly, the growth chamber being configured to receive a first fluid therein and a fetus therein, the growth chamber comprising: a top membrane; a bottom membrane opposite the top membrane; a growth membrane spaced away from the bottom membrane, the bottom membrane being disposed between the growth membrane and the top membrane; and a fluid pocket defined between the growth membrane and the bottom membrane, the fluid pocket being configured to receive a second fluid therein, wherein the fetus is configured to be received between the top membrane and the bottom membrane, and wherein the growth chamber has a first configuration and a second configuration, where when the growth chamber is in the first configuration, a first growth volume is defined between the top membrane and the bottom membrane, and a first pocket volume is defined within the fluid pocket between the growth membrane and the bottom membrane, and when the growth chamber is in the second configuration, a second growth volume is defined between the top membrane and the bottom membrane, and a second pocket volume is defined within the fluid pocket between the growth membrane and the bottom membrane, the first growth volume being different from the second growth volume, and the first pocket volume being different from the second pocket volume.

2. The growth chamber of claim 1, wherein the growth chamber is configured to be moved from the first configuration to the second configuration by changing the first pocket volume to the second pocket volume.

3. The growth chamber of claim 1, further comprising a first fluid inlet configured to discharge the first fluid into the growth chamber between the top membrane and the bottom membrane.

4. The growth chamber of claim 1, further comprising an outlet configured to receive the first fluid out of the growth chamber.

5. The growth chamber of claim 1, further comprising a bumper extending into the growth chamber between the top membrane and the bottom membrane, the bumper being configured to be contacted by the fetus.

6. The growth chamber of claim 1, wherein the first fluid is different from the second fluid.

7. The growth chamber of claim 1, wherein the bottom membrane and the growth membrane are affixed to each other such that the second fluid does not contact the first fluid.

8. The growth chamber of claim 1, further comprising a fluid pocket port in fluid communication with the fluid pocket, the fluid pocket being configured to selectively receive or discharge the second fluid through the fluid pocket port.

9. The growth chamber of claim 1, wherein the first fluid is physiological saline solution (PSS).

10. The growth chamber of claim 1, wherein the second fluid is a liquid.

11. The growth chamber of claim 1, wherein the second fluid includes saline.

12. The growth chamber of claim 1, wherein the first growth volume is smaller than the second growth volume, and wherein the first pocket volume is greater than the second pocket volume.

13. The growth chamber of claim 1, wherein the first growth volume is associated with a fetus having a first size, and the second growth volume is associated with the fetus having a second size.

14. The growth chamber of claim 1, further comprising a temperature sensor therein, the temperature sensor being configured to measure temperature of the first fluid.

15. The growth chamber of claim 14 wherein the growth chamber comprises a plurality of temperature sensors.

16. The growth chamber of claim 1, further comprising a pressure sensor therein, the pressure sensor being configured to measure pressure of the first fluid.

17. The growth chamber of claim 16, wherein the growth chamber comprises a plurality of pressure sensors.

18. The growth chamber of claim 1, wherein the growth chamber is configured to fluidly communicate with a cannulation chamber.

19. The growth chamber of claim 1, further comprising a meconium removal port extending therein, the meconium removal port being selectively openable or closable and being configured to permit insertion of a meconium removal tool therethrough into the growth chamber between the top membrane and the bottom membrane to remove meconium in the growth chamber.

20. The growth chamber of claim 1, wherein at least one of the top membrane, the bottom membrane, and the growth membrane each include at least one of a polyurethane, a polypropylene, a polyethylene, a polyvinyl chloride, an ethylene vinyl acetate, a polyvinylidene chloride, and an acrylic or a laminated combination of polymers.

21. The growth chamber of claim 1, wherein at least one of the top membrane, the bottom membrane, and the growth membrane has a durometer of between about 50 and about 100.

22. The growth chamber of claim 1, wherein at least one of the top membrane, the bottom membrane, and the growth membrane has a durometer of between about 60 and about 90.

23. The growth chamber of claim 1, wherein at least one of the top membrane, the bottom membrane, and the growth membrane has a durometer of between about 70 and about 80.

24. The growth chamber of claim 1, wherein at least one of the top membrane, the bottom membrane, and the growth membrane are thermoformed.

25. The growth chamber of claim 1, wherein the growth membrane has a thickness greater than the thickness of the top membrane and the thickness of the bottom membrane.

26. The growth chamber of claim 1, wherein the thickness of the growth membrane is about twice the thickness of the top membrane and about twice the thickness of the bottom membrane.

27. The growth chamber of claim 1, wherein at least one of the top membrane, the bottom membrane, and the growth membrane are configured to deform when the growth chamber receives the fetus therein.

\* \* \* \* \*